United States Patent
Ikai et al.

(10) Patent No.: US 10,798,403 B2
(45) Date of Patent: Oct. 6, 2020

(54) PREDICTION IMAGE GENERATION DEVICE, VIDEO DECODING DEVICE, AND VIDEO CODING DEVICE

(71) Applicant: SHARP KABUSHIKI KAISHA, Sakai, Osaka (JP)

(72) Inventors: Tomohiro Ikai, Sakai (JP); Tomoyuki Yamamoto, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 125 days.

(21) Appl. No.: 16/073,508

(22) PCT Filed: Jan. 11, 2017

(86) PCT No.: PCT/JP2017/000638
§ 371 (c)(1),
(2) Date: Jul. 27, 2018

(87) PCT Pub. No.: WO2017/130696
PCT Pub. Date: Aug. 3, 2017

(65) Prior Publication Data
US 2019/0037231 A1 Jan. 31, 2019

(30) Foreign Application Priority Data
Jan. 29, 2016 (JP) ................. 2016-016557

(51) Int. Cl.
*H04N 19/513* (2014.01)
*H04N 19/52* (2014.01)
*H04N 19/70* (2014.01)

(52) U.S. Cl.
CPC .......... *H04N 19/513* (2014.11); *H04N 19/52* (2014.11); *H04N 19/70* (2014.11)

(58) Field of Classification Search
None
See application file for complete search history.

(56) References Cited

U.S. PATENT DOCUMENTS

| | | |
|---|---|---|
| 2013/0336397 A1 | 12/2013 | Senzaki et al. |
| 2015/0092851 A1 | 4/2015 | Yoshikawa et al. |
| 2018/0220149 A1* | 8/2018 | Son ................. H04N 19/159 |

FOREIGN PATENT DOCUMENTS

| | | |
|---|---|---|
| JP | 2015-92650 A | 5/2015 |
| JP | 2015-222976 A | 12/2015 |

OTHER PUBLICATIONS

Huang et al., "Control-Point Representation and Differential Coding Affine-Motion Compensation," IEEE Transactions on Circuits and Systems for Video Technology, vol. 23, No. 10, Oct. 2013, pp. 1651-1660. (Year: 2013).*

(Continued)

*Primary Examiner* — Christopher Braniff
(74) *Attorney, Agent, or Firm* — ScienBiziP, P.C.

(57) ABSTRACT

At least one of a vector candidate derivation unit and a merge candidate derivation unit derives a motion vector of each of multiple sub-blocks contained in a decoding target block by referring to motion vectors at multiple control points including two points at an interval which is longer than one side of the target block, and a prediction image generation unit refers to the motion vector of each sub-block to generate a prediction image.

3 Claims, 39 Drawing Sheets

(56) References Cited

OTHER PUBLICATIONS

J. Chen et al., "Coding tools investigation for next generation video coding", ITU-T SG16 Doc.COM16-C806, Feb. 2015.
Rajan Joshi et al., "Proposed editorial improvements to HEVC Screen Context Coding Draft Text 4", Document: JCTVC-V0031, Joint Collaborative Team on Video Coding (JCT-VC) of ITU-T SG 16 WP 3 and ISO/IEC JTC 1/SC 29/WG 11 22nd Meeting: Geneva, CH, Oct. 15-21, 2015.
Jill Boyce, "Draft high efficiency video coding (HEVC) version 2, combined format range extensions (RExt), scalability (SHVC), and multi-view (MV-HEVC) extensions", Document: JCTVC-R1013, Joint Collaborative Team on Video Coding (JCT-VC) of ITU-T SG 16 WP3 and ISO/IEC JTC 1/SC 29/WG 11 18th Meeting: Sapporo, JP, Jun. 30-Jul. 9, 2014.
Sixin Lin et al., "Affine transform prediction for next generation video coding", ITU-T SG16 Doc.COM16-C1016, Oct. 2015.
Jianle Chen et al., "Algorithm Description of Joint Exploration Test Model 1", Joint Video Exploration Team (JVET) of ITU-T SG16 WP3 and ISO/IEC JTC 1/SC 29/WG 11 JVET-A1001, <URL:http://phenix.it-sudparis.eu/jvet/doc_end_user/documents/1_Genenva/wg11/JVET-A1001-v1.zip>.

\* cited by examiner

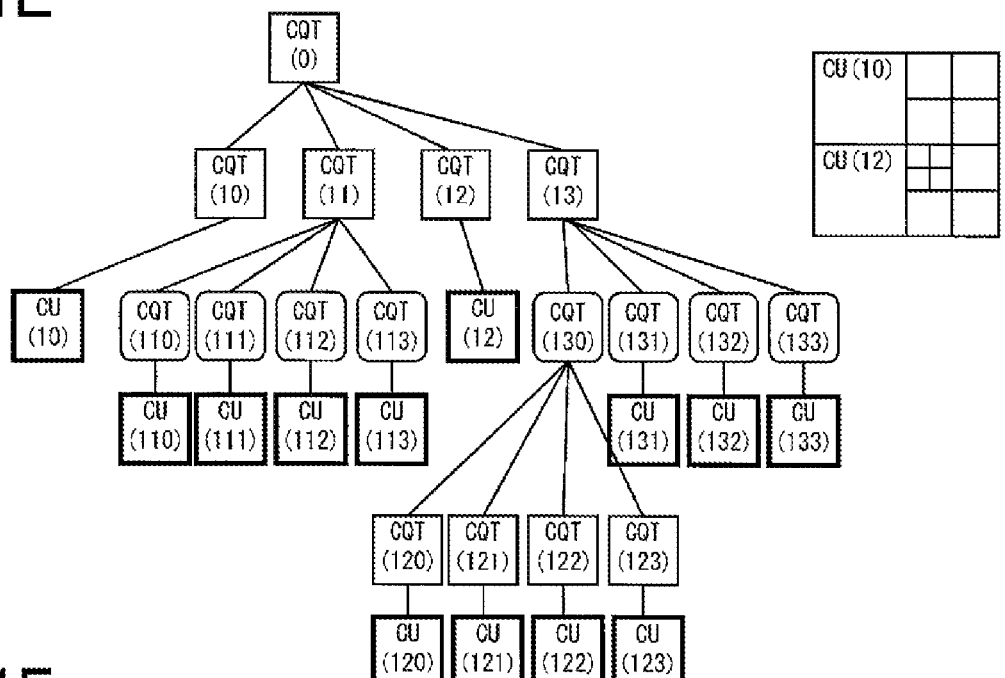

FIG. 2A
2Nx2N
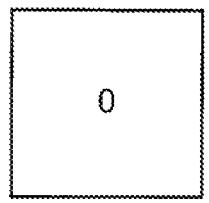
FIG. 2B
2NxN
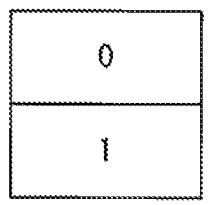
FIG. 2C
2NxnU
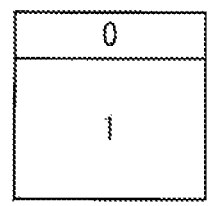
FIG. 2D
2NxnD
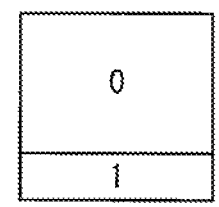
FIG. 2E
Nx2N
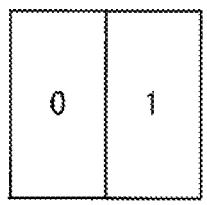
FIG. 2F
nLx2N
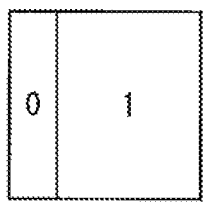
FIG. 2G
nRx2N
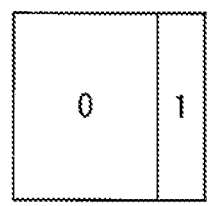
FIG. 2H
NxN
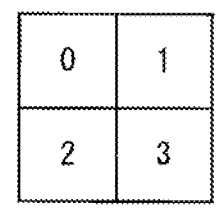
refIdxLX
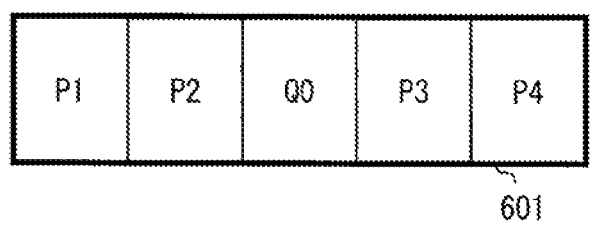
FIG. 3

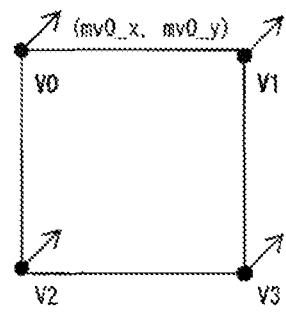
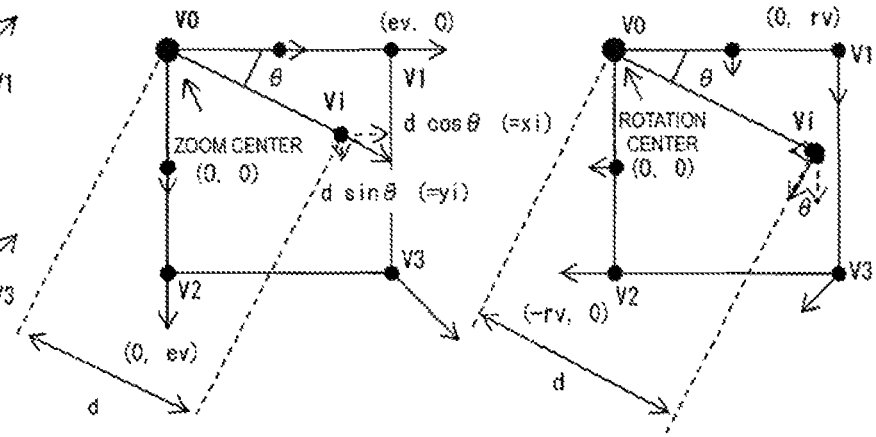
FIG. 15A
FIG. 15B
FIG. 15C

FIG. 16A $$\begin{pmatrix} MVi\_x \\ MVi\_y \end{pmatrix} = \begin{pmatrix} MV0\_x \\ MV0\_y \end{pmatrix} + \begin{pmatrix} xi & -yi \\ yi & xi \end{pmatrix} \begin{pmatrix} ev \\ rv \end{pmatrix}$$

FIG. 16B $$\begin{pmatrix} ev \\ rv \end{pmatrix} = \frac{1}{xi^2 + yi^2} \begin{pmatrix} xi & yi \\ -yi & xi \end{pmatrix} \begin{pmatrix} MVi\_x - MV0\_x \\ MVi\_y - MV0\_y \end{pmatrix}$$

FIG. 17A $\begin{pmatrix} ev \\ rv \end{pmatrix} = \frac{1}{W^2} \begin{pmatrix} W & 0 \\ 0 & W \end{pmatrix} \begin{pmatrix} MV1\_x - MV0\_x \\ MV1\_y - MV0\_y \end{pmatrix} = \frac{1}{W} \begin{pmatrix} MV1\_x - MV0\_x \\ MV1\_y - MV0\_y \end{pmatrix}$ FIG. 17B $\begin{pmatrix} ev \\ rv \end{pmatrix} = \frac{1}{H^2} \begin{pmatrix} 0 & H \\ -H & 0 \end{pmatrix} \begin{pmatrix} MV2\_x - MV0\_x \\ MV2\_y - MV0\_y \end{pmatrix} = \frac{1}{H} \begin{pmatrix} MV2\_y - MV0\_y \\ -(MV2\_x - MV0\_x) \end{pmatrix}$ FIG. 17C $\begin{pmatrix} ev \\ rv \end{pmatrix} = \frac{1}{2W^2} \begin{pmatrix} W & W \\ -W & W \end{pmatrix} \begin{pmatrix} MV3\_x - MV0\_x \\ MV3\_y - MV0\_y \end{pmatrix} = \frac{1}{2W} \begin{pmatrix} 1 & 1 \\ -1 & 1 \end{pmatrix} \begin{pmatrix} MV3\_x - MV0\_x \\ MV3\_y - MV0\_y \end{pmatrix}$ $$\begin{pmatrix} ev \\ rv \end{pmatrix} = \frac{1}{xk^2 + yk^2} \begin{pmatrix} xk & yk \\ -yk & xk \end{pmatrix} \begin{pmatrix} MVk\_x - MV0\_x \\ MVk\_y - MV0\_y \end{pmatrix}$$

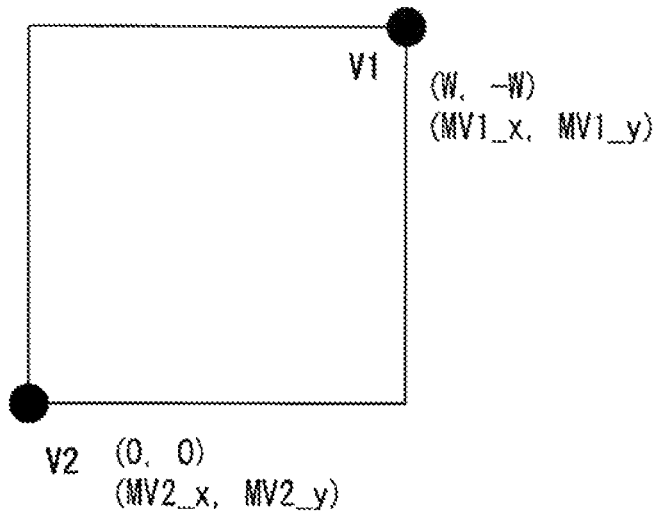

FIG. 23B $$\begin{pmatrix} ev \\ rv \end{pmatrix} = \frac{1}{2W^2} \begin{pmatrix} W & -W \\ W & W \end{pmatrix} \begin{pmatrix} MV1\_x - MV2\_x \\ MV1\_y - MV2\_y \end{pmatrix} = \frac{1}{2W} \begin{pmatrix} 1 & -1 \\ 1 & 1 \end{pmatrix} \begin{pmatrix} MV1\_x - MV2\_x \\ MV1\_y - MV2\_y \end{pmatrix}$$

FIG. 23C

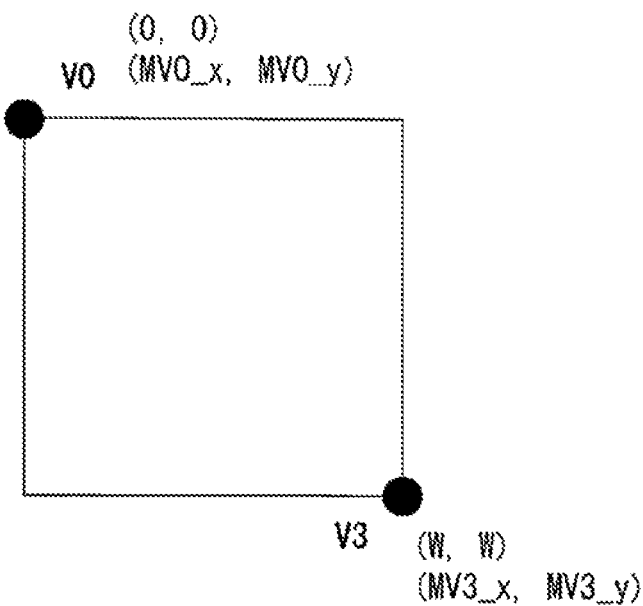

FIG. 23D $$\begin{pmatrix} ev \\ rv \end{pmatrix} = \frac{1}{2W^2} \begin{pmatrix} W & W \\ -W & W \end{pmatrix} \begin{pmatrix} MV3\_x - MV0\_x \\ MV3\_y - MV0\_y \end{pmatrix} = \frac{1}{2W} \begin{pmatrix} 1 & 1 \\ -1 & 1 \end{pmatrix} \begin{pmatrix} MV3\_x - MV0\_x \\ MV3\_y - MV0\_y \end{pmatrix}$$

FIG. 31A

| | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( CuPredMode[ x0 ][ y0 ] != MODE_INTRA \|\| log2CbSize == MinCbLog2SizeY ) | |
|       part_mode | ae(v) |

FIG. 31B

| CuPredMode[ xCb ][ yCb ] | part_mode | PartMode | Bin string | | | |
|---|---|---|---|---|---|---|
| | | | log2CbSize > MinCbLog2SizeY | | log2CbSize == MinCbLog2SizeY | |
| | | | !amp_enabled_flag | amp_enabled_flag | log2CbSize == 3 | log2CbSize > 3 |
| MODE_INTRA | 0 | PART_2Nx2N | - | - | 1 | 1 |
| | 1 | PART_NxN | - | - | 0 | 0 |
| MODE_INTER | 0 | PART_2Nx2N | 1 | 1 | 1 | 1 |
| | 1 | PART_2NxN | 01 | 01 | 0 | 01 |
| | 2 | PART_Nx2N | 00 | 00 | - | 001 |
| | 3 | PART_NxN | - | - | - | 000 |
| | 4 | PART_2NxnU | - | 0100 | - | - |
| | 5 | PART_2NxnD | - | 0101 | - | - |
| | 6 | PART_nLx2N | - | 0000 | - | - |
| | 7 | PART_nRx2N | - | 0001 | - | - |

| | Descriptor |
|---|---|
| prediction_unit( x0, y0, nPbW, nPbH ) { | |
|   if( cu_skip_flag[ x0 ][ y0 ] ) { | |
|     if( isNeighbourAffine ) | |
|       pu_affine_enable_flag[ x0 ][ y0 ] | ae(v) |
|     if( MaxNumMergeCand > 1 && !affine_enable_flag ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( isNeighbourAffine && part_mode == 2Nx2N ) | |
|         pu_affine_enable_flag[ x0 ][ y0 ] | ae(v) |
|       if( MaxNumMergeCand > 1 && !pu_affine_enable_flag ) | |
|         merge_idx[ x0 ][ y0 ] | ae(v) |
|     } else { | |
|       if( nPbW > 8 && part_mode == 2Nx2N ) | |
|         pu_affine_enable_flag[ x0 ][ y0 ] | ae(v) |
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         mvd_coding( x0, y0, 1 ) | |
|         mvp_l1_flag[ x0 ][ y0 ] | ae(v) |
|       } | |
|     } | |
|   } | |
| } | |

FIG. 32

| | Descriptor |
|---|---|
| mvd_coding( x0, y0, refList ) { | |
|   for (i = 0; affine_enable_flag ? 2 : 1; i++) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
|   } | |
| } | |

FIG. 33

| | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( CuPredMode[ x0 ][ y0 ] != MODE_INTRA \|\| log2CbSize == MinCbLog2SizeY ) | |
|       part_mode | ae(v) |
|     pbOffset = ( PartMode == PART_NxN ) ? ( nCbS / 2 ) : nCbS | |
|     for( j = 0; j < nCbS; j = j + pbOffset ) | |
|       for( i = 0; i < nCbS; i = i + pbOffset ) | |
|         prev_intra_luma_pred_flag[ x0 + i ][ y0 + j ] | ae(v) |
|     for( j = 0; j < nCbS; j = j + pbOffset ) | |
|       for( i = 0; i < nCbS; i = i + pbOffset ) | |
|         if( prev_intra_luma_pred_flag[ x0 + i ][ y0 + j ] ) | |
|           mpm_idx[ x0 + i ][ y0 + j ] | ae(v) |
|         else | |
|           rem_intra_luma_pred_mode[ x0 + i ][ y0 + j ] | ae(v) |
|         intra_chroma_pred_mode[ x0 + i ][ y0 + j ] | ae(v) |
|     } | |
|   } else { | |
|     if( PartMode == PART_2Nx2N ) | |
|       prediction_unit( x0, y0, nCbS, nCbS ) | |
|     else if( PartMode == PART_2NxN ) { | |
|       prediction_unit( x0, y0, nCbS, nCbS / 2 ) | |
|       prediction_unit( x0, y0 + ( nCbS / 2 ), nCbS, nCbS / 2 ) | |
|     } else if( PartMode == PART_Nx2N ) { | |
|       prediction_unit( x0, y0, nCbS / 2, nCbS ) | |
|       prediction_unit( x0 + ( nCbS / 2 ), y0, nCbS / 2, nCbS ) | |
|     } else if( PartMode == PART_2NxnU ) { | |
|       prediction_unit( x0, y0, nCbS, nCbS / 4 ) | |
|       prediction_unit( x0, y0 + ( nCbS / 4 ), nCbS, nCbS * 3 / 4 ) | |
|     } else if( PartMode == PART_2NxnD ) { | |
|       prediction_unit( x0, y0, nCbS, nCbS * 3 / 4 ) | |
|       prediction_unit( x0, y0 + ( nCbS * 3 / 4 ), nCbS, nCbS / 4 ) | |
|     } else if( PartMode == PART_nLx2N ) { | |
|       prediction_unit( x0, y0, nCbS / 4, nCbS ) | |
|       prediction_unit( x0 + ( nCbS / 4 ), y0, nCbS * 3 / 4, nCbS ) | |
|     } else if( PartMode == PART_nRx2N ) { | |
|       prediction_unit( x0, y0, nCbS * 3 / 4, nCbS ) | |
|       prediction_unit( x0 + ( nCbS * 3 / 4 ), y0, nCbS / 4, nCbS ) | |
|     } else { /* PART_NxN */ | |
|       prediction_unit( x0, y0, nCbS / 2, nCbS / 2 ) | |
|       prediction_unit( x0 + ( nCbS / 2 ), y0, nCbS / 2, nCbS / 2 ) | |
|       prediction_unit( x0, y0 + ( nCbS / 2 ), nCbS / 2, nCbS / 2 ) | |
|       prediction_unit( x0 + ( nCbS / 2 ), y0 + ( nCbS / 2 ), nCbS / 2, nCbS / 2 ) | |
|     } | |
|   } | |
|   if( !pcm_flag[ x0 ][ y0 ] ) { | |
|     if( CuPredMode[ x0 ][ y0 ] != MODE_INTRA && | |
|       !( PartMode == PART_2Nx2N && merge_flag[ x0 ][ y0 ] ) ) | |
|       rqt_root_cbf | ae(v) |
|     if( rqt_root_cbf ) { | |
|       MaxTrafoDepth = ( CuPredMode[ x0 ][ y0 ] == MODE_INTRA ? | |
|         ( max_transform_hierarchy_depth_intra + IntraSplitFlag ) : | |
|         max_transform_hierarchy_depth_inter ) | |
|       transform_tree( x0, y0, x0, y0, log2CbSize, 0, 0 ) | |
|     } | |
|   } | |
| } | |

FIG. 34

| | Descriptor |
|---|---|
| prediction_unit( x0, y0, nPbW, nPbH ) { | |
|   if( cu_skip_flag[ x0 ][ y0 ] ) { | |
|     if( isNeighbourAffine ) | |
|       pu_affine_enable_flag[ x0 ][ y0 ] | ae(v) |
|     if( MaxNumMergeCand > 1 && !affine_enable_flag ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( isNeighbourAffine && part_mode == 2Nx2N ) | |
|         pu_affine_enable_flag[ x0 ][ y0 ] | ae(v) |
|       if( MaxNumMergeCand > 1 ) | |
|         merge_idx[ x0 ][ y0 ] | ae(v) |
|     } else { | |
|       if( nPbW > 8 && part_mode == Nx2N ) | |
|         pu_affine_enable_flag[ x0 ][ y0 ] | ae(v) |
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         mvd_coding( x0, y0, 1 ) | |
|         mvp_l1_flag[ x0 ][ y0 ] | ae(v) |
|       } | |
|     } | |
|   } | |
| } | |

FIG. 35

| CuPredMode[ xCb ][ yCb ] | part_mode | PartMode | pu_affine_enable_flag | Bin string |  |  |  |
|---|---|---|---|---|---|---|---|
| | | | | log2CbSize > MinCbLog2SizeY | | log2CbSize == MinCbLog2SizeY | |
| | | | | !amp_enabled_flag | amp_enabled_flag | log2CbSize == 3 | log2CbSize > 3 |
| MODE_INTRA | 0 | PART_2Nx2N | 0 | - | - | 1 | 1 |
| | 1 | PART_NxN | 0 | - | - | 0 | 0 |
| MODE_INTER | 0 | PART_2Nx2N | 0 | 1 | 1 | 1 | 1 |
| | 1 | PART_2NxN | 0 | 001 | 0011 | 001 | 001 |
| | 2 | PART_Nx2N | 0 | 000 | 0001 | 000 | 0001 |
| | 3 | PART_NxN | 0 | - | - | - | 0000 |
| | 4 | PART_2NxnU | 0 | - | 00100 | - | - |
| | 5 | PART_2NxnD | 0 | - | 00101 | - | - |
| | 6 | PART_nLx2N | 0 | - | 00000 | - | - |
| | 7 | PART_nRx2N | 0 | - | 00001 | - | - |
| | 8 | PART_Nx2N | 1 | 01 | 01 | 01 | 01 |

FIG. 36

| prediction_unit( x0, y0, nPbW, nPbH ) { | Descriptor |
|---|---|
|   if( cu_skip_flag[ x0 ][ y0 ] ) { | |
|     if( isNeighbourAffine ) | |
|       pu_affine_enable_flag[ x0 ][ y0 ] | ae(v) |
|     if( MaxNumMergeCand > 1 && !pu_affine_enable_flag ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( isNeighbourAffine && part_mode == PART_2Nx2N ) | |
|         pu_affine_enable_flag[ x0 ][ y0 ] | ae(v) |
|       if( MaxNumMergeCand > 1 && !pu_affine_enable_flag ) | |
|         merge_idx[ x0 ][ y0 ] | ae(v) |
|     } else { | |
|       if( part_mode == PART_2NxN \|\| part_mode == PART_Nx2N ) | |
|         pu_affine_enable_flag[ x0 ][ y0 ] | ae(v) |
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         mvd_coding( x0, y0, 1 ) | |
|         mvp_l1_flag[ x0 ][ y0 ] | ae(v) |
|       } | |
|     } | |
|   } | |
| } | |

FIG. 37

| CuPredMode[xCb][yCb] | part_mode | PartMode | pu_affine_enable_flag | Bin string | | | |
|---|---|---|---|---|---|---|---|
| | | | | log2CbSize > MinCbLog2SizeY | | log2CbSize == MinCbLog2SizeY | |
| | | | | !amp_enabled_flag | amp_enabled_flag | log2CbSize == 3 | log2CbSize > 3 |
| MODE_INTRA | 0 | PART_2Nx2N | 0 | - | - | 1 | 1 |
| | 1 | PART_NxN | 0 | - | - | 0 | 0 |
| MODE_INTER | 0 | PART_2Nx2N | 0 | 1 | 1 | 1 | 1 |
| | 1 | PART_2NxN | 0 | 010 | 0101 | 010 | 010 |
| | 2 | PART_Nx2N | 0 | 000 | 0001 | 000 | 0010 |
| | 3 | PART_NxN | 0 | - | - | - | 000 |
| | 4 | PART_2NxnU | 0 | - | 01000 | - | - |
| | 5 | PART_2NxnD | 0 | - | 01001 | - | - |
| | 6 | PART_nLx2N | 0 | - | 00000 | - | - |
| | 7 | PART_nRx2N | 0 | - | 00001 | - | - |
| | 8 | PART_2NxN | 1 | 011 | 011 | 011 | 011 |
| | 9 | PART_Nx2N | 1 | 001 | 001 | 001 | 0011 |

FIG. 38

PREDICTION IMAGE GENERATION DEVICE, VIDEO DECODING DEVICE, AND VIDEO CODING DEVICE

TECHNICAL FIELD

An embodiment of the disclosure relates to a prediction image generation device, a video decoding device, and a video coding device.

BACKGROUND ART

In order to efficiently transmit or record a video, there have been used a video coding device which generates coded data by coding a video, and a video decoding device which generates a decoded image by decoding the coded data.

Specific examples of a video coding scheme include schemes proposed in H.264/MPEG-4. AVC or High-Efficiency Video Coding (HEVC).

In such a video coding scheme, images (pictures) constituting a video are managed by a hierarchical structure including slices obtained by diving the images, units of coding (also referred to as Coding Units) obtained by dividing the slices, and prediction units (PUs) and transform units (TUs) which are blocks obtained by dividing the coding units, and each block is coded/decoded.

In such a video coding scheme, generally, an input image is coded/decoded to obtain a local decoded image, based on which local decoded image a prediction image is generated, the prediction image is subtracted from the input image (original image) to obtain a prediction residual (also referred to as a "difference image" or a "residual image"), and the prediction residual is coded. Examples of a method for generating a prediction image include inter-prediction, and intra-prediction.

NPL 1 discloses a technology that, in the intra-prediction, a "simplified affine" motion model is applied which is higher in a degree of freedom than a translational motion model to represent rotation and zoom of a prediction image.

CITATION LIST

Non Patent Literature

NPL 1: Sixin Lin, Huanbang Chen, Hong ZHANG, Sychev Maxim, Haitao Yang, Jiantong Zhou, "Affine transform prediction for next generation video coding", ITU-T SG16 Doc. COM16-C1016, October 2015.

NPL 2: JCTVC-R1013 (HEVC version 2, RExt and SHVC and MV-HEVC)

NPL 3: JCTVC-V0031 (Draft of HEVC version 3, 3D-HEVC and SCC)

NPL 4: J. Chen, Y. Chen, M. Karczewicz, X. Li, H. Liu, L. Zhang, X. Zhao, "Coding tools investigation for next generation video coding", ITU-T SG16 Doc. COM16-C806, February 2015.

SUMMARY OF INVENTION

Technical Problem

However, in NPL 1, in a case that a motion vector of a decoding target block is derived using the affine prediction, two points having the same X-coordinate (horizontal coordinate) or Y-coordinate (vertical coordinate) which is located on a corner of the decoding target block are merely used as control points which are referred to for deriving the affine prediction motion vector. Therefore, the wider interval between the points used as the control points, the more accurately the motion vector can be derived with a higher probability. For this reason, there is a limitation to a case that the interval between the points used as the control points is equal to a length of one side of the decoding target block, which has been a first problem.

The derivation of the motion vector of the decoding target block using the affine prediction is made through processing in two steps, first, a motion vector of a representative point (block control point) on a decoding target block is derived from a motion vector of a prediction unit of a reference target candidate, and then, a motion vector of each sub-block of the decoding target block is derived from the motion vector of the block control point. In the case that the motion vector of each sub-block is derived through the two-step processing, a precision of the derived motion vector of each sub-block is likely decreased, which has been a second problem.

Further, a size of a prediction unit containing a reference point which is a point referred to for deriving a motion vector of the control point for the decoding target block is not taken into account, and thus the motion vector of the control point cannot be derived with high precision, which has been a third problem.

In addition, in the method of related art, in a case that a prediction mode is an AMVP prediction mode in which a difference vector is decoded, in a partition mode is 2N×2N, a flag, pu_affine_enable_flag, indicating whether to adopt the affine prediction is decoded. Therefore, even in the case of 2N×2N that the difference vector needs to be decoded only one time (a set of an X component and a Y component), two times decoding has been required only in the case that the affine prediction is used. This requires, in the processing for decoding the difference vector, a special loop process only in a case of affine transform, complexing the processing, which has been a fourth problem.

An embodiment of the disclosure attempts to solve any one of the above first to fourth problems, and has an object to provide an image decoding device, an image coding device, and a prediction image generation device which can suppress a code amount from increasing and generate a prediction image with higher precision.

Solution to Problem

In order to solve the above first problem, a prediction image generation device according to an aspect of the disclosure is a prediction image generation device for generating a prediction image used to code or decode a video, the prediction image generation device including a prediction vector compute unit, and a prediction image generation unit, wherein the prediction vector compute unit computes a motion vector of each of multiple prediction blocks which are included in a target block by referring to motion vectors at multiple first control points including two points at an interval longer than one side of the target block, and the prediction image generation unit refers to the motion vector of each prediction block to generate the prediction image.

In order to solve the above second problem, a prediction image generation device according to an aspect of the disclosure is a prediction image generation device for generating a prediction image used to code or decode a video, the prediction image generation device including a prediction vector compute unit, and a prediction image generation unit, wherein the prediction vector compute unit computes a motion vector of each of multiple prediction blocks which are included in a target block by referring to motion vectors at multiple first control points configured inside a prediction block which neighbors to the target block or shares a vertex with the target block, and a relative coordinate from any of the multiple first control points, and the prediction image generation unit refers to the motion vector of each prediction block to generate the prediction image.

In order to solve the above third problem, a prediction image generation device according to an aspect of the disclosure is a prediction image generation device for generating a prediction image used to code or decode a video, the prediction image generation device including a prediction vector compute unit, and a prediction image generation unit, wherein the prediction vector compute unit refers to motion vectors at multiple reference points inside a block containing a prediction block which shares a lower left vertex of a target block and neighbors to a left side of the target block, and a relative coordinate from any of the multiple reference points to compute motion vectors at multiple first control points, and computes a motion vector of each of multiple prediction blocks which are included in the target block by referring to the motion vectors at the multiple first control points, and the prediction image generation unit refers to the motion vector of each prediction block to generate the prediction image.

In order to solve the above first problem, a prediction image generation device according to an aspect of the disclosure is a prediction image generation device for generating a prediction image used to code or decode a video, the prediction image generation device including a prediction vector compute unit, and a prediction image generation unit, wherein the prediction vector compute unit computes a motion vector of each of multiple prediction blocks which are included in a target block by referring to motion vectors at multiple first control points configured at vertexes of the target block, and the prediction image generation unit refers to the motion vector of each prediction block to generate a prediction image. In a case that the motion vectors at both an upper right vertex and a lower left vertex of the target block exist as effective motion vectors, the prediction vector compute unit refers to, as the motion vectors at the multiple first control points, the motion vectors at the upper right vertex and the lower left vertex of the target block, and in a case that the motion vectors at both the upper right vertex and the lower left vertex of the target block does not exist as effective motion vectors, the prediction vector compute unit refers to, as the motion vectors at the multiple first control points, a vector existing as an effective motion vector among the motion vectors at the upper right vertex and the lower left vertex, and the motion vector at the upper left vertex of the target block as the motion vector at the first control point.

In order to solve the above fourth problem, a video decoding device according to an aspect of the disclosure is a video decoding device including a prediction image generation unit supporting affine prediction, wherein a flag specifying whether or not the affine prediction is used is decoded in the case that a merge flag merge_flag specifies that merge processing is not performed and that a syntax, part_mode, indicating a partition mode is N×2N or 2N×N.

In order to solve the above fourth problem, a video decoding device according to an aspect of the disclosure is a video decoding device including a prediction image generation unit supporting affine prediction, wherein a flag specifying whether or not the affine prediction is used is decoded in the case that a merge flag merge_flag specifies that merge processing is not performed and that a syntax, part_mode, indicating a partition mode is other than 2N×2N, and the partition mode is set to N×2N in the case that the flag specifies that the affine prediction is used.

In order to solve the above fourth problem, a video decoding device according to an aspect of the disclosure is a video decoding device including a prediction image generation unit supporting affine prediction, wherein in the case that a merge flag merge_flag specifies that merge processing is not performed and that a syntax, part_mode, indicating a partition mode is decoded, some of bits of binarization for the part_mode indicate a partition mode, and the partition mode indicates two modes in which the number of partitions is 2 (2N×N or N×2N), a flag specifying whether or not the affine prediction is used is included as one of other bits of the binarization for the syntax indicating the partition mode.

Advantageous Effects of Invention

According to an embodiment of the disclosure, it is possible to derive with high precision a motion vector of a control point for deriving a motion vector of a target block and a motion vector of a sub-block derived from the control point, allowing a prediction image with higher precision to be generated. Further, coding efficiencies of an image coding device and image decoding device can be improved.

BRIEF DESCRIPTION OF DRAWINGS

FIGS. 1A to 1F are diagrams illustrating a hierarchical structure of data of a coded stream according to the present embodiment.

FIGS. 2A to 2H are diagrams illustrating patterns for a PU partition mode. FIGS. 2A to 2H respectively illustrate partition shapes in cases that the PU partition mode is 2N×2N, 2N×N, 2N×nU, 2N×nD, N×2N, nL×2N, nR×2N, and N×N.

FIG. 3 is a conceptual diagram illustrating an example of a reference picture list.

FIGS. 15A to 15C are diagrams illustrating motion vectors which may be used in a motion model, in which FIG. 15A illustrates a translation vector, FIG. 15B illustrates a zoom vector, and FIG. 15C illustrates a rotation vector.

FIG. 16A illustrates an equation representing in a form of a matrix a general expression which expresses a motion vector at a point Vi (MVi_xi, MVi_yi), and FIG. 16B illustrates a general solution obtained by solving the equation in FIG. 16A in terms of a zoom vector and rotation vector.

FIGS. 17A to 17C illustrate general solutions derived in a pattern in which a calculator needs a less amount of calculation in deriving a general solution illustrated in FIG. 17B.

FIG. 22 is a general expression for deriving a motion vector of coordinates (xi, yi) from a location and motion vector of an arbitrary point Vk.

FIGS. 23A and 23B illustrate a case that a point V1 and a point V2 are used, and FIGS. 23C and 23D illustrate a case that a point V0 and a point V3 are used.

FIGS. 31A and 31B are examples of a syntax for a coding unit.

FIG. 32 is an example of a syntax for a prediction unit.

FIG. 33 is an example of a syntax for coding of a difference vector.

FIG. 34 is an example of a syntax for a coding unit.

FIG. 35 is another example of a syntax for a prediction unit.

FIG. 36 is an example of a binarization table for switching validation/invalidation of AMP depending on a value of a PU affine application flag, a partition type, and a CU size.

FIG. 37 is another example of a syntax for a prediction unit.

FIG. 38 is an example of another binarization table for switching validation/invalidation of AMP depending on a value of a PU affine application flag, a partition type, and a CU size.

FIG. 39A illustrates the transmission device equipped with the image coding device, and FIG. 39B illustrates the reception device equipped with the image decoding device.

FIG. 40A illustrates the recording device equipped with the image coding device, and FIG. 40B illustrates the reproducing device equipped with the image decoding device.

DESCRIPTION OF EMBODIMENTS

First Embodiment

Hereinafter, embodiments of the disclosure are described in detail with reference to the drawings.

Figure 14:
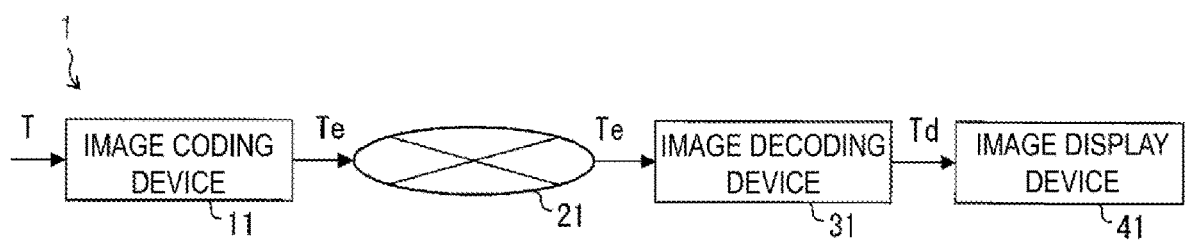
FIG. 14 is a schematic diagram illustrating a configuration of an image transmission system according to an embodiment of the disclosure.

FIG. 14 is a schematic diagram illustrating a configuration of an image transmission system 1 according to the present embodiment.

The image transmission system 1 is a system in which a code obtained by coding a coding target image is transmitted and the image obtained by decoding the transmitted code is displayed. The image transmission system 1 is configured to include an image coding device 11 (video coding device), a network 21, an image decoding device 31 (video decoding device), and an image display device 41.

Signals T representing an image of a single layer or multiple layers are input to the image coding device 11. A layer is a concept used to distinguish multiple pictures in a case that a certain time period is constituted by one or more pictures. For example, scalable coding applies in a case that the same picture is coded in multiple layers which are different in an image quality or resolution, and view scalable coding applies in a case that pictures different in a viewpoint are coded in multiple layers. In a case that prediction is performed between pictures of multiple layers (inter-layer prediction, inter-view prediction), the coding efficiency is highly improved. In a case also that prediction is not performed (simulcast), the coded data can be collected. The image coding device 11 and the image decoding device 31 may adopt a single layer image, or may perform an arbitrary combination of the scalable coding and the view scalable coding.

The network 21 transmits a coded stream Te generated by the image coding device 11 to the image decoding device 31. The network 21 includes the Internet, a Wide Area Network (WAN), or a Local Area Network (LAN), or a combination thereof. The network 21 is not necessarily limited to a bidirectional communication network, but may be a unidirectional or bidirectional communication network transmitting broadcast waves such as digital terrestrial broadcasting and satellite broadcasting. The network 21 may be substituted by a storage medium in which the coded stream Te is recorded such as a Digital Versatile Disc (DVD) and a Blue-ray Disc (BD).

The image decoding device 31 decodes each coded stream Te transmitted by the network 21, and generates one or multiple decoded layer images Td (decoded viewpoint images Td).

The image display device 41 displays all or some of one or multiple decoded layer images Td generated by the image decoding device 31. For example, in the view scalable coding, in the case of displaying all, a three-dimensional image (stereoscopic image) or free-viewpoint image is displayed, and in the case of displaying some, a two-dimensional image is displayed. The image display device 41 includes a display device, for example, a liquid crystal display and an organic Electro-luminescence (EL) display. In spatial scalable coding and SNR scalable coding, the image decoding device 31 and the image display device 41 display an enhancement layer image which is higher in an image quality in a case of having high processing capability, and display a base layer image for which processing capability and display capability are required not so much high as the enhancement layer in a case of having only lower processing capability.

Structure of Coded Stream Te

Before describing in detail, the image coding device 11 and the image decoding device 31 according to the present embodiment, a description is given of a data structure of the coded stream Te which is generated by the image coding device 11 and decoded by the image decoding device 31.

FIGS. 1A to 1F are diagrams illustrating a hierarchical structure of data in the coded stream Te. The coded stream Te exemplarily contains a sequence and multiple pictures constituting the sequence. FIGS. 1A to 1F are diagrams respectively illustrating a sequence layer specifying a sequence SEQ, a picture layer specifying a picture PICT, a slice layer specifying a slice S, a slice data layer specifying slice data, a coded tree layer specifying a coded tree unit included in the slice data, and a coded unit layer specifying a Coding Unit (CU) included in the coding tree.

Sequence Layer

The sequence layer specifies a set of data to which the image decoding device 31 refers in order to decode the sequence SEQ to be processed (hereinafter, also referred to as a target sequence). The sequence SEQ contains, as illustrated in FIG. 1A, a Video Parameter Set, a Sequence Parameter Set (SPS), a Picture Parameter Set (PPS), a picture PICT, and Supplemental Enhancement Information (SEI). Here, a value following "#" indicates a layer ID. FIGS. 1A to 1F illustrate an example in which there is coded data of #0 and #1, that is, a layer 0 and a layer 1, but types of layer and the number of layers are not limited thereto.

The video parameter set VPS specifies, for a video configured with multiple layers, set of coding parameters common to multiple videos and a set of coding parameters associated with multiple layers and individual layers contained in the video.

The sequence parameter set SPS specifies a set of coding parameters to which the image decoding device 31 refers in order to decode the target sequence. For example, a width and height of a picture are specified. There may be multiple SPSs. In this case, any of multiple SPSs is selected from the PPS.

The picture parameter set PPS specifies a set of coding parameters to which the image decoding device 31 refers in order to decode pictures in the target sequence. For example, the PPS includes a reference value of a quantization width (pic_init_qp_minus26) used to decode the picture and a flag indicating that a weighted prediction is applied (weighted_pred_flag). There may be multiple PPSs. In this case, any of multiple PPSs is selected from the pictures in the target sequence.

Picture Layer

The picture layer specifies a set of data to which the image decoding device 31 refers in order to decode a picture PICT to be processed (hereinafter, also referred to as a target picture). The picture PICT contains slices S0 to SNS−1 (NS represents the total number of slices contained in the picture PICT) as illustrated in FIG. 1B.

Hereinafter, the slices S0 to SNS−1 may be expressed with their suffixes omitted in a case of being not necessary to be distinguished from each other. The same holds for other data with a suffix which is contained in the coded stream Te described below.

Slice Layer

The slice layer specifies a set of data to which the image decoding device 31 refers in order to decode a slice S to be processed (also referred to as a target slice). The slice S contains a slice header SH and slice data SDATA, as illustrated in FIG. 1C.

The slice header SH contains a coding parameter group to which the image decoding device 31 refers in order to determine a method of decoding a target slice. Slice type specifying information specifying a slice type (slice_type) is an example of the coding parameter contained in the slice header SH.

Examples of the slice type specifiable by the slice type specifying information include (1) I slice that is coded using intra prediction only, (2) P slice that is coded using unidirectional prediction or intra-prediction, and (3) B slice that is coded using unidirectional prediction, bidirectional prediction, or intra prediction.

The slice header SH may include reference to the picture parameter set PPS (pic_parameter_set_id) which is contained in the above sequence layer.

Slice Data Layer

The slice data layer specifies a set of data to which the image decoding device 31 refers in order to decode slice data SDATA to be processed. The slice data SDATA contains a Coded Tree Block (CTB) as illustrated in FIG. 1D. The CTB is a block having a fixed size (e.g., 64×64) constituting a slice, and may be also referred to as a Largest Cording Unit (LCU) or a Coded Tree Unit (CTU).

Coding Tree Layer

The coded tree layer specifies a set of data to which the image decoding device 31 refers in order to decode a coded tree block to be processed as illustrated in FIG. 1E. The coded tree block is partitioned by recursive quadtree partitioning. A node of a tree structure obtained by the recursive quadtree partitioning is called a coding tree. An intermediate node of the quadtree is a Coded Quad Tree (CQT) and the coded tree block itself is specified as a top CQT. The CQT contains a split flag (split_flag), and is partitioned into four CQTs in a case that split_flag is 1. In a case that split_flag is 0, the CQT is not partitioned and has one Coded Unit (CU) as a node. The coded unit CU is a terminal node of the coded tree layer and is not partitioned any further in this layer. The coding unit CU is a basic unit for coding processing.

In a case that a size of the coded tree block CTB is 64×64 pixel, a size of the coded unit may be any of 64×64 pixel, 32×32 pixel, 16×16 pixel, and 8×8 pixel.

Coded Unit Layer

The coded unit layer specifies a set of data to which the image decoding device 31 refers in order to decode a coded unit to be processed, as illustrated in FIG. 1F. Specifically, the coding unit includes a coding tree, a prediction tree, a transform tree, and a CU header CUF. The coding tree specifies a split flag, a division pattern, a prediction mode, and the like.

The prediction tree specifies prediction information (reference picture index, motion vector, and the like) of each of prediction blocks which are obtained by partitioning the coded unit into one or multiple pieces. In other words, the prediction block/blocks is/are one or multiple non-overlapping areas which constitute the coding unit. The prediction tree includes one or multiple prediction blocks which are obtained by the above partitioning. Hereinafter, a unit of prediction obtained by further partitioning the prediction block is called a "sub-block". The sub-block (prediction block) is configured with one or multiples pixel. In a case that a size of the prediction block is equal to a size of the sub-block, the number of sub-blocks in the prediction block is one. In a case that a size of the prediction block is larger than a size of the sub-block, the prediction block is partitioned into the sub-blocks. For example, in a case that a size of the prediction block is 8×8 and a size of the sub-block is 4×4, the prediction block is partitioned horizontally into two and vertically into two to be partitioned into four sub-blocks.

Prediction processing is performed for each of these prediction blocks (sub-blocks). Hereinafter, the prediction block as a unit of prediction is also referred to as a prediction unit (PU).

A type of partition for the prediction tree is roughly classified into two for a case of the intra prediction and a case of the inter prediction. The intra prediction is prediction within an identical picture, and the inter prediction is prediction processing performed between pictures different from each other (e.g., between display times, between layer images).

In the case of the intra prediction, a partition method includes methods using 2N×2N (the same size as the coding unit) and N×N.

In the case of the inter prediction, a partition method includes coding in a PU partition mode (part_mode) in the coded data, and includes mothods using 2N×2N (the same size as the coding unit), 2N×N, 2N×nU, 2N×nD, N×2N, nL×2N, nR×2N, and N×N. Note that 2N×nU indicates that a 2N×2N coding unit are partitioned into two areas, 2N×0.5N and 2N×1.5N, in this order from the upside. 2N×nD indicates that a 2N×2N coding unit is partitioned into two areas, 2N×1.5N and 2N×0.5N, in this order from the upside. nL×2N indicates that a 2N×2N coding unit is partitioned into two areas, 0.5N×2N and 1.5N×2N, in this order from the left. nR×2N indicates that a 2N×2N coding unit is partitioned into two areas, 1.5N×2N and 0.5N×1.5N, in this order from the left. The number of partitions is any of 1, 2, or 4, and thus, the number of PUs included in the CU is 1 to 4. These PUs are expressed as PU0, PU1, PU2, and PU3 in this order.

Each of FIGS. 2A to 2H specifically illustrates a boundary location of PU partitioning in the CU for each partition type.

FIG. 2A illustrates a PU partition mode for 2N×2N in which the CU is not partitioned.

FIGS. 2B, 2C and 2D illustrate respectively partition shapes in cases that the PU partition modes are 2N×N, 2N×nU, and 2N×nD. Hereinafter, the partitions in the cases that the PU partition modes are 2N×N, 2N×nU, and 2N×nD are collectively referred to as a horizontally-long partition.

FIGS. 2E, 2F and 2G illustrate respectively partition shapes in the cases that the PU partition modes are N×2N, nL×2N, and nR×2N. Hereinafter, the partitions in the case that the PU partition modes are N×2N, nL×2N, and nR×2N are collectively referred to as a vertically-long partition.

The horizontally-long partition and the vertically-long partition are collectively referred to as a rectangular partition.

FIG. 2H illustrates a partition shape in a case that the PU partition mode is N×N. The PU partition modes in FIGS. 2A and 2H are also referred to as square partitioning based on their partition shapes. The PU partition modes in FIGS. 2B to 2G are also referred to as non-square partitioning.

In FIGS. 2A to 2H, the number assigned to each area indicates an identification number of the area, and the areas are processed in an order of the identification number. To be more specific, the identification number represents a scan order for partitioning.

In FIGS. 2A to 2H, assume that an upper left corner is a base point (origin) of the CU.

In the transform tree, the coding unit is partitioned into one or multiple transform blocks, and a location and size of each transform block is specified. In other words, the transform block/blocks is/are one or multiple non-overlapping areas which constitute the coding unit. The transform tree includes one or multiple transform blocks which are obtained by the above partitioning.

Partitioning in the transform tree includes that performed by allocating an area having the same size as the coding unit as a transform block, and that performed by the recursive quadtree partitioning similar to the partitioning of the tree block described above.

Transform processing is performed for each of these transform blocks. Hereinafter, the transform block as a unit of transform is also referred to as a transform unit (TU).

Prediction Parameter

A prediction image in a prediction unit is derived according to a prediction parameter associated with the prediction unit. The prediction parameter includes a prediction parameter for intra prediction or a prediction parameter for inter prediction. Hereinafter, the prediction parameter for inter prediction (inter-prediction parameter) is described. The inter-prediction parameter includes prediction list utilization flags predFlagL0 and predFlagL1, reference picture indices refIdxL0 and refIdxL1, and vectors mvL0 and mvL1. The prediction list utilization flags predFlagL0 and predFlagL1 are flags respectively indicating whether or not reference picture lists called L0 list and L1 list are used, and in a case that a value of each thereof is 1, the corresponding reference picture list is used. Here, assume that in a case that an expression "a flag indicating whether or not XX" is used herein, "1" corresponds to a case of XX and "0" corresponds to a case of not XX, and "1" represents true and "0" represents false in logical NOT, logical AND or the like (the same applies hereinafter). However, other values may be used as a true value or a false value in actual device or methods. A case that two reference picture lists are used, that is, a case of predFlagL0=1 and predFlagL1=1, corresponds to bi-prediction, and a case that one reference picture list is used, that is, a case of (predFlagL0, predFlagL1)=(1, 0) or (predFlagL0, predFlagL1)=(0, 1), corresponds to uni-prediction. Information on the prediction list utilization flag can be expressed by an inter-prediction flag inter_pred_ide described below. In general, a prediction image generation unit 308 (prediction image generation device) and prediction parameter memory 307 which are described below use the prediction list utilization flag, and in a case that information concerning which reference picture list is used or not is decoded from the coded data, the inter-prediction flag inter_pred_ide is used.

Examples of a syntax element for deriving the inter-prediction parameter included in the coded data include a partition mode part_mode, a merge flag merge_flag, a merge index merge_idx, an inter-prediction flag inter_pred_idc, a reference picture index refIdxLX, a prediction vector index mvp_LX_idx, and a difference vector mvdLX, for example.

Example of Reference Picture List

Figure 5:
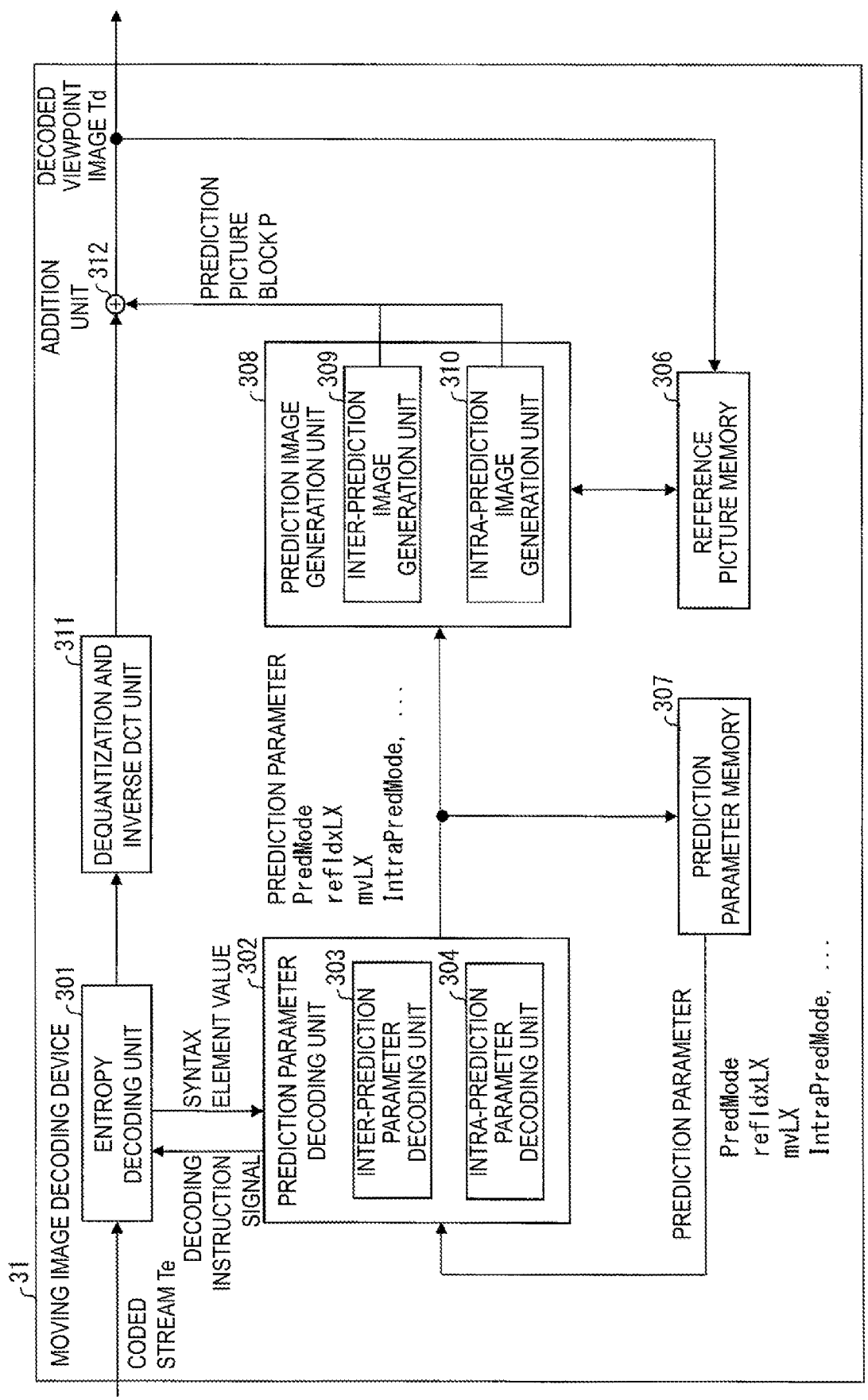
FIG. 5 is a schematic diagram illustrating a configuration of an image decoding device according to the present embodiment.

Next, a description is given of an example of the reference picture list. The reference picture list is a row constituted by the reference pictures stored in a reference picture memory 306 (FIG. 5). FIG. 3 is a conceptual diagram illustrating an example of the reference picture list. In a reference picture list 601, each of five rectangles horizontally aligned represents a reference picture. Signs P1, P2, Q0, P3, and P4 indicated from a left end to the right are signs representing corresponding reference pictures. The character "P" of P1 or the like represents a viewpoint P, and the character "Q" of Q0 represents a viewpoint Q different from the viewpoint P. A suffix of P or Q indicates a picture order count POC. A downward arrow immediately under "refIdxLX" represents that the reference picture index refIdxLX is an index for referring to a reference picture Q0 in the reference picture memory 306.

Example of Reference Pictures

Figure 4:
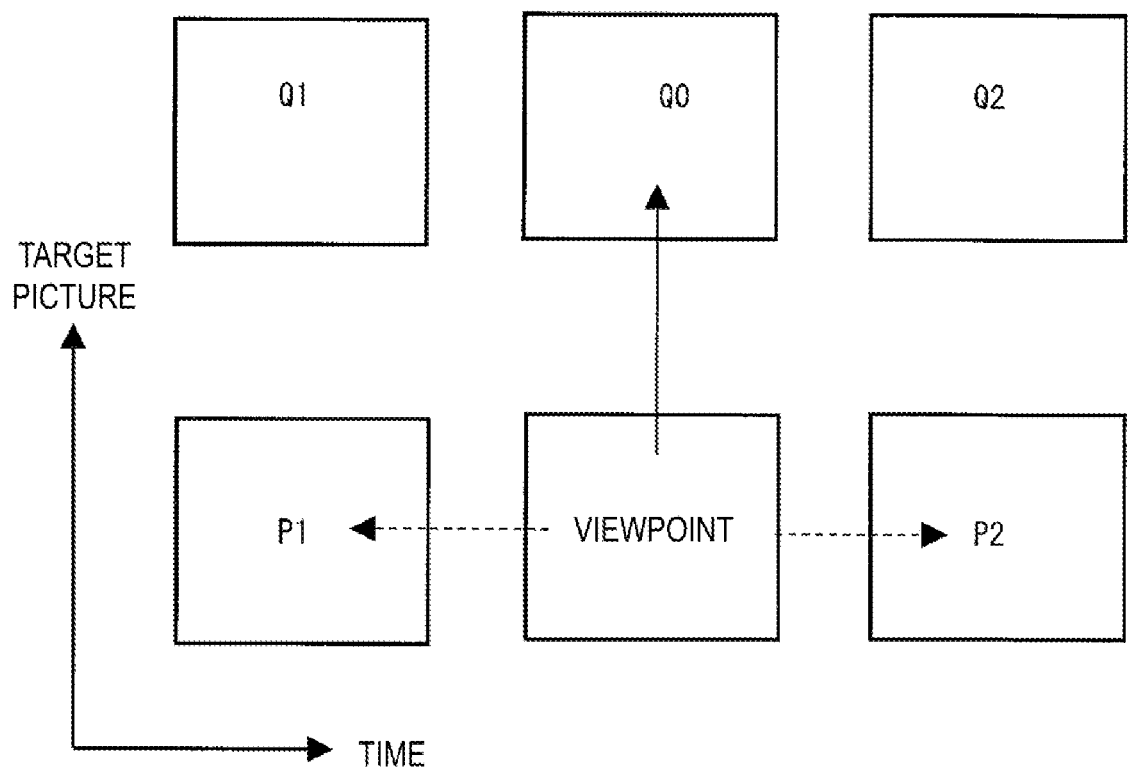
FIG. 4 is a conceptual diagram illustrating an example of reference pictures.

Next, a description is given of an example of the reference pictures which is used to derive a vector. FIG. 4 is a conceptual diagram illustrating an example of the reference pictures. In FIG. 4, a horizontal axis represents a display time and a vertical axis represents a viewpoint. Two rows and three columns of rectangles (six in total) illustrated in FIG. 4 represent pictures. The rectangle on a lower row and the second column from the left among six rectangles represents a decoding target picture (target picture) and the other five rectangles represent the reference pictures. The reference picture Q0 indicated by an upward arrow from the target picture is a picture the same as the target picture in a display time but different in a viewpoint. The reference picture Q0 is used in displacement prediction in which the target picture is used as a reference. The reference picture P1 indicated by a leftward arrow from target picture is the same as the target picture in a viewpoint and is a previous picture. The reference picture P2 indicated by a rightward arrow from the target picture is the same as the target picture in a viewpoint and is a future picture. The reference picture P1 or P2 is used in motion prediction in which the target picture is used as a reference.

Inter-Prediction Flag and Prediction List Utilization Flag A relationship between the inter-prediction flag and the prediction list utilization flags predFlagL0 and predFlagL1 is mutually convertible as below. Therefore, the prediction list utilization flag may be used as the inter-prediction parameter or inter-prediction flag may be used instead. In the following description, in determination using the prediction list utilization flag, the inter-prediction flag may be alternatively used. In contrast, in determination using the inter-prediction flag, the prediction list utilization flag may be alternatively used.

Inter-prediction flag=(predFlagL1<<1)+predFlagL0 predFlagL0=inter-prediction flag & 1 predFlagL1=inter-prediction flag>>1 where ">>" represents right shift and "<<" represents left shift.

Merge Prediction and AMVP Prediction

A prediction parameter decoding (coding) method includes a merge prediction (merge) mode and an Adaptive Motion Vector Prediction (AMVP) mode, and a merge flag merge_flag is a flag identifying these modes. In both the merge prediction mode and the AMVP mode, a prediction parameter for an already processed block is used to derive a prediction parameter for a target PU. The merge prediction mode is a mode in which a prediction list utilization flag predFlagLX (or inter-prediction flag inter_pred_idc), a reference picture index refIdxLX, and a motion vector mvLX are not included in the coded data, and the prediction parameter already derived for a neighboring PU is used as it is. The AMVP mode is a mode in which the inter-prediction flag inter_pred_idc, the reference picture index refIdxLX, and the motion vector mvLX are included in the coded data. The motion vector mvLX is coded as a prediction vector index mvp_LX_idx identifying the prediction vector mvpLX and as a difference vector mvdLX.

The inter-prediction flag inter_pred_idc is data indicating types and the number of the reference pictures, and has a value Pred_L0, Pred_L1, or Pred_Bi. Pred_L0 and Pred_L1 indicate that the reference pictures stored in the reference picture lists called L0 list and L1 list, respectively, are used, and indicate that one reference picture is used (uni-prediction). The predictions using L0 list and L1 list are called L0 prediction and L1 prediction, respectively. Pred_Bi indicates that two reference pictures are used (bi-prediction), and indicates that two reference pictures stored in L0 list and L1 list are used. The prediction vector index mvp_LX_idx is an index indicating a prediction vector, and the reference picture index refIdxLX is an index indicating a reference picture stored in the reference picture list. "LX" is a description method used in a case that the L0 prediction and the L1 prediction are not distinguished from each other, and a parameter for L0 list and a parameter for L1 list are distinguished by replacing "LX" with "L0" or "L1". For example, refIdxL0 is a reference picture index used for the L0 prediction, refIdxL1 is a reference picture index used for the L1 prediction, and refIdx (refIdxLX) is an expression used in a case that refIdxL0 and refIdxL1 are not distinguished from each other.

The merge index merge_idx is an index indicating that whether any prediction parameter is used as a prediction parameter for the decoding target block, among prediction parameter candidates (merge candidate) derived from the block on which the processing is completed.

The "target block" may be a prediction block higher by one hierarchy than multiple prediction blocks, or may be a coded unit including the multiple prediction blocks.

Motion Vector and Displacement Vector

The motion vector mvLX can be also separated into a motion vector in a narrow sense (narrow-sense motion vector) indicating a displacement amount between the blocks on two pictures which are different in times, and a displacement vector (disparity vector, parallax vector) indicating a displacement amount between two blocks which are the same in a time. In the following description, the motion vector and the displacement vector are not distinguished from each other, and merely referred to as the motion vector mvLX. The prediction vector and difference vector for the motion vector mvLX are called respectively a prediction vector mvpLX and a difference vector mvdLX. Whether the motion vector mvLX or the difference vector mvdLX is a motion vector or a displacement vector is identified using the reference picture index refIdxLX associated with the vector.

Configuration of Image Decoding Device

Next, a description is given of a configuration of an image decoding device 31 according to the present embodiment. FIG. 5 is a schematic diagram illustrating the configuration of the image decoding device 31 according to the present embodiment. The image decoding device 31 is configured to include an entropy decoding unit 301, a prediction parameter decoding unit 302, a reference picture memory (reference image storage unit, frame memory) 306, a prediction parameter memory (prediction parameter storage unit, frame memory) 307, a prediction image generation unit 308 (prediction image generation device), a dequantization and inverse DCT unit 311, and an addition unit 312 and a residual storage unit 313 (residual recording unit).

The prediction parameter decoding unit 302 is configured to include an inter-prediction parameter decoding unit 303 and an intra-prediction parameter decoding unit 304. The prediction image generation unit 308 is configured to include an inter-prediction image generation unit 309 and an intra-prediction image generation unit 310.

The entropy decoding unit 301 performs entropy decoding on the coded stream Te input from outside to demultiplex and decode individual codes (syntax elements). Examples of the demultiplexed codes include the prediction information for generating the prediction image and residual information for generating the difference image.

The entropy decoding unit 301 outputs some of the demultiplexed codes to the prediction parameter decoding unit 302. Some of the demultiplexed codes are, for example, a prediction mode PredMode, partition mode part_mode, merge flag merge_flag, merge index merge_idx, inter-prediction flag inter_pred_idc, reference picture index refIdxLX, prediction vector index mvp_LX_idx, and difference vector mvdLX. Control on which code is to be decoded is based on an instruction from the prediction parameter decoding unit 302. The entropy decoding unit 301 outputs quantized coefficients to the dequantization and inverse DCT unit 311. The quantized coefficients are coefficients obtained by performing Discrete Cosine Transform (DCT) on the residual signal and quantization in the coding processing.

The inter-prediction parameter decoding unit 303 refers to the prediction parameter stored in the prediction parameter memory 307, based on the code input from the entropy decoding unit 301 to decode the inter-prediction parameter.

The inter-prediction parameter decoding unit 303 outputs the decoded inter-prediction parameter to the prediction image generation unit 308 and stores the parameter in the prediction parameter memory 307. The inter-prediction parameter decoding unit 303 is described in detail later.

The intra-prediction parameter decoding unit 304 refers to the prediction parameter stored in the prediction parameter memory 307, based on the code input from the entropy decoding unit 301 to decode the intra-prediction parameter. The intra-prediction parameter is a parameter used for processing to predict the picture block within one picture, for example, an intra-prediction mode IntraPredMode. The intra-prediction parameter decoding unit 304 outputs the decoded intra-prediction parameter to the prediction image generation unit 308 and stores the parameter in the prediction parameter memory 307.

The intra-prediction parameter decoding unit 304 may derive an intra-prediction mode different in luminance and color difference. In this case, the intra-prediction parameter decoding unit 304 decodes a luminance prediction mode IntraPredModeY as a prediction parameter for luminance, and a color difference prediction mode IntraPredModeC as a prediction parameter for color difference. The luminance prediction mode IntraPredModeY includes 35 modes, which correspond to planar prediction (0), DC prediction (1), and angular predictions (2 to 34). The color difference prediction mode IntraPredModeC uses any of the planar prediction (0), the DC prediction (1), the angular predictions (2 to 34), and LM mode (35). The intra-prediction parameter decoding unit 304 decodes a flag indicating whether or not IntraPredModeC is the same mode as the luminance mode, may assign IntraPredModeC equal to IntraPredModeY in a case that the flag indicates the same mode as the luminance mode, and may decode the planar prediction (0), the DC prediction (1), the angular predictions (2 to 34), and the LM mode (35) as I IntraPredModeC in a case that the flag indicates a mode different from the luminance mode.

The reference picture memory 306 stores a block (reference picture block) of the reference pictures generated by the addition unit 312 in a predefined location for each decoding target picture and block.

The prediction parameter memory 307 stores the prediction parameters in a predefined location for each decoding target picture and block. To be more specific, the prediction parameter memory 307 stores the inter-prediction parameter decoded by the inter-prediction parameter decoding unit 303, the intra-prediction parameter decoded by the intra-prediction parameter decoding unit 304, and the prediction mode predMode demultiplexed by the entropy decoding unit 301. Examples of the stored inter-prediction parameter include the prediction list utilization flag predFlagLX (inter-prediction flag inter_pred_idc), the reference picture index refIdxLX, and the motion vector mvLX.

Input to the prediction image generation unit 308 are the prediction mode predMode which is input from the entropy decoding unit 301 and the prediction parameters from the prediction parameter decoding unit 302. The prediction image generation unit 308 reads out the reference picture from the reference picture memory 306. The prediction image generation unit 308 uses the input prediction parameters and the read out reference picture to generate a prediction picture block P (prediction image) in the prediction mode indicated by the prediction mode predMode.

Here, in a case that the prediction mode predMode indicates the inter-prediction mode, the inter-prediction image generation unit 309 uses the inter-prediction parameter input from the inter-prediction parameter decoding unit 303 and the read out reference picture to generate prediction picture block P by the inter-prediction. The prediction picture block P corresponds to the prediction unit PU. The PU corresponds to a part of a picture configured with multiple pixels as a unit for the prediction processing, that is, a decoding target block on which the prediction processing is performed in one time, as described above.

The inter-prediction image generation unit 309 reads out from the reference picture memory 306 a reference picture block at a location which is indicated by the motion vector mvLX with reference to the decoding target block from the reference picture indicated by the reference picture index refIdxLX with respect to the reference picture list having the prediction list utilization flag predFlagLX of 1 (L0 list or L1 list). The inter-prediction image generation unit 309 performs prediction on the read out reference picture block to generate the prediction picture block P. The inter-prediction image generation unit 309 outputs the generated prediction picture block P to the addition unit 312.

In a case that the prediction mode predMode indicates the intra-prediction mode, the intra-prediction image generation unit 310 uses the intra-prediction parameter input from the intra-prediction parameter decoding unit 304 and the read out reference picture to perform the intra-prediction. To be more specific, the intra-prediction image generation unit 310 reads out from the reference picture memory 306 the reference picture block in a predefined range from the decoding target block in the already decoded blocks of the decoding target picture. The predefined range is, for example, any of left, upper left, upper, and upper right neighboring blocks in a case that the decoding target block sequentially moves in an order of a so-called raster scan, and depends on the intra-prediction mode. The order of the raster scan is an order of sequentially moving from a left end to a right end of each row from an upper end to a bottom end in each picture.

The intra-prediction image generation unit 310 performs prediction on the read out reference picture block in the prediction mode indicated by the intra-prediction mode IntraPredMode to generate the prediction picture block. The intra-prediction image generation unit 310 outputs the generated prediction picture block P to the addition unit 312.

In a case that the intra-prediction parameter decoding unit 304 derives the intra-prediction mode different in luminance and color difference, the intra-prediction image generation unit 310 generates a luminance prediction picture block by any of the planar prediction (0), the DC prediction (1), and the angular predictions (2 to 34) depending on the luminance prediction mode IntraPredModeY, and generates a color difference prediction picture block by any of the planar prediction (0), the DC prediction (1), the angular predictions (2 to 344), and the LM mode (35) depending on the color difference prediction mode IntraPredModeC.

The dequantization and inverse DCT unit 311 dequantizes the quantized coefficients input from the entropy decoding unit 301 to find DCT coefficients. The dequantization and inverse DCT unit 311 performs Inverse Discrete Cosine Transform (inverse DCT) on the found DCT coefficients to compute a decoded residual signal. The dequantization and inverse DCT unit 311 outputs the computed decoded residual signal to the addition unit 312 and the residual storage unit 313.

The addition unit 312 adds the prediction picture blocks P input from the inter-prediction image generation unit 309 and intra-prediction image generation unit 310 and a signal value of the decoded residual signal input from the dequantization and inverse DCT unit 311 for each pixel to generate a reference picture block. The addition unit 312 stores the generated reference picture block in the reference picture memory 306, and outputs, to outside, a decoded layer image Td in which the generated reference picture blocks are integrated for each picture.

Configuration of Inter-Prediction Parameter Decoding Unit

Next, a description is given of a configuration of the inter-prediction parameter decoding unit 303.

Figure 6:
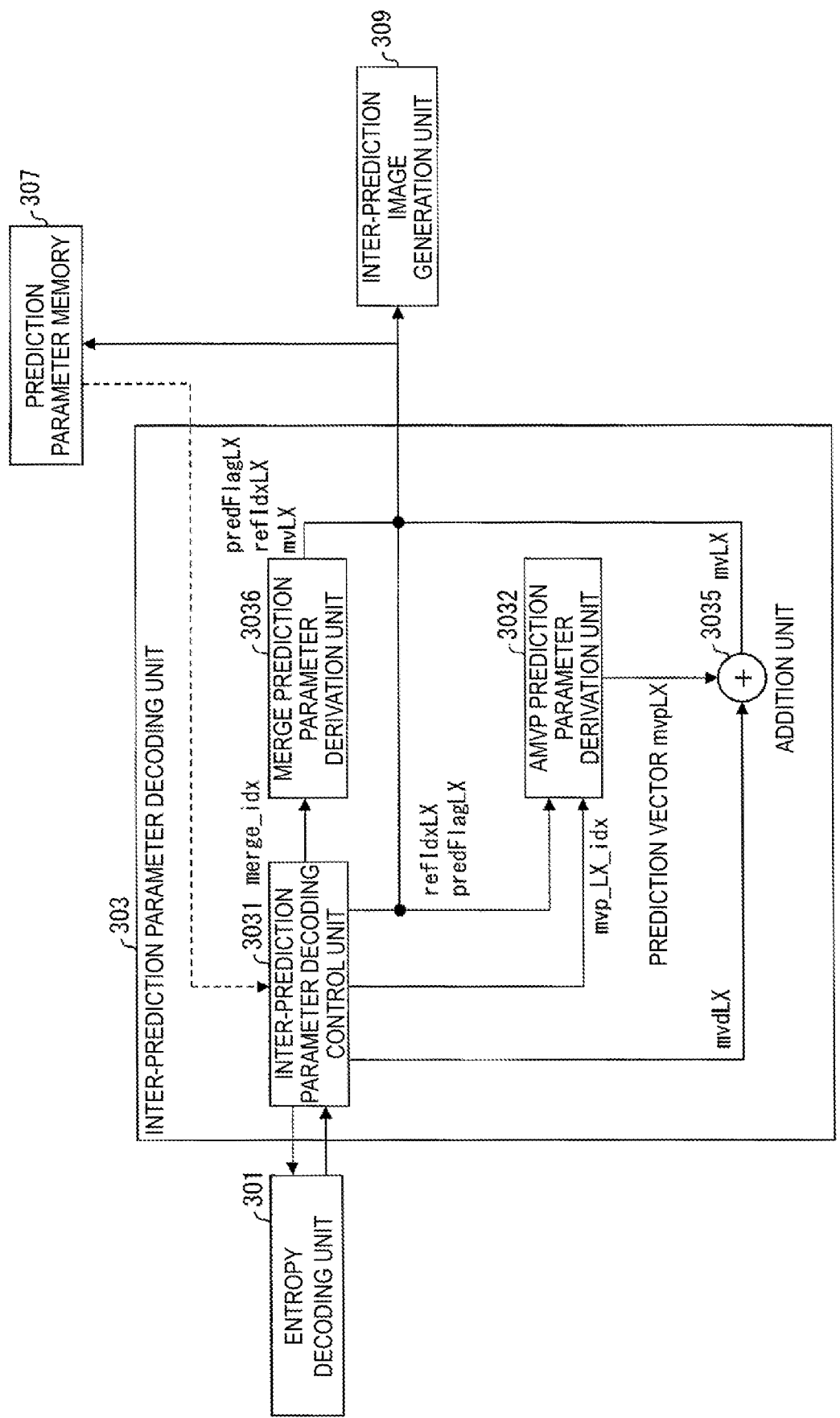
FIG. 6 is a schematic diagram illustrating a configuration of an inter-prediction parameter decoding unit according to the present embodiment.

FIG. 6 is a schematic diagram illustrating a configuration of the inter-prediction parameter decoding unit 303 according to the present embodiment. The inter-prediction parameter decoding unit 303 is configured to include an inter-prediction parameter decoding control unit 3031, an AMVP prediction parameter derivation unit 3032, an addition unit 3035, and a merge prediction parameter derivation unit 3036.

The inter-prediction parameter decoding control unit 3031 instructs the entropy decoding unit 301 to decode the code (syntax element) associated with the inter-prediction to extract the code (syntax element) included in the coded data, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

The inter-prediction parameter decoding control unit 3031 first extracts the merge flag. An expression that the inter-prediction parameter decoding control unit 3031 extracts a certain syntax element means instructing the entropy decoding unit 301 to decode a code of a certain syntax element to read the syntax element from the coded data. Here, in a case that the merge flag indicates a value of 1, that is, the merge prediction mode, the inter-prediction parameter decoding control unit 3031 extracts the merge index merge_idx as a prediction parameter related to the merge prediction. The inter-prediction parameter decoding control unit 3031 outputs the extracted merge index merge_idx to the merge prediction parameter derivation unit 3036.

In a case that the merge flag merge_flag is 0, that is, indicates the AMVP prediction mode, the inter-prediction parameter decoding control unit 3031 uses the entropy decoding unit 301 to extract the AMVP prediction parameter from the coded data. Examples of the AMVP prediction parameter include the inter-prediction flag inter_pred_idc, the reference picture index refIdxLX, the prediction vector index mvp_LX_idx, and the difference vector mvdLX. The inter-prediction parameter decoding control unit 3031 outputs the prediction list utilization flag predFlagLX derived from the extracted inter-prediction flag inter_pred_idc and the reference picture index refIdxLX to the AMVP prediction parameter derivation unit 3032 and the prediction image generation unit 308 (FIG. 5), and stores the predFlagLX and refIdxLX in the prediction parameter memory 307 (FIG. 5). The inter-prediction parameter decoding control unit 3031 outputs the extracted prediction vector index mvp_LX_idx to the AMVP prediction parameter derivation unit 3032. The inter-prediction parameter decoding control unit 3031 outputs the extracted difference vector mvdLX to the addition unit 3035.

Figure 7:
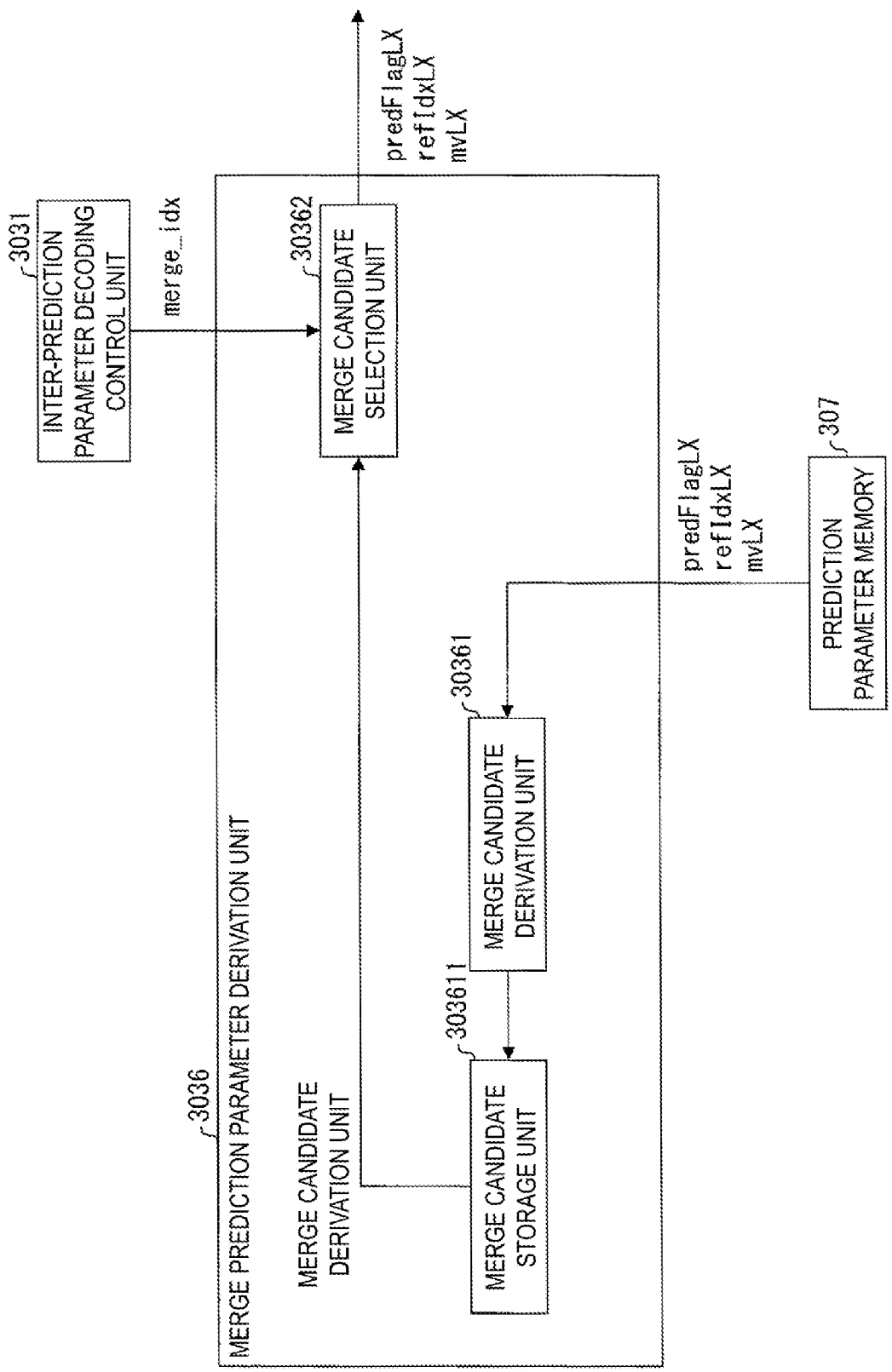
FIG. 7 is a schematic diagram illustrating a configuration of a merge prediction parameter derivation unit according to the present embodiment.

FIG. 7 is a schematic diagram illustrating a configuration of the merge prediction parameter derivation unit 3036 according to the present embodiment. The merge prediction parameter derivation unit 3036 includes a merge candidate derivation unit 30361 (prediction vector compute unit) and a merge candidate selection unit 30362. The merge candidate storage unit 303611 stores therein merge candidates input from the merge candidate derivation unit 30361. The merge candidate is configured to include the prediction list utilization flag predFlagLX, the motion vector mvLX, and the reference picture index refIdxLX. The merge candidate stored in the merge candidate storage unit 303611 is assigned with an index according to a prescribed rule.

The merge candidate derivation unit 30361 uses, without change, a motion vector and reference picture index refIdxLX of a neighboring block on which the decode processing has been already applied to derive the merge candidates. Affine prediction may be used as another way to derive the merge candidates. This method is described below in detail. The merge candidate derivation unit 30361 may use the affine prediction for spatial merge candidate derivation processing, temporal merging (inter-frame merge) candidate derivation processing, combined merge candidate derivation processing, and zero merge candidate derivation processing which are described below. The affine prediction is performed in units of sub-blocks, and the prediction parameter is stored in the prediction parameter memory 307 for each sub-block. Alternatively, the affine prediction may be performed in units of pixels.

Spatial Merge Candidate Derivation Processing

In the spatial merge candidate derivation processing, the merge candidate derivation unit 30361 reads out the prediction parameters (prediction list utilization flag predFlagLX, motion vector mvLX, reference picture index refIdxLX) stored by the prediction parameter memory 307 according to a prescribed rule to derive the read out prediction parameters as merge candidates. The read out prediction parameters are prediction parameters related to each of blocks in a predefined range from the decoding target block (e.g., all or some of blocks in contact with a lower left end, upper left end, and upper right end of the decoding target block). The merge candidates derived by the merge candidate derivation unit 30361 are stored in the merge candidate storage unit 303611.

Temporal Merge Candidate Derivation Processing

In the temporal merging derivation processing, the merge candidate derivation unit 30361 reads out, as merge candidates, prediction parameters for a block in a reference image including coordinates on the lower right of the decoding target block from the prediction parameter memory 307. As a method of specifying the reference image, the reference picture index refIdxLX specified in the slice header may be used, or a minimum one of the reference picture indices refIdxLX of the block neighboring to the decoding target block may be used, for example. The merge candidates derived by the merge candidate derivation unit 30361 are stored in the merge candidate storage unit 303611.

Combined Merge Candidate Derivation Processing

In the combined merging derivation processing, the merge candidate derivation unit 30361 uses vectors and reference picture indices of two different derived merge candidates which are already derived and stored in the merge candidate storage unit 303611 as vectors for L0 and L1, respectively, to combine, and thus derives a combined merge candidate. The merge candidate derived by the merge candidate derivation unit 30361 is stored in the merge candidate storage unit 303611.

Zero Merge Candidate Derivation Processing

In the zero merge candidate derivation processing, the merge candidate derivation unit 30361 derives a merge candidate including a reference picture index refIdxLX of 0 and both an X component and Y component of 0 of a motion vector mvLX. The merge candidate derived by the merge candidate derivation unit 30361 is stored in the merge candidate storage unit 303611.

The merge candidate selection unit 30362 selects, as an inter-prediction parameter for the target PU, a merge candidate assigned with an index corresponding to the merge index merge_idx input from the inter-prediction parameter decoding control unit 3031, among the merge candidates stored in the merge candidate storage unit 303611. The merge candidate selection unit 30362 stores the selected merge candidate in the prediction parameter memory 307 and outputs the candidate to the prediction image generation unit 308 (FIG. 5).

Figure 8:
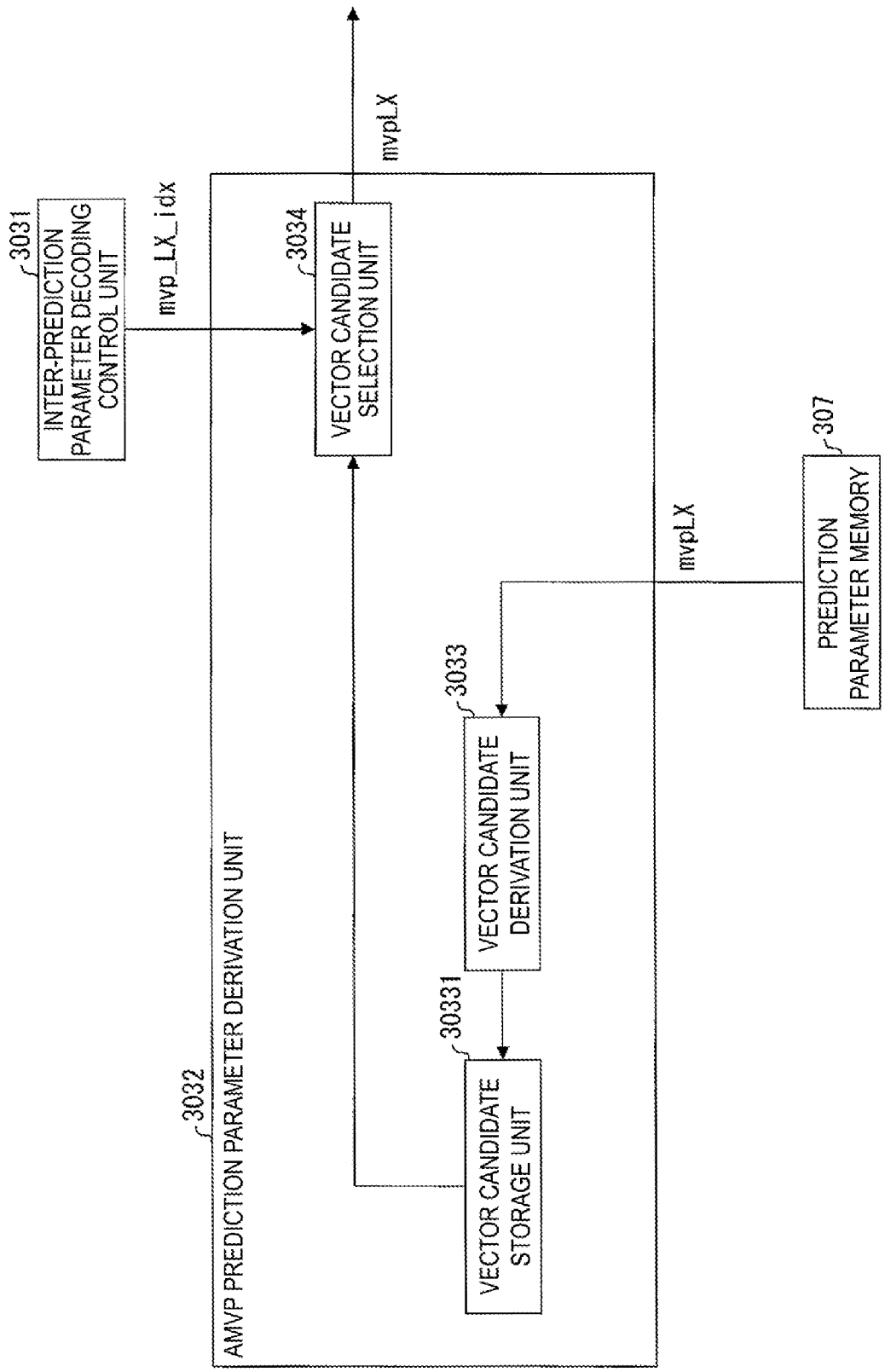
FIG. 8 is a schematic diagram illustrating a configuration of an AMVP prediction parameter derivation unit according to the present embodiment.

FIG. 8 is a schematic diagram illustrating a configuration of the AMVP prediction parameter derivation unit 3032 according to the present embodiment. The AMVP prediction parameter derivation unit 3032 includes a vector candidate derivation unit 3033 (vector compute unit) and a vector candidate selection unit 3034. The vector candidate derivation unit 3033 reads out the vector (motion vector or displacement vector) stored in the prediction parameter memory 307 as a prediction vector mvpLX, based on the reference picture index refIdx. The read out vector is a vector related to each of blocks in a predefined range from the decoding target block (e.g., all or some of blocks in contact with a lower left end, upper left end, and upper right end of the decoding target block).

The vector candidate selection unit 3034 selects, as a prediction vector mvpLX, a vector candidate indicated by the prediction vector index mvp_LX_idx input from the inter-prediction parameter decoding control unit 3031, among the vector candidates read out by the vector candidate derivation unit 3033. The vector candidate selection unit 3034 outputs the selected prediction vector mvpLX to the addition unit 3035.

The AMVP prediction parameter derivation unit 3032 includes the vector candidate derivation unit 3033 and the vector candidate selection unit 3034. A vector candidate storage 30331 stores therein the vector candidate input from the vector candidates derivation unit 3033. The vector candidates are configured to include the prediction vector mvpLX. The vector candidates stored in the vector candidate storage unit 30331 is assigned with an index according to a prescribed rule.

The vector candidate derivation unit 3033 uses the affine prediction to derive the vector candidates. The vector candidate derivation unit 3033 may use the affine prediction for spatial vector candidate derivation processing, temporal vector (inter-frame vector) candidate derivation processing, combined vector candidate derivation processing, and zero vector candidate derivation processing which are described below. The affine prediction is performed in units of sub-blocks, and the prediction parameter is stored in the prediction parameter memory 307 for each sub-block. Alternatively, the affine prediction may be performed in units of pixels.

Figure 9:
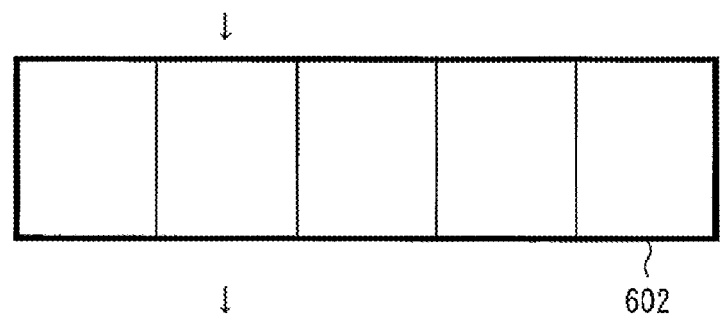
FIG. 9 is a conceptual diagram illustrating an example of vector candidates.

FIG. 9 is a conceptual diagram illustrating an example of the vector candidates. A prediction vector list 602 illustrated in FIG. 9 is a list constituted by multiple vector candidates derived by the vector candidate derivation unit 3033. In the prediction vector list 602, each of five rectangles horizontally aligned represents a region indicating a prediction vector. A downward arrow immediately under "mvp_LX_idx" located at the second rectangle from the left end, and mvpLX under the arrow indicate that the prediction vector index mvp_LX_idx is an index referring to the vector mvpLX in the prediction parameter memory 307.

The vector candidates are generated based on vectors related to blocks referred to by the vector candidate selection unit 3034. Each block referred to by the vector candidate selection unit 3034 may be a block on which the decode processing is completed, the block being in a predefined range from the decoding target block (e.g., neighboring block). The neighboring block includes a block spatially neighboring to the decoding target block such as a left block and an upper block, and a block temporally neighboring to the decoding target block such a block which is the same in a location as the decoding target block but different in a display time.

The addition unit 3035 adds the prediction vector mvpLX input from the AMVP prediction parameter derivation unit 3032 and the difference vector mvdLX input from the inter-prediction parameter decoding control unit 3031 to compute a motion vector mvLX. The addition unit 3035 outputs the computed motion vector mvLX to the prediction image generation unit 308 (FIG. 5).

Figure 10:
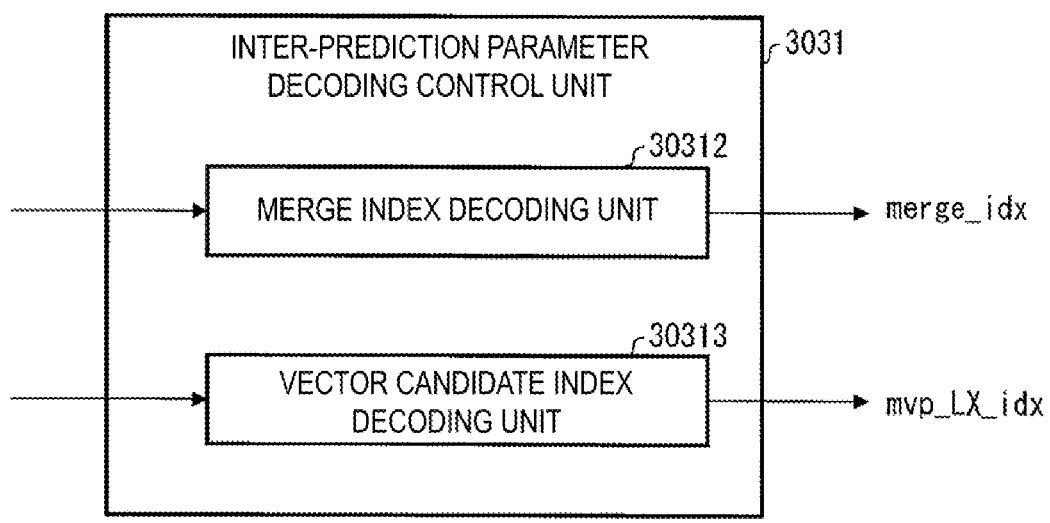
FIG. 10 is a schematic diagram illustrating a configuration of an inter-prediction parameter decoding control unit according to the present embodiment.

FIG. 10 is a schematic diagram illustrating a configuration of the inter-prediction parameter decoding control unit 3031 according to the present embodiment. The inter-prediction parameter decoding control unit 3031 is configured to include an addition prediction flag decoding unit 30311, a merge index decoding unit 30312, a vector candidate index decoding unit 30313, and a not illustrated partition mode decoding unit, merge flag decoding unit, inter-prediction flag decoding unit, reference picture index decoding unit, vector difference decoding unit, and the like. The partition mode decoding unit, the merge flag decoding unit, the merge index decoding unit, the inter-prediction flag decoding unit, the reference picture index decoding unit, the vector candidate index decoding unit 30313, and the vector difference decoding unit decode respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

Inter-Prediction Image Generation Unit 309

Figure 11:
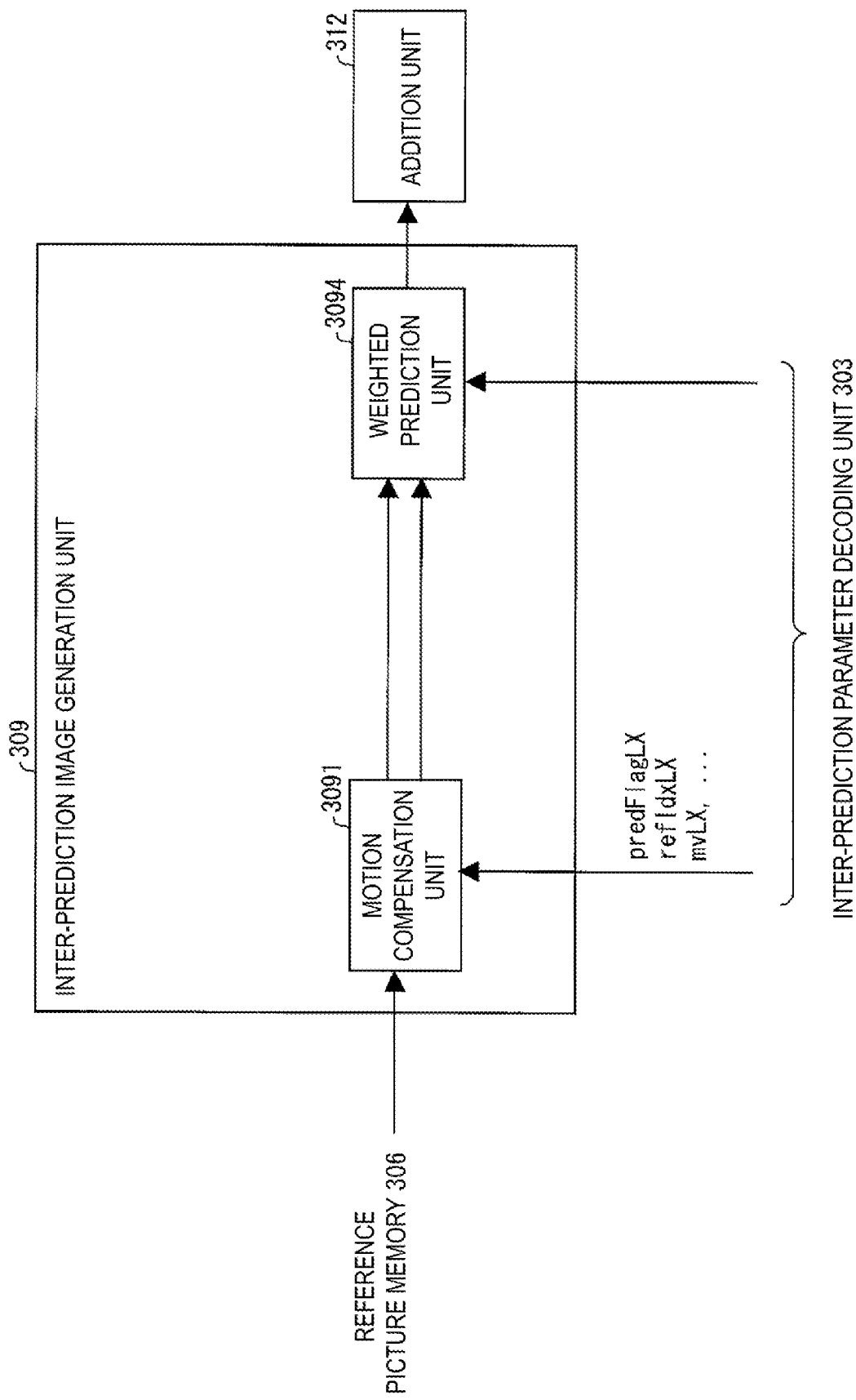
FIG. 11 is a schematic diagram illustrating a configuration of an inter-prediction image generation unit according to the present embodiment.

FIG. 11 is a schematic diagram illustrating a configuration of the inter-prediction image generation unit 309 according to the present embodiment. The inter-prediction image generation unit 309 is configured to include a motion compensation unit 3091 and a weighted prediction unit 3094.

Motion Compensation

The motion compensation unit 3091 reads out from the reference picture memory 306 a block which is displaced by a motion vector mvLX from a starting point as a location of the decoding target block for the reference picture specified by the reference picture index refIdxLX, based on the prediction list utilization flag predFlagLX, reference picture index refIdxLX, and motion vector mvLX that are input from the inter-prediction parameter decoding unit 303 to generate a motion compensation image. Here, in a case that the motion vector mvLX is not an integer vector, a motion compensation image is generated by filtering called a motion compensation filter for generating a pixel at fractional position. Hereinafter, an L0 prediction motion compensation image is called predSamplesL0 and an L1 prediction motion compensation image is called predSamplesL1. These images are called predSamplesLX when not distinguished.

Weighted Prediction

The weighted prediction unit 3094 multiplies an input motion disparity image predSamplesLX by weight coefficients to generate a prediction picture block P (prediction image). The input motion disparity image predSamplesLX in the case of the residual prediction is an image on which the residual prediction is applied. In a case that one of reference list utilization flags (predFlagL0 or predFlagL1) is 1 (that is, in a case of the uni-prediction) and the weighted prediction is not used, processing by the following equation is performed to conform the input motion disparity image predSamplesLX (LX is L0 or L1) to the number of pixel bits.

predSamples[x][y]=Clip3(0,(1<<bitDepth)−1,(predSamplesLX[x][y]+offset1>>shift1)

where shift1=14−bitDepth, offset1=1<<(shift1−1).

In a case that both of the reference list utilization flags (predFlagL0 or predFlagL1) are 1 (that is, in a case of the bi-prediction) and the weighted prediction is not used, processing by the following equation is performed to average the input motion disparity images predSamplesL0 and predSamplesL1 to be conformed to the number of pixel bits.

predSamples[x][y]=Clip3(0,(1<<bitDepth)−1,(predSamplesL0[x][y]+predSamplesL1[x][y]+offset2)>>shift2)

where shift2=15−bitDepth, offset2=1<<(shift2−1).

Furthermore, in a case of the uni-prediction and that the weighted prediction is performed, the weighted prediction unit 3094 derives a weighted prediction coefficient w0 and an offset o0 from the coded data and performs processing by the following equation.

predSamples[x][y]=Clip3(0,(1<<bitDepth)−1,((predSamplesLX[x][y]*w0+2 log 2WD−1)>>log 2WD)+o0)

where log 2WD represents a variable indicating a prescribed shift amount.

Further, in a case of the bi-prediction and that the weighted prediction is performed, the weighted prediction unit 3094 derives weighted prediction coefficients w0, w1, o0, and o1 from the coded data and performs processing by the following equation.

predSamples[x][y]=Clip3(0,(1<<bitDepth)−1,(predSamplesL0[x][y]*w0+predSamplesL1[x][y]*w1+((o0+o1+1)<<log 2WD))>>(log 2WD+1))

<Example of Derivation of Merge Candidate or Vector Candidate Using Affine Prediction>

Hereinafter, a description is given of a specific example of deriving the merge candidate or vector candidate using the affine prediction performed in the merge candidate derivation unit 30361 or vector candidate derivation unit 3033 with reference to FIG. 15A to FIG. 30.

Processing described below may be performed in any mode of the merge prediction mode and the AMVP mode. To be more specific, the processing described below may be performed by the merge candidate derivation unit 30361 or the vector candidate derivation unit 3033. Therefore, the merge candidate derivation unit 30361 and the vector candidate derivation unit 3033 may not be specifically distinguished from each other and merely referred to as the "candidate derivation unit" (prediction vector compute unit), and the merge candidate and the vector candidate may not be specifically distinguished from each other and merely referred to as the "candidate". To be more specific, in a case the derivation processing is performed by the merge candidate derivation unit 30361, the "candidate" refers to the merge candidate, and in a case that the derivation processing is performed by the vector candidate derivation unit 3033, the "candidate" refers to the vector candidate. The number of candidates of the merge candidate and vector candidate may be 1. To be more specific, the prediction vector derived by candidate derivation unit may be used, as it is, as the merge prediction motion vector (in the case of the merge prediction mode) and the prediction vector before adding the difference vector (in the case of the AMVP mode).

Basic Equation of Affine Transform

First, an affine motion model used when the candidate derivation unit derives a candidate will be described with reference to FIG. 15A to FIG. 18. FIGS. 15A to 15C are diagrams illustrating motion vectors which may be used in a motion model, in which FIG. 15A illustrates a translation vector component mv, FIG. 15B illustrates a zoom vector component, and FIG. 15C illustrates a rotation vector component. In FIG. 18, an upper left vertex of the decoding target block (prediction target block, target block) is a point V0, a vertex on the right of the point V0 is a point V1, a vertex under the point V0 is a point V2, and a vertex on the right of the point V2 is a point V3. Here, when a location of the upper left vertex is used as a reference to configure coordinates to assume that a location of the point V0 is (0, 0), a width of the decoding target block is W, and a height is H, locations of the point V1, point V2, and point V3 with the point V0 being used as a reference can be represented as (W, 0), (0, H), and (W, H), respectively.

In the affine prediction according to the present embodiment, the motion vector of each point is composed of a sum (composition) of a translation vector component, a zoom vector component, and a rotation vector component. FIG. 15A illustrates the translation vector components of the points of the decoding target block. As illustrated in the drawing, all translation vector components my at an arbitrary point Vi existing on a location (xi, yi) are equally (mv0_x, mv0_y).

FIG. 15B illustrates the zoom vector component when the point V0 is a zoom center (0, 0). The zoom center is a point not changing before and after zooming. A zoom vector at an arbitrary point Vi existing on the location (xi, yi) which is on a line obtained by rotating a side connecting the point V0 with the point V1 clockwise by an angle of 0 has a magnitude (absolute value) proportional to a distance d from the zoom center of the point V0 to the point Vi and a direction from the zoom center of the point V0 to the point Vi. Therefore, the zoom vector component of the point Vi can be expressed by a product of a unit zoom amount ev (zoom parameter ev) and (d cos θ, d sin θ). The character "d" represents a distance between the point V0 and the point Vi as described above. Further, θ=arctan (yi/xi) holds.

FIG. 15C illustrates the rotation vector component when the point V0 is a rotation center (0, 0). A rotation parameter rv at an arbitrary point Vi existing on the location (xi, yi) which is on a line obtained by rotating a side connecting the point V0 with the point V1 clockwise by an angle of θ has a magnitude (absolute value) proportional to a distance d from the rotation center of the point V0 to the point Vi and a direction perpendicular to a direction from the rotation center of the point V0 to the point Vi. Therefore, the rotation vector component of the point Vi can be expressed by a product of a unit rotation amount rv (rotation parameter rv) and (d sin θ, d cos θ). The character "d" represents a distance between the point V0 and the point Vi, and when the location of the point V0 is (0, 0), $d=(xi^2+yi^2)^{1/2}$ holds. Further, θ=arctan (yi/xi) holds. Depending on a configuration method of the angle θ, polarity of the rotation parameter rv may be reversed.

A motion vector (MVi_xi, MVi_yi) at the point Vi derived by composing the motion vector components illustrated in FIGS. 15A to 15C is as below.

$$MVi\_x = mv\_x + ev*d \cos\theta - rv*d \sin\theta$$

$$MVi\_y = mv\_y + rv*d \cos\theta + ev*d \sin\theta$$

Here, because d cos θ=xi and d sin θ=yi, the location (0, 0), a motion vector (MVi_x, MVi_y) of the point Vi on the location (xi, yi) with a starting point being the point V0 of a motion vector (mv_x, my_y) can be found by a general expression (eq1) below, using a motion vector of a zoom and rotation center (translation vector mv_x, mv_y), the zoom parameter ev, and the rotation parameter rv. Note that the location (xi, yi) may be a point inside or outside the target block.

$$MVi\_x = mv\_x + ev*xi - rv*yi$$

$$MVi\_y = mv\_y + rv*xi + ev*yi \quad (eq1)$$

It should be noted that these expressions do not include "d". Pay attention to that the location (xi, yi) of the point Vi which is a derivation target of the affine prediction herein is a relative position with a starting point being a point of the zoom and rotation center (called a base reference point, V0 here). In a case that a location (Vi_x, Vi_y) of the point Vi as the derivation target is not relative coordinates from the base reference point V0 but a location in another coordinate system (e.g., coordinates in the picture, coordinates in the CU, coordinates in the PU), an affine prediction motion vector is derived after subtracting a location of the base reference point ((V0_x, V0_y) in the case of the point V0) from a target location and converting into a relative location (xi, yi) with a starting point being the base reference point (the same applies hereinafter).

The zoom parameter ev and the rotation parameter rv are collectively called an affine parameter. Further, a translational component (mv_x, my_y) may be included in the affine parameter. The zoom parameter ev and the rotation parameter rv are not limited to the above described unit amounts, and values obtained by multiplying a prescribed constant (e.g., a distance d between the control points) may be used for the parameters.

Here, motion vectors at the locations of the points V0 to V2 which are points on the block can be derived by substituting the specific locations of the points in (xi, yi) of the general expression (eq1) as below, the motion vector at the point $V0:(x0,y0)=(0,0)$ is
$(MV0\_x, MV0\_y)=(mv\_x, mv\_y)$, the motion vector at the point $V1:(x1,y1)=(W,0)$ is
$(MV1\_x, MV1\_y)=(mv\_x+ev*W, mv\_y+rv*W)$, and
the motion vector at the point $V2:(x2,y2)=(0,H)$
is $(MV2\_x, MV2\_y)=(mv\_x-rv*H, mv\_y+ev*H)$.

In contrast, in a case that locations of two points and motion vectors are obtained, mv_x, mv_y, ev, and rv can be derived as below. For example, in a case that the point V0 and the point V1 are obtained, mv_x, mv_y, ev, and rv can be derived as below.

$$mv\_x = MV0\_x$$

$$mv\_y = MV0\_y$$

$$ev = (MV1\_x - MV0\_x)/W$$

$$rv = (MV1\_y - MV0\_y)/W$$

General Solution Related to Motion Vector

FIG. 16A illustrates an equation representing in a matrix form an equation for deriving the general expression (eq1) expressing the motion vector (MVi_x, MVi_y) at the point Vi in a case that an affine prediction parameter (MV0_x, MV0_y, ev, rv) is given, and (b) is an equation for deriving an affine prediction parameter (ev, rv) from the motion vectors (MV0_x, MV0_y) and (MVi_x, MVi_y) at two points. The equation (b) is a general solution which resolves (a) for the zoom parameter ev and rotation parameter rv. As said before, (MV0_x, MV0_y) is the motion vector of the base reference point and (xi, yi) is the relative position with a starting point being the base reference point.

The candidate derivation unit derives the zoom parameter ev and the rotation parameter rv from the motion vectors of two or more control points (also called a reference points in a case of merely being referred to) according to the general solution in FIG. 16B or the like, and further derives the motion vector of the sub-block as a derivation target using the derived zoom parameter ev and rotation parameter rv according to the general expression in FIG. 16A or the like.

In a case that the zoom parameter ev and the rotation parameter rv are actually derived by the general solution illustrated in FIG. 16B, the calculator needs a less amount of calculation when a value of $(xi^2+yi^2)$ is a power of 2, for example. Therefore, two points having such a positional relationship are adequately referred to. The inventors limit patterns meeting a condition that the value of $(xi^2+yi^2)$ is a power of 2 to three patterns as below. FIG. 17A to 17C illustrate general solutions derived in three patterns in which the calculator needs a less amount of calculation in deriving the general solution illustrated in FIG. 16B.

Pattern 1: Case of (x1, y1)=(W, 0): Horizontal Location

FIG. 17A illustrates a general solution in a pattern 1 in a case that Y-coordinates of two referred points are equal (in a case of a horizontal location). In this case, the translation vector (mv_x, mv_y), the zoom parameter ev, and the rotation parameter rv are respectively derived based on a motion vector (MV0_x, MV0_y) of a base control point (point V0) that is one of the control points, a horizontal motion vector difference between the reference points (MV1_x–MV0_x), and a vertical motion vector difference between the reference points (MV1_y–MV0_y). Specifically, the above derivations are made according to Equation AF_HOR that has derivation equations below for the horizontal location, $$ev=(MV1\_x-MV0\_x)/W$$

$$rv=(MV1\_y-MV0\_y)/W$$

(Equation AF_HOR). Division by W can be replaced with a right shift by a shift satisfying shift=log 2(W). Furthermore, in the above equations, the affine parameter (ev, rv) is derived through normalization by dividing by a distance W between the control points, but in order to keep precision of the affine parameter (ev, rv) high, a value obtained by multiplying by a prescribed value or a value not divided by the distance W between the control points (a value obtained by multiplying by the distance W between the control points) may be derived as the affine parameter (ev, rv). In this case, the derivation is as below:

$$ev=(MV1\_x-MV0\_x)$$

$$rv=(MV1\_y-MV0\_y).$$

Pattern 2: Case of (x2, y2)=(0, H): Vertical Location

FIG. 17B illustrates a general solution in a pattern 2 in a case that X-coordinates of two referred points are equal (in a case of a vertical location). In this case, the translation vector (my_x, mv_y), the zoom parameter ev, and the rotation parameter rv are respectively derived based on a motion vector (MV0_x, MV0_y) of the base control point (point V0) that is one of the control points, a vertical motion vector difference between the control points (MV2_y–MV0_y), and a vertical motion vector difference between the control points (MV2_x–MV0_x). Specifically, the above derivations are made according to Equations AF_VER that has derivation equations below for the vertical location:

$$mv\_x=MV0\_x$$

$$mv\_y=MV0\_y$$

$$ev=(MV2\_y-MV0\_y)/H$$

$$rv=-(MV2\_x-MV0\_x)/H.$$

Division by H can be replaced with a right shift by a shift satisfying shift=log 2(H). Furthermore, in order to keep the precision of the affine prediction parameter (ev, rv) high, a prescribed value, for example, a value obtained by multiplying by a distance H between the control point may be derived as the zoom parameter ev or the rotation parameter rv. In this case, the derivation is as below:

$$ev=(MV2\_y-MV0\_y)$$

$$rv=-(MV2\_x-MV0\_x).$$

Pattern 3: Case of (x3, y3)=(W, W): Diagonal Location

FIG. 17C illustrates a general solution in a pattern 3 in a case that a horizontal distance (absolute value difference between the X-coordinates) and vertical distance (absolute value difference between the Y-coordinates) between two referred points are equal to each other. In this case, ev and rv are respectively derived as below, $$ev=(MV3\_x-MV0\_x+MV3\_y-MV0\_y)/2W$$

$$rv=(-MV3\_x+MV0\_x+MV3\_y-MV0\_y)/2W$$

(Equation AF_HORVER1 as derivation equations for a horizontal vertical location). Division by 2 W can be replaced with a right shift by a shift satisfying shift=log 2(2W)=1+log 2(W). Furthermore, in order to keep the precision of the affine prediction parameter (ev, rv) high, a prescribed value, for example, a value obtained by multiplying by twice the distance W between the control points may be derived as the zoom parameter ev or the rotation parameter rv. In this case, the derivation is made as below:

$$ev=(MV3\_x-MV0\_x+MV3\_y-MV0\_y)$$

$$rv=(-MV3\_x+MV0\_x+MV3\_y-MV0\_y).$$

The diagonal location in the pattern 3 can also apply to a case of a positional relationship between a lower left vertex and an upper right vertex of arectrangle, that is, (x3, y3)=(W, −W). In this case, ev and rv are respectively derived as below, $$ev=(MV3\_x-MV0\_x-MV3\_y+MV0\_y)/2W$$

$$rv=(MV3\_x-MV0\_x+MV3\_y-MV0\_y)/2W$$

(another Equation AF_HORVER2 as derivation equations for horizontal vertical). Division by 2 W can be replaced with a right shift by a shift satisfying shift=log 2(2 W)=1+log 2(W). Furthermore, in order to keep the precision of the affine prediction parameter (ev, rv) high, a value obtained by multiplying by twice the distance W between the control points may be derived as the zoom parameter ev or the rotation parameter rv. In this case, the derivation is made as below:

$$ev=(MV3\_x-MV0\_x-MV3\_y+MV0\_y)$$

$$rv=(MV3\_x-MV0\_x+MV3\_y-MV0\_y)$$

Pattern X: Arbitrary Location Here, the equations of the horizontal location, vertical location, and diagonal location are simplified equations of the general solution in FIG. 22 for the general expression (eq1) with respect to the specific positional relationship. Therefore, even in a case that the positional relationship between the control points is other than the horizontal location, the vertical location, and the diagonal location, by using the general solution (Equation AF_GEN), the affine prediction parameters ev and rv can be found from locations and motion vectors of two or more arbitrary points.

Zoom Center and Rotation Center

Figure 18A:
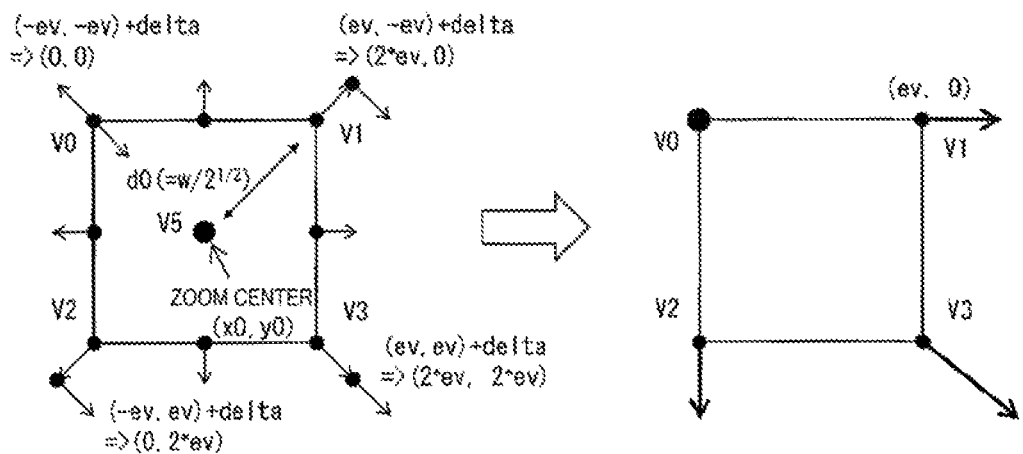
FIG. 18A illustrates a diagram illustrating motion vectors at points in an example of a case that a zoom center is a center position of a block.
Figure 18B:
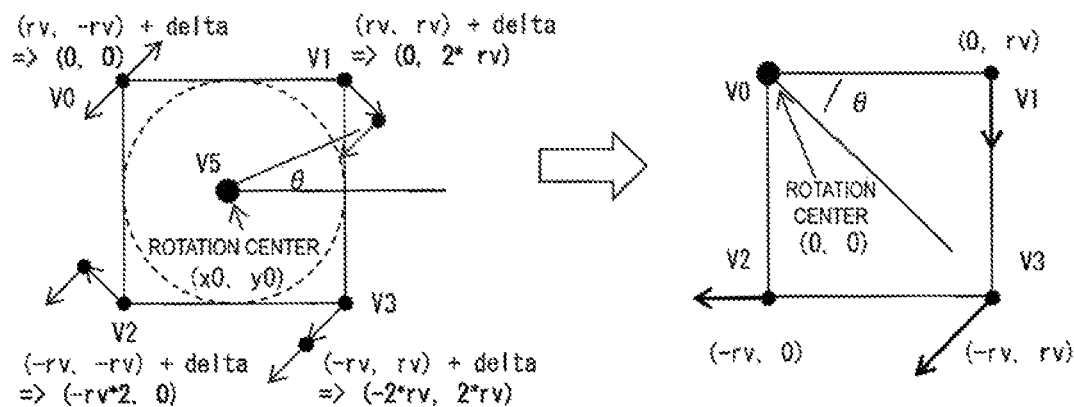
FIG. 18B illustrates a diagram illustrating motion vectors at points in an example of a case that a rotation center is a center position of a block.

In the above example, the case is described in which each of the zoom center position and the rotation center position is the point at the corner of each prediction block included in the decoding target block (point V0 in FIGS. 15A to 15C), but no limitation is put on the center positions. To be more specific, even in a case that the zoom center position and the rotation center position are at a center of each prediction block, the same conclusion is obtained for the basic equation of the affine transform and the general solution related to the motion vector. Here, this is described using FIGS. 18A and 18B. FIG. 18A is a diagram illustrating the zoom vector components at points in an example of a case that the zoom center is a center position of the decoding target block and FIG. 18B is a diagram illustrating rotation vector components at points in an example of a case that the rotation center is a center position of the decoding target block. Here, for the purpose of simple description, an example is described in which a shape of the decoding target block is a square having a side length of W.

As illustrated in FIG. 18A, in a case that a point V5 at the center of the decoding target block is the zoom center, the zoom vectors at the points including the points V0 to V3 are like those depicted by arrows, for example. Assuming that a location of the point V5 is (x0, y0), a distance d0 from the point V5 to the point V1, for example, is found as below:

$$d0 = W/2^{1/2}$$

When the zoom center is the point V5, the zoom vector at the point V0 is (−ev, −ev), and when added to this value is a difference, delta, for correcting the zoom center from the point V5 to the point V0, the zoom vector at the point V0 is (0, 0).

Similarly, when the zoom center is the point V5, the zoom vector at the point V1 is (ev, −ev), and when added to this value is a difference, delta, for correcting the zoom center from the point V5 to the point V0, the zoom vector at the point V1 is (2*ev, 0).

Similarly, the zoom vector at the point V2 is (0, 2*ev), and the zoom vector at the point V3 is (2*ev, 2*ev).

In this way, when a fixed difference vector delta is added to the zoom vector component for the zoom center being the point V5, the resultant coincides with the zoom vector component when the zoom center is the point V0.

Next, as illustrated in FIG. 18B, in a case that the point V5 at the center of the decoding target block is the rotation center, the rotation vectors at the points including the points V0 to V3 are like those depicted by arrows, for example. Assuming that a location of the point V5 is (x0, y0), when the rotation center is the point V5, the rotation vector at the point V0 is (rv, −rv), and when added to this value is a difference, delta, for correcting the zoom center from the point V5 to the point V0, the rotation vector at the point V0 is (0, 0).

Similarly, when the rotation center is the point V5, the zoom vector at the point V1 is (rv, rv), and when added to this value is a difference, delta, for correcting the rotation center from the point V5 to the point V0, the rotation vector at the point V1 is (0, 2*rv).

Similarly, the rotation vector at the point V2 is (−2*rv, 0) and the zoom vector at the point V3 is (−2*rv, 2*rv).

In this way, when a fixed difference vector delta is added to the zoom vector component when the rotation center is the point V5, the resultant coincides with the rotation vector component when the rotation center is the point V0.

Therefore, even in the case that the zoom and rotation centers are the point V5, the affine prediction in the case that the zoom and rotation centers are the point V0 (general expression, FIGS. 16A and 16B) is applicable.

Affine Prediction

The affine prediction is a technique in which an affine motion model is used to generate the motion vector mvLX of the sub-block. A degree of freedom of a so-called "translational" motion model is 2, whereas a degree of freedom of the affine motion model is 4, for example. For this reason, in a case that the affine motion model is used, four parameters can be used to express a motion. Therefore, zoom or rotation of a prediction image which cannot be expressed using the "translational" motion model can be expressed using the affine motion model. Here, a motion vector of one point has a degree of freedom of 2. Therefore, motion vectors of two points have twice a degree of freedom for one point, that is, a degree of freedom of 4. Accordingly, as described already, when motion vectors of two points (control points) in an area where an affine motion is established, four parameters for the affine prediction can be derived. Furthermore, when the affine parameters are obtained, it is possible to derive motion vectors of other than the above described two points in the area where the affine motion is established, the processing on which the candidate derivation unit performs.

Specifically, the candidate derivation unit derives the motion vector mvLX of the decoding target block from the motion vector of each of two control points V0 (a first control point) and V1 (a second control point). The candidate derivation unit uses the motion vector (MV0_x, MV0_y) of the control point V0 and the motion vector (MV1_x, MV1_y) of the control point V1 to derive the motion vector (MVi_x, MVi_y) of the point Vi (xi, yi) inside the decoding target block according to two equations below (corresponding to Equation AF_HOR).

$$MVi\_x = MV0\_x + (MV1\_x - MV0\_x)/W * xi - (MV1\_y - MV0\_y)/W * yi$$

$$MVi\_y = MV0\_y + (MV1\_y - MV0\_y)/W * xi + (MV1\_x - MV0\_x)/W * yi$$

Here, the locations of the control points V0 and V1 with a starting point being the base control point (V0) are (0, 0) and (W, 0), respectively.

The derivation equation for motion vector by affine prediction is derived based on the motion vector of the base control point (v0, here) which is a base among the control points (V0, V1) referred in the affine prediction, a product of the motion vector difference between the control points and an X-coordinate (xi) of a point at a relative position with a starting point being the base control point, and a product of the motion vector difference between the control points and a Y-coordinate of a point at a relative position with a starting point being the base control point.

The above equations are equivalent to equations obtained by combining the equations (general solution) for deriving the affine prediction zoom parameter ev and rotation parameter rv from the motion vectors of the control points (point V0 and point V1, here):

$$ev = (MV1\_x - MV0\_x)/W$$

$$rv = (MV1\_y - MV0\_y)/W$$

and the equations for deriving the motion vector (MVi_x, MVi_y) of the point Vi based on the affine prediction from the derived zoom parameter ev and rotation parameter rv:

$$MVi\_x = ev * xi - rv * yi$$

$$MVi\_y = rv * xi + ev * yi.$$

Therefore, in a case of deriving the affine prediction motion vector from the motion vector of the control point, the motion vector may be derived, after explicitly deriving the affine parameter (ev, rv), from the derived affine parameter (ev, rv), or the motion vector difference between the control points corresponding to the affine parameter (ev, rv) may be found at a time when deriving the affine prediction motion vector without explicitly deriving the affine parameter (ev, rv).

As described already, in order to keep the precision of the affine parameter (ev, rv) high, division by a normalization term (W, here) may be omitted. In this case, the above equations can be replaced with equations as below:

$$ev=(MV1\_x-MV0\_x)$$

$$rv=(MV1\_y-MV0\_y)$$

$$MVi\_x=ev*(xi/W)-rv*(yi/W)=(ev*xi)/W)-(rv*yi)/W)$$

$$MVi\_y=rv*(xi/W)+ev*(yi/W)=(rv*xi)/W)+(ev*yi)/W).$$

Division by the normalization term W is converted into that for the location (xi, yi), but in a case that the location (xi, yi) is a multiple of 4, or W is 4, these values are divisible, and thus, the precision does not decrease (the same applies hereinafter). When a further conversion is made as below, division by the normalization term W is converted into a product of the affine parameter (ev, rv) and the location (xi, yi), and in this case, the precision is further prevented from decreasing.

$$MVi\_x=(ev*xi)/W)-(rv*yi)/W)$$

$$MVi\_y=(rv*xi)/W)+(ev*yi)/W)$$

In a case of integer arithmetic, the precision decreases in a division process, and thus a value not divided by the distance (W, here) between the control points may be derived when the zoom parameter ev and the rotation parameter rv are derived and division by the distance W between the control points (xi/W) may be done in the affine prediction (the same applies hereinafter).

In a case that (xi, yi) is center coordinates of a sub-block (size BW) as below, the equations for deriving the affine prediction motion vector can be further converted.

In a case that the coordinates (xi, yi) are given by $$xi=BW/2+BW*i$$

$$yi=BW/2+BW*j,$$

The equations for deriving the affine prediction motion vector are as below:

$$MVi\_x=ev*(BW/2+BW*i)/W-rv*(BW/2+BW*j)/W$$

$$MVi\_y=rv*(BW/2+BW*i)/W+ev*(BW/2+BW*j)/W.$$

Here, assume that shift=log 2(W)−log 2(BW), BW/W=1>>shift, the equations for deriving the affine prediction motion vector are derived as below:

$$MVi\_x=\{ev*(i+\text{offset})\}>>\text{shift}-\{rv*(j+\text{offset})\}>>\text{shift}=\{ev*(i+\text{offset})-\{rv*(j+\text{offset})\}>>\text{shift}$$

$$MVi\_y=\{rv*(i+\text{offset})\}>>\text{shift}+\{ev*(j+\text{offset})\}>>\text{shift}=\{ev*(i+\text{offset})-\{rv*(j+\text{offset})\}>>\text{shift}.$$

Here, offset=1<<(shift−1). As described above, the affine prediction motion vector may be derived by performing right shift on a value obtained by adding a product of one of the affine parameters and a coordinate index i, a product of the other of the affine parameter and a coordinate index i, and a prescribed offset. Specifically, an X component of the motion vector may be derived by performing right shift on a value obtained by adding a product of the zoom parameter ev and the coordinate index i, a product of the rotation parameter rv and another coordinate index j, and a prescribed offset, and a Y component of the motion vector may be derived by performing right shift on a value obtained by adding a product of the rotation parameter rv and the coordinate index i, a product of the rotation parameter (−rv) and another coordinate index j, and a prescribed offset (the same applies hereinafter).

The locations of the control point or equations used for the affine prediction are not limited to the above locations or Equation AF_HOR. For example, the control points in the vertical location and Equation AF_VER, or the diagonal location and Equation AF_HORVER1 or Equation AF_HORVER2 may be used. Furthermore, a three-point location and Equation AF_TRI0, Equation AF_TRI1, Equation AF_TRI2, or Equation AF_TRI3 may be used. Moreover, the control points at locations not limited to a specific location and Equation AF_GEN may be used, and other method described herein anywhere may be used.

Flow of Processing

Hereinafter, a description is given, as an example of a further specific implementation example, of a flow of the processing for each step in which the candidate derivation unit (merge candidate derivation unit 30361 or vector candidate derivation unit 3033) uses the affine prediction to derive the motion vector mvLX of each of the sub-blocks into which the decoding target block is partitioned. The processing in which the candidate derivation unit uses the affine prediction to derive the motion vector mvLX of the sub-block includes four steps (STEP 1) to (STEP 4) below.

(STEP 1) Control Point Vector Derivation

This is a step in which the candidate derivation unit derives the motion vector of each of representative points (V0 and V1, here) of the decoding target block as two or more control points used for the affine prediction in order to derive the candidate. As the representative points of the block, a point on the decoding target block or a point neighboring to the decoding target block is used. The representative point of the block used as the control point for the affine prediction is referred to as a "block control point" herein. The control points for the affine prediction that is not the representative point of the block may be referred to as a "reference control point" to be distinguished.

(STEP 2) Sub-Block Vector Derivation

This is a step in which the candidate derivation unit derives the motion vector of each of the sub-blocks included in the decoding target block from the motion vectors of the block control points (control points V0 and V1) which are the representative points of the decoding target block derived at STEP 1. In (STEP 1) and (STEP 2), the motion vector mvLX of each sub-block is derived.

(STEP 3) Sub-Block Motion Compensation

This is a step of performing motion compensation in units of sub-blocks in which the motion compensation unit 3091 reads out from the reference picture memory 306 a block which is displaced by the motion vector mvLX from a starting point as a location of the decoding target block for the reference picture specified by the reference picture index refIdxLX, based on the prediction list utilization flag predFlagLX, reference picture index refIdxLX, and motion vector mvLX input from the inter-prediction parameter decoding unit 303 and filters the block to generate a motion compensation image predSamplesLX.

(STEP 4) Sub-Block Motion Vector Storing

In the AMVP mode, the motion vector mvLX of each sub-block derived by the vector candidate derivation unit 3033 in the above (STEP 2) is stored in the prediction parameter memory 307. Similarly, also in the merge mode, the motion vector mvLX of each sub-block derived by the merge candidate derivation unit 30361 in the above (STEP 2) is stored in the prediction parameter memory 307.

The derivation of the motion vector mvLX of the sub-block using the affine prediction can be performed both in the AMVP mode and the merge mode. A description is given below of the processing of some of (STEP 1) to (STEP 4) in the AMVP mode and the merge mode respectively.
Details of STEP 1

Figure 19A:
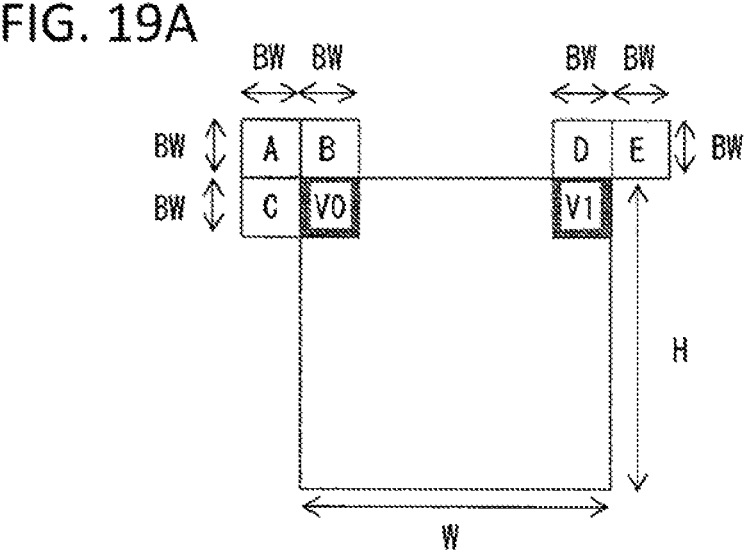
FIGS. 19A to 19C are diagrams illustrating examples of a location of a prediction unit used for deriving a motion vector of a control point in an AMVP mode and merge mode.
Figure 19B:
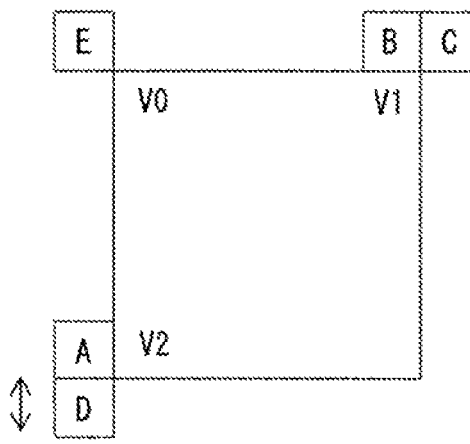
Figure 19C:
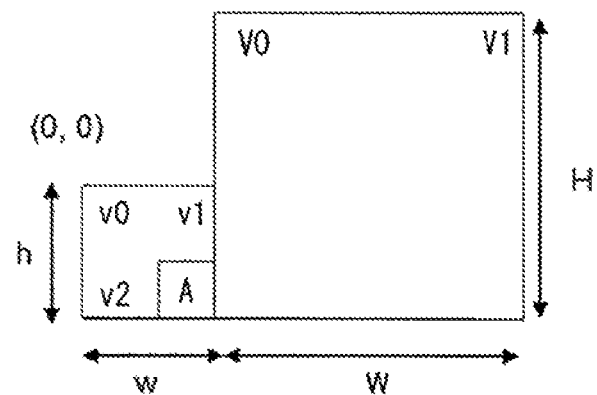

First, a description is given of the processing in (STEP 1) in the AMVP mode and the merge mode using FIGS. 19A to 19C. FIGS. 19A to 19C are diagrams illustrating examples of a location of the prediction unit used for deriving the motion vector of the control point in the AMVP mode and the merge mode.

Derivation of Motion Vector of the Control Point in AMVP Mode

The vector candidate derivation unit 3033 reads out the motion vector stored in the prediction parameter memory 307 as the vector candidate mvpLX, based on the reference picture index refIdx. Then, the vector candidate derivation unit 3033 refers to the read out motion vector to predict (derive) the motion vectors of the representative points (point V0 and point V1, here) of the target block.

In the AMVP mode, the inter-prediction parameter decoding control unit 3031 uses the entropy decoding unit 301 to extract the AMVP prediction parameter from the coded data. This AMVP prediction parameter includes the difference vector mvdLX which is separately coded for correcting the prediction vectors mvpLX of the representative points (point V0 and point V1).

The vector candidate derivation unit 3033 refers to any of motion vectors of blocks A, B, and C neighboring to one of the representative points (point V0, here) from the prediction parameter memory 307 to derive the prediction vector mvpLX of the representative point as illustrated in FIG. 19A. Furthermore, the vector candidate derivation unit 3033 adds the difference vector mvdLX of the representative point decoded from the coded data to the derived prediction vector mvpLX to derive the motion vector mvLX of the control point V0. The vector candidate derivation unit 3033 decodes indices from the coded data to identify the blocks A, B, and C.

On the other hand, the vector candidate derivation unit 3033 refers to any of motion vectors of blocks D and E neighboring to the other of the representative points (point V1, here) from the prediction parameter memory 307 to derive the prediction vector mvpLX of the representative point V1 as illustrated in FIG. 19A. Furthermore, the vector candidate derivation unit 3033 adds the difference vector mvdLX of the representative point V1 decoded from the coded data to the derived prediction vector mvpLX to derive the motion vector mvLX of the control point V1. The vector candidate derivation unit 3033 decodes indices from the coded data to identify the blocks D and E.

The locations of the control points in STEP 1 are not limited the above example. A lower left vertex of the target block or a point around the decoding target block as described below may be used.

Derivation of Motion Vector of Control Point in Merge Mode

The vector candidate derivation unit 3033 (merge candidate derivation unit 30361) refers to the prediction parameter memory 307 for the prediction unit including the blocks A to E as illustrated in FIG. 19B to determine whether or not the affine prediction is utilized. A prediction unit which is first found as the prediction unit for which the affine prediction is utilized is selected.

The vector candidate derivation unit 3033 (merge candidate derivation unit 30361) derives the motion vectors of the control points V0 (first control point) and V1 (second control point) from three points of the selected prediction unit for which the affine prediction is utilized, that is, a point on an upper left corner (point v0 in FIG. 19C), a point on an upper right corner (point v1 in FIG. 19C), and a point on a lower left corner (point v2 in FIG. 19C). In the example illustrated in FIG. 19C, a width and a height of the block whose motion vector is to be predicted is W and H, and a width and a height of the prediction unit (prediction unit including the block A in the illustrated example) is w and h.

The merge candidate derivation unit 30361 derives the motion vectors of the representative points (control points V0 and V1) on the target block from the motion vectors $(mv0\_x, mv0\_y)$, $(mv1\_x, mv1\_y)$, and $(mv2\_x, mv2\_y)$ of the points v0, v1, and v2 in FIG. 19C. The derivation equations are as below and are derived based on the motion vector $(mv0\_x, mv0\_y,$ here) of the base control point (v0, here) which is as a base among the control points (v0, v1, v2) referred to in the affine prediction, and the motion vector differences between the control points $(mv1\_x-mv0\_x, mv2\_x-mv0\_x, mv1\_y-mv0\_y, mv2\_y-mv0\_y,$ here) (the derivation equation for one of three points, Equation AF_TRI0).

$$MVi\_x=mv0\_x+(mv1\_x-mv0\_x)/w*xi+(mv2\_x-mv0\_x)/h*yi$$

$$MVi\_y=mv0\_y+(mv1\_y-mv0\_y)/w*xi+(mv2\_y-mv0\_y)/h*yi$$

Here, (xi, yi) corresponds to coordinates of a derivation target point with a starting point being the point v0 (control points V0 and V1, here), and w and h correspond to a distance between the reference point v and the base reference point v0 (=X-coordinate of the point v1−X-coordinate of the point v0) and a distance between the reference point v2 and the base reference point v0 (=Y-coordinate of the point v2−Y-coordinate of the point v0), respectively.

When the location of the point V0 (x0, y0)=(w, h−H) and the location of the point V1 (x1, y1)=(w+W, h−H) with a starting point being the point v0 of the base reference point are substituted for (xi, yi) in the derivation equations to derive the motion vector $(MV0\_x, MV0\_y)$ of the point V0 and the motion vector $(MV1\_x, MV1\_y)$ of the point V1, the resultant is as below:

$$MV0\_x=mv0\_x+(mv1\_x-mv0\_x)/w*w+(mv2\_x-mv0\_x)/h*(h-H)$$

$$MV0\_y=mv0\_y+(mv1\_y-mv0\_y)/w*w+(mv2\_y-mv0\_y)/h*(h-H)$$

$$MV1\_x=mv0\_x+(mv1\_x-mv0\_x)/w*(w+W)+(mv2\_x-mv0\_x)/h*(h-H)$$

$$MV1\_y=mv0\_y+(mv1\_y-mv0\_y)/w*(w+W)+(mv2\_y-mv0\_y)/h*(h-H) \quad \text{(Equation AF\_TRI0)}.$$

The selection of the control points in STEP 1 is not limited to the above example. The equations for deriving the motion vector of the sub-block in STEP 1 are not limited to the above example, and Equation AF_HOR, Equation AF_VER, Equation AF_HORVER1, Equation AF_HORVER2, Equation AF_TRI1, Equation AF_TRI2, Equation AF_TRI3, Equation AF_GEN and the like can be used.

The location of the point Vi with a starting point being the point v0 is derived as below. First, in a case that the location of the point v0 is (xRef, yRef) and the location of the point Vi is (xPi, yPi), the relative location (xi, yi) of the point Vi with a starting point being the point v0 is found as below from a difference between the location of the point Vi and the location of the starting point v0:

$$xi=xPi-xRef$$

$$yi=yPi-yRef.$$

In the above example, the location of the point v0 is (xP−w, yP+H−h), the locations of the points V0, V1, and V2 are (xP, yP), (xP+W, yP), and (xP, yP+H), respectively, and thus the relative location of the point Vi (xi, yi) with a starting point being the point v0 is derived as below.

$$x0 = xP0 - x\text{Ref} = xP - (xP-w) = w$$

$$y0 = yP0 - y\text{Ref} = yP - (xP+H-h) = h-H$$

$$x1 = xP1 - x\text{Ref} = (xP+W) - (xP-w) = w+W$$

$$y1 = yP1 - y\text{Ref} = yP - (xP+H-h) = h-H$$

$$x2 = xP2 - x\text{Ref} = xP - (xP-w) = w$$

$$y2 = yP2 - y\text{Ref} = (yP+H) - (xP+H-h) = h-2H$$

Note that i=0 . . . 2.

Referring to the motion vector stored in the prediction parameter memory 307 includes a case of referring in spatial prediction and a case of referring in temporal prediction.

The merge candidate derivation unit 30361, in the case of the spatial prediction, that is, a case of referring to the motion vector of the picture currently displayed, may refer to the motion vector without decreasing the precision of a high precision motion vector (e.g., 1/64 precision). In this case, assuming that mvN is a vector of the derivation target, and a location of a referenced point N is (xN, yN), equations are found as below:

$$mvN[0] = mvLX[xN][yN][0]$$

$$mvN[1] = mvLX[xN][yN][1].$$

Note that mvLX represents the motion vector of the picture currently displayed.

On the other hand, the merge candidate derivation unit 30361, in the case of the temporal prediction, that is, a case of referring to the motion vector of the reference picture other than the picture currently displayed, may refer to the motion vector with decreasing a motion vector precision iBit lower than the precision of a high precision motion vector. In this case, when mvCol is the temporal vector of the derivation target and the location of the referenced point Col is (xCol, yCol), equations are found as below:

$$mvCol[0] = mvColLX[xCol][yCol][0] \gg i\text{Bit}$$

$$mvCol[1] = mvColLX[xCol][yCol][1] \gg i\text{Bit}.$$

Note that mvColLX is the vector of the reference picture referred to in the temporal prediction.

Details of STEP 2

Figure 20:
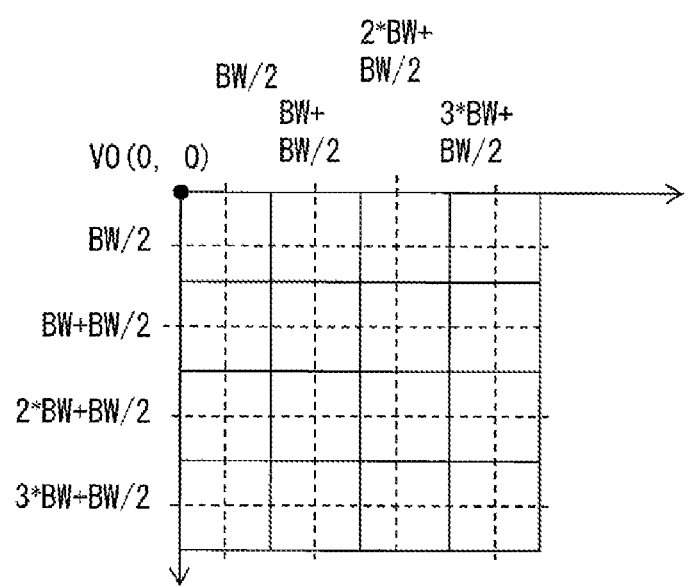
FIG. 20 is a diagram illustrating a corner containing a control point V0 of a block (width W, height H) whose motion vector is to be predicted.

Subsequently, the processing in (STEP 2) is described using FIG. 20. FIG. 20 is a diagram illustrating an example of a square sub-block having a side length of BW of which upper left vertex is at the control point V0 of the target block (width W, height H) whose motion vector is to be predicted.

The candidate derivation unit refers to the motion vectors of the control points V0 and V1 which are the representative points on the block derived in (STEP 1), and derives the motion vector mvLX of each of the sub-blocks constituting the block in (STEP 2). To be more specific, the candidate derivation unit derives the motion vector (MVi_x, MVi_y) of the location (xi, yi) of each sub-block from the location (0, 0) of the control point V0 and the location (W, 0) of the control point V1, and the motion vector (MV0_x, MV0_y) of the control point V0 and the location (MV1_x, MV1_y) of the control point V1, using the following equations:

$$MVi\_x = MV0\_x + (MV1\_x - MV0\_x)/W * xi - (MV1\_y - MV0\_y)/W * yi$$

$$MVi\_y = MV0\_y + (MV1\_y - MV0\_y)/W * xi + (MV1\_x - MV0\_x)/W * yi$$

When the zoom parameter ev and the rotation parameter rv are expressed as below, the above equations are equivalent to the equations below (corresponding to Equation AF_HOR).

$$MVi\_x = MV0\_x + ev * xi - rv * yi$$

$$MVi\_y = MV0\_y + rv * xi + ev * yi$$

$$ev = (MV1\_x - MV0\_x)/W$$

$$rv = (MV1\_y - MV0\_y)/W$$

As said before, the above equations are also equivalent to the equations below.

$$MVi\_x = MV0\_x + ev*(xi/W) - rv*(yi/W)$$

$$MVi\_y = MV0\_y + rv*(xi/W) + ev*(yi/W)$$

$$ev = (MV1\_x - MV0\_x)$$

$$rv = (MV1\_y - MV0\_y)$$

The equations for deriving the motion vector of the sub-block in STEP 2 are not limited to the above example, and Equation AF_VER, Equation AF_HORVER1, Equation AF_HORVER2, Equation AF_TRI1, Equation AF_TRI2, Equation AF_TRI3 and the like can be used.

However, the location (xi, yi) is a relative position of a center point of each sub-block with a starting point being the control point V0. For example, in a case that each sub-block is a square having a side length of BW, coordinates of a point at a center of each sub-block are used to adequately derive (xi, yi) as below:

$$xi = BW/2 + BW*i$$

$$yi = BW/2 + BW*j. \text{ where, } i=0,1,2, \ldots, W/BW-1, \text{ and } j=0,1,2, \ldots, H/BW-1.$$

Figure 21:
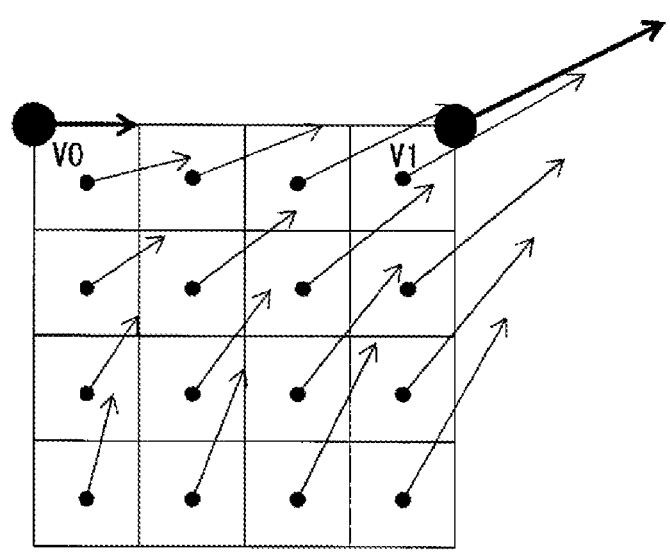
FIG. 21 is a diagram illustrating an example in which a motion vector of each of 16 sub-blocks which constitute a block (width W) whose motion vector is to be predicted is derived from control points V0 and V1.

FIG. 21 is a diagram illustrating an example in which the motion vector mvLX of each of 16 sub-blocks which constitute the block (width W) whose motion vector is to be predicted is derived from the control points V0 and V1. As illustrate in the drawing, the derived motion vector mvLX of each of the sub-block is a motion vector per a point located at a center of each sub-block as illustrated in FIG. 21.

Details of STEP 3

Next, in (STEP 3), the motion compensation unit 3091 refers to the motion vector mvLX of each sub-block derived by the candidate derivation unit in (STEP 2) to generate the motion compensation image predSamplesLX for the sub-block.

In the processing in (STEP 3), the method the same as the known motion compensation as described above may apply, but a high precision motion vector (e.g., 1/64 precision) is preferably used for the affine-predicted sub-block.

Details of STEP 4

Finally, in (STEP 4), the motion vector (MVi_x, MVi_y) in units of sub-blocks which is derived by the candidate derivation unit in (STEP 2) is store in the prediction parameter memory 307 (see FIG. 5).

For example, the precision of the motion vector (MVi_x, MVi_y) in units of sub-blocks is decreased to be stored in the prediction parameter memory 307. In a case that the candidate derivation unit decreases the precision of the motion vector (MVi_x, MVi_y) in units of sub-blocks, equations as below are used:

$$xHevc = MVi\_x >> iBit$$

$$yHevc = MVi\_y >> iBit.$$

For example, in a case that the precision is decreased from 1/64 ($1/2^6$) to 1/4 ($1/2^2$), a value of iBit is 4 (=6−2).

The candidate derivation unit may vary the precision of the motion vector stored in the prediction parameter memory 307 between the cases of using and not using the affine prediction. For example, in the case of using the affine prediction, the candidate derivation unit stores the derived motion vector as it is in the prediction parameter memory 307. In this case, equations below hold:

$$mvLX[x0][y0][0] = MVi\_x$$

$$mvLX[x0][y0][0] = MVi\_y.$$

On the other hand, in the case of not using the affine prediction, the candidate derivation unit stores the motion vector of which precision is increased in the prediction parameter memory 307. In this case, equations below hold:

$$mvLX[x0][y0][0] = MVi\_x << iBit$$

$$mvLX[x0][y0][0] = MVi\_y << iBit.$$

Modification Example 1 of Control Point Vector Derivation Step

As described above, the described affine prediction uses, as the control points, two points having the same Y-coordinate that is called the horizontal location (point V0 and point V1 in FIGS. 15A to 15C), or two points having the same X-coordinate that is called the vertical location (point V0 and point V2 in FIGS. 15A to 15C). However, rather than using, as the control points, two points of the corners next to each other of the decoding target block, such as the point V0 and the point V1, and the point V0 and the point V2 (first control point), using, as the control points, two points on the diagonal corners (e.g., the point V0 and the point V3 (lower right representative point, first control point) in FIGS. 15A to 15C) leads to the longer distance between the control points and the higher precision of the derived motion vector.

For this reason, the candidate derivation unit selects two points at an interval longer than one side of the decoding target block as the representative points (control points) which are points representing the target block to derive the motion vectors of the control points (STEP 1). Further, the motion vector of the sub-block including the target block may be derived from the representative points as two points at an interval longer than one side of the decoding target block (STEP 2).

Specifically, from the location and motion vector (MV0_x, MV0_y) of the point V0 that is a certain representative point and a position (xk, yk) and motion vector (MVk_x, MVk_y) of an arbitrary point Vk that is other representative point than the point V0, the motion vector (MVi_x, MVi_y) of the coordinates (xi, yi) is derived. Specifically, by substituting ev and rv obtained by the general solution illustrated in FIG. 22 in the general expression (eq1), the candidate derivation unit derives the motion vector (MVi_x, MVi_y) of the coordinates (xi, yi). The equation of the general solution illustrated in FIG. 22 is called Equation AF_GEN. Division by $x^2+y^2$ can be replaced with a right shift by a shift satisfying shift=log $2(x^2+y^2)$. Furthermore, in Equation AF_GEN, a value obtained by multiplying by a prescribed value may be derived, that is, division by $x^2+y^2$ (normalization) may be omitted in order to keep the precision of the affine parameter (ev, rv) high. In this case, processing corresponding to division by $x^2+y^2$ is performed in the later processing of deriving the affine prediction motion vector from the affine parameters (ev, rv).

Here, in a case that xk=0, yk=0, or an absolute value of xk is equal to an absolute value of yk, a determinant of matrix indicating the general solution illustrated in FIG. 22 is simplified, and thus, it can be seen that the motion vector (MVi_x, MVi_y) of the coordinates (xi, yi) is easily derived. In these cases, a denominator $x^2+y^2$ in the equation in FIG. 22 corresponds to a value of two raised to the power, and thus division $x^2+y^2$ can be achieved by a right shift by a value shift having a relationship shift=log $2(x^2+y^2)$. Because multiplication can be replaced with shift operation, the processing is facilitated in terms of software and hardware.

Therefore, the candidate derivation unit may use, as the control points, two points having the positional relationship satisfying any of (1) the vertical location: xk=0, (2) the horizontal location: yk=0, or (3) the diagonal location: an absolute value of xk is equal to an absolute value of yk. Particularly, the candidate derivation unit may use (3) two points having the positional relationship satisfying that an absolute value of xk is equal to an absolute value of yk (two points of which X component and Y component of an absolute value difference between their coordinates are equal). To be more specific, one control point and a point placed diagonally to the control point may be used as the control points. In other words, one control point and a point as the other control point which is placed at an angle of 45 degrees to the control point in an upper or lower rightward direction may be used.

A description is given of an example in which two control points placed diagonally to each other are used to derive the motion vector (MVi_x, MVi_y) of the coordinates (xi, yi) using FIGS. 23A and 23B. FIGS. 23A and 23B illustrate a case that the point V1 and the point V2 are used, and FIGS. 23C and 23D illustrate a case that the point V0 and the point V3 are used.

In the case that the point V1 and the point V2 are used as the control points, FIG. 23B illustrates a general solution assuming that the location of the point V1 with a starting point being the point V2 is (W, −W), the motion vector of the point V1 is (MV1_x, MV1_y), the location of the point V2 is (0, 0), and the motion vector of the point V2 is (MV2_x, MV2_y) as illustrated in FIG. 23A (corresponding to Equation AF_HORVER2). On the other hand, in the case that the point V0 and the point V3 are used as the control points, FIG. 23D illustrates a general solution assuming that the location of the point V0 is (0, 0), the motion vector of the point V0 is (MV0_x, MV0_y), the location of the point V3 with a starting point being the point V0 is (W, W), and the motion vector of the point V3 is (MV3_x, MV3_y) as illustrated in FIG. 23C (corresponding to Equation AF_HORVER1). The candidate derivation unit can easily derive the zoom parameter ev and rotation parameter rv of an arbitrary point without a division process, based on these general solutions in the case that two control points are in the diagonal location. Note that W and H in the general expressions in FIGS. 23A to 23D represent respectively a horizontal distance and a vertical distance between two control points. Therefore, in a case that coordinates of the control points in a certain coordinate system are provided, W and H can be derived respectively from a difference between an X-coordinate of one control point (e.g., X-coordinate xP1 of V1) and an X-coordinate of the other control point (e.g., X-coordinate xP2 of V2) (W=xP1−xP2), and a difference between a Y-coordinate of one control point (e.g., Y-coordinate yP2 of V2) and a Y-coordinate of the other control point (e.g., Y-coordinate yP1 of V1) (H=yP2−yP1).

Alternatively, the candidate derivation unit may be configured to determine the control points, based on whether or not the points (e.g., point V0 to point V3 in FIGS. 15A to 15C) as candidates of the control points are available. To be more specific, the candidate derivation unit refers to the prediction parameter memory 307 to select, depending on whether or not the motion vector at the location intended to be the control point is an effective vector (available or not), a control point pair placed diagonally to each other (point V2 and point V1), a control point pair horizontally placed (V0 and V1), or a control point pair vertically placed (V0 and V2). A case that a motion vector at a certain location is an effective vector indicates that a reference picture index refIdxLX of the motion vector at the certain location has an effective value. For example, a case that refIdxLX is other than −1 (negative value) is determined to be effective, and a case that refIdxLX is −1 (negative value) is determined to be ineffective. In a case that a reference picture of a motion vector at a certain location is a short-term prediction picture, the motion vector may be determined to be effective, and in a case of a long-term prediction picture, the motion vector may be determined to be ineffective. In a case that a motion vector at a certain location is a motion vector of the affine prediction block, the motion vector may be determined to be effective, and in a case of other than the affine prediction, the motion vector may be determined to be ineffective.

To be more specific, in a case that the motion vectors at both the upper right representative point (upper right vertex) and lower left representative point (lower left vertex) of the target block exist as effective motion vectors, the candidate derivation unit may refer to, as the motion vectors at the multiple first control points, the motion vectors at the upper right representative point (upper right vertex) and upper left representative point (lower left vertex) of the target block. In a case that the motion vector at the upper right representative point (upper right vertex) or lower left representative point (lower left vertex) of the target block does not exist as an effective motion vector, the candidate derivation unit may refer to, as the motion vectors at the multiple first control points, a vector existing as an effective motion vector among the motion vectors at the upper right representative point (upper right vertex) and lower left representative point (lower left vertex) and the motion vector at the upper left representative point (upper left vertex) of the target block as the motion vector at the first control point.

To be more specific, in a case that both of the control points placed diagonally to each other are available (the point V1 and the point V2 are available), the candidate derivation unit utilizes, as two control points, the control point pair (point V1 and point V2) placed diagonally. In a case that any of two control points placed diagonally is not available, the available control point of the above control points placed diagonally and other control point than the above two points are used. For example, in the case that any of two control points placed diagonally is not available, when the control point V2 used for the control point pair in the vertical location is unavailable, the control points in the horizontal location (point V0 and point V1) are utilized as two control points, and when the control point V1 used for the control point pair in the horizontal location is unavailable, the control points in the vertical location (point V0 and point V2) are referred to as two control points, to derive the motion vectors of the decoding target block. Note that although the precision of the motion vector is probably less high, the point V3 can be used when available as the control point.

Modification Example 2 of Control Point Vector Derivation Step

As described above, the affine motion vector is derived using two points as the control points in general. The motion vector (MVi_x, MVi_y) is derived based on a sum of the motion vector of the base control point (mv0_x, mv0_y) as a base among the control points referred to in the affine prediction, a product of the motion vector difference between the control points and the X-coordinate of the relative position with a starting point being the base control point, and product of the motion vector difference between the control points and the Y-coordinate of the relative position with a starting point being the base control point. Particularly, the X component of the motion vector MVi_x is derived based on a sum of the X component mv0_x of the motion vector of the base control point, a product of the zoom parameter (ev) based on the motion vector difference between the control points and the X-coordinate (xi) of the relative position with a starting point being the base control point, and a product of the rotation parameter (−rv) derived based on the motion vector difference between the control points and the Y-coordinate (yi) of the relative position with a starting point being the base control point. The Y component of the motion vector MVi_y is derived based on a sum of the Y component mv0_x of the motion vector of the base control point, a product of the rotation parameter (rv) based on the motion vector difference between the control points and the X-coordinate (xi) of the relative position with a starting point being the base control point, and a product of the zoom parameter (ev) derived based on the motion vector difference between the control points and the Y-coordinate (yi) of the relative position with a starting point being the base control point. There are various methods of deriving the zoom parameter (ev) and the rotation parameter (rv). Particularly, in a case of the derivation from two control points having a specific positional relationship, the general solution in FIG. 22 can be simplified.

For example, the candidate derivation unit derives the motion vector (MVi_x, MVi_y) of the coordinates (xi, yi) from two points, point V0 and point V1, as below (corresponding to Equation AF_HOR).

$$MVi\_x = mv0\_x + ev*xi - rv*yi \qquad (A1\text{-}1)$$

$$MVi\_y = mv0\_y + rv*xi + ev*yi \qquad (A1\text{-}2)$$

where coefficients ev and rv are determined as below:

$$ev = (MV1\_x - MV0\_x)/W \qquad (A1\text{-}3)$$

$$rv = (MV1\_y - MV0\_y)/W \qquad (A1\text{-}4).$$

In the case that two points, point V0 and point V2, are used as the control points, the motion vector (MVi_x, MVi_y) of the coordinates (xi, yi) may be derived as below (corresponding to Equation AF_VER):

$$MVi\_x = mv0\_x + ev*xi - rv*yi \qquad (A1\text{-}5)$$

$$MVi\_y = mv0\_y + rv*xi + ev*yi \qquad (A1\text{-}6)$$

$$ev = (MV2\_y - MV0\_y)/H \qquad (A1\text{-}7)$$

$$rv = -(MV2\_x - MV0\_x)/H \qquad (A1\text{-}8).$$

Here, in a case that three points can be used as the control points, the higher precision motion vector can be derived. In the case that three control points are used to derive the motion vector (MVi_x, MVi_y) of the coordinates (xi, yi), the derivation may be performed according derivation equations below, for example (called Equation AF_TRI0):

$$MVi\_x = mv0\_x + ev1*xi - rv2*yi \quad (A1\text{-}9)$$

$$MVi\_y = mv0\_y + rv1*xi + ev2*yi \quad (A1\text{-}10)$$

$$ev1 = (MV1\_x - MV0\_x)/W \quad (A1\text{-}11)$$

$$ev2 = (MV2\_y - MV0\_y)/H \quad (A1\text{-}12)$$

$$rv1 = (MV1\_y - MV0\_y)/W \quad (A1\text{-}13)$$

$$rv2 = -(MV2\_x - MV0\_x)/H \quad (A1\text{-}14).$$

Here, each of right sides of Equations (A1-1), (A1-5) and (A1-9) for deriving MVi_x may be called a first linear function, and each of right sides of the equations for deriving MVi_y (A1-2), (A1-6) and (A1-10) may be a second linear function.

However, it can be seen that in these derivation Equations (A1-9) to (A1-14), the zoom parameter ev1 and rotation parameter rv1 derived only from the point V0 and point V1 are used for a term related to xi, and the zoom parameter ev2 and rotation parameter rv2 derived only from the point V0 and point V2 are used for a term related to yi. To be more specific, in the example in which three control points are used to derive the motion vector (MVi_x, MVi_y) of the coordinates (xi, yi), two control points are practically used to derive the motion vector (MVi_x, MVi_y).

In order to derive the high precision motion vector, the candidate derivation unit can use (refer to) all the motion vectors of three control points (three motion vectors) to derive the motion vector (MVi_x, MVi_y) of the coordinates (xi, yi). For example, the candidate derivation unit may be configured to use an average (simple average or weighted average) of a first supplementary coefficient which is determined by referring to the motion vector of the point V0 and the motion vector of the point V1, and the second supplementary coefficient which is determined by referring to the motion vector of the point V0 and the motion vector of the point V2, to derive the motion vector.

To be more specific, in a case that locations of three control points (point V0, point V1, and point V2) from the base control point (from the point V0) are (0, 0), (W, 0) and (0, H), the motion vectors of three control points are (mv0_x, mv0_y), (mv1_x, mv1_y), and (mv2_x, mv2_y), and the supplementary coefficients derived from the motion vector of the point V0 and the motion vector of the point V1 are (ev1, rv1) and the supplementary coefficients derived from the motion vector of the point V0 and the motion vector of the point V2 are (ev2, rv2), the candidate derivation unit may be configured to derive the supplementary coefficients as below:

$$ev1 = (mv1\_x - mv0\_x)/W \quad (A1\text{-}15)$$

$$rv1 = (mv1\_y - mv0\_y)/H \quad (A1\text{-}16)$$

$$ev2 = (mv2\_y - mv0\_y)/H \quad (A1\text{-}17)$$

$$rv2 = -(mv2\_x - mv0\_x)/W \quad (A1\text{-}18)$$

and derive the coefficients ev and rv using the average of the supplementary coefficients as below:

$$ev = (ev1 + ev2)/2 \quad (A1\text{-}19)$$

$$rv = (rv1 + rv2)/2 \quad (A1\text{-}20)$$

and further use Equations (A1-1) and (A1-2) to derive the motion vector (MVi_x, MVi_y) of the coordinates (xi, yi).

Alternatively, the candidate derivation unit may be configured to use, instead of Equations (A1-19) and (A1-20), $$ev = (ev1 + ev2) >> 1 \quad (A1\text{-}21)$$

$$rv = (rv1 + rv2) >> 1 \quad (A1\text{-}22)$$

to derive the motion vector (MVi_x, MVi_y) of the coordinates (xi, yi) (another derivation equation using three control points, called Equation AF_TRI1). Note that a rounding offset may be added when performing a right shift.

$$ev = (ev1 + ev2 + 1) >> 1 \quad (A1\text{-}21')$$

$$rv = (rv1 + rv2 + 1) >> 1 \quad (A1\text{-}22')$$

In order to keep the precision of the affine parameter high, a value before divided by the distance W or H between the control points may be used as a supplementary variable (ev1, rv1, ev2, rv2) (the same applies hereinafter).

$$ev = (mv1\_x - mv0\_x)$$

$$rv1 = (mv1\_y - mv0\_y)$$

$$ev2 = (mv2\_y - mv0\_y)$$

$$rv2 = -(mv2\_x - mv0\_x)$$

As described above, the use of the average or composed value of the motion vectors of the multiple control points also has an effect of reducing noises included in the motion vectors of the control points. Therefore, the motion vector (MVi_x, MVi_y) of the coordinates (xi, yi) can be derived with higher precision than the case of using two motion vectors of two control points.

Alternatively, the candidate derivation unit may be configured to use either one, whose absolute value is larger, of the affine parameters (ev1, rv1) or (ev2, rv2) which are derived according to Equations (A1-15) to (A1-18) to derive the motion vector (MVi_x, MVi_y) of the coordinates (xi, yi).

That is, the candidate derivation unit may be configured to compare an absolute value of ev1 with an absolute value of ev2 to use larger one as ev, and compare an absolute value of rv1 with an absolute value of rv2 to use larger one as rv, and further use Equations (A1-1) and (A1-2) to derive the motion vector (MVi_x, MVi_y) (another derivation equation using three control points, called Equation AF_TRI2). When a ternary operator is used, the derivation can be performed according to equations as below.

$$ev = |ev1| > |ev2| ? ev1 : ev2$$

$$rv = |rv1| > |rv2| ? rv1 : rv2$$

Note that a ternary operator x? y:z indicates an operation that derives y when x is true, and z when x is false.

This allows the candidate derivation unit to effectively use three motion vectors available as the control points to derive the motion vector (MVi_x, MVi_y) of the coordinates (xi, yi) with the precision as high as possible.

The above description describes the example in which the candidate derivation unit compares an absolute value of ev1 with an absolute value of ev2 to use only larger one as ev and compares an absolute value of rv1 with an absolute value of rv2 to uses only larger one to derive the motion vector (MVi_x, MVi_y) of the coordinates (xi, yi). However, no limitation put to this example, and the candidate derivation unit may be configured to compare an absolute value of ev1 (an absolute value of the first supplementary coefficient)

with an absolute value of ev2 (an absolute value of the second supplementary coefficient) to use smaller one, and compare an absolute value of rv1 (an absolute value of the first supplementary coefficient) with an absolute value of rv2 (an absolute value of the second supplementary coefficient) to use smaller one. In this case, for example, the candidate derivation unit may be configured to, among ev1, ev2, rv1, and rv2 (supplementary coefficients) derived according to Equations (A1-15) to (A1-18), derive a value by multiplying a larger value of an absolute value of ev1 and an absolute value of ev2 by a larger weighting coefficient, and a value by multiplying a smaller value of them by a smaller weighting coefficient, and use an average of these derived values.

To be more specific, in a case that an absolute value of ev1 is larger than an absolute value of ev2, the candidate derivation unit multiplies ev1 by a weighting coefficient ¾ and multiplies ev2 by a weighting coefficient ¼ to compute a weighted average of the resultant, (3*ev1+ev2)/4, as ev. On the other hand, in a case that an absolute value of ev1 is smaller than an absolute value of ev2, the candidate derivation unit, in contrast, multiplies ev1 by a weighting coefficient ¼ and multiplies ev2 by a weighting coefficient ¾ to compute a weighted average of the resultant, (ev1+3*ev2)/4) as ev (another derivation equation using three control points, called Equation AF_TRI3).

The same applies for rv, that is, the candidate derivation unit computes (3*rv1+rv2)/4 as rv in a case that an absolute value of rv1 is larger than an absolute value of rv2, and whereas, computes (rv1+3*rv2)/4 as rv in a case that an absolute value of rv1 is smaller than an absolute value of rv2.

This example describes that the weighting coefficients used by the candidate derivation unit are ¼ and ¾, but are not limited thereto, and other values such as ⅝ and ⅜, or ⅓ and ⅔ may be used. Alternatively, the candidate derivation unit may determine a weighting coefficient for deriving ev depending on a difference between or ratio of an absolute value of ev1 and an absolute value of ev2, for example. For example, based on that a ratio of an absolute value of ev1 to an absolute value of ev2 is 1:3 (i.e., an absolute value of ev1 is ⅓ of an absolute value of ev2), the weighting coefficients may be set to ¼ and ¾. The weighting coefficients set to adequate values allow the candidate derivation unit to derive the motion vector (MVi_x, MVi_y) of the coordinates (xi, yi) with high precision.

Modification Example 3 of Control Point Vector Derivation Step

For the affine motion vector, in general, as described above, the motion vector mvLX of each sub-block is derived through two steps processing (STEP 1: deriving the motion vector of the control point from the stored motion vector) and (STEP 2: deriving the motion vector of the sub-block from the motion vector of the control point). When the derivation of the motion vector mvLX of each sub-block can be performed in one step processing, the motion vector mvLX of each sub-block can be derived without decreasing the precision.

For this reason, the candidate derivation unit may read out the motion vectors of two or more points stored in the prediction parameter memory 307 and use directly the point corresponding to each of the read out motion vectors as the control point for the affine prediction to derive the motion vector of each sub-vector. To be more specific, the candidate derivation unit does not derive the motion vectors of the points at the defined locations on the target block (point V0 and point V1, representative point, block control point) as the control points used for the affine prediction as in (STEP 1) described above, but uses a motion vector of a point neighboring to the decoding target block (called the reference point) as it is which is read out from the prediction parameter memory 307 to derive the motion vector of the decoding target block (sub-block). Because a motion vector which can be effective among the motion vectors referable in the prediction parameter memory 307 is a motion vector of a point at a location of the already decoded block, assume that the point corresponding to each of the motion vectors read out by the candidate derivation unit is the motion vector of the already decoded block. Conversely, because the decoding target block that is a block to be processed from now is one still before decoded, the point corresponding to each of the motion vectors read out by the candidate derivation unit is located outside the decoding target block (see the points V0 and V1 or the like in FIG. 26). To be more properly, a read-out location is a location covered by a block which is scanned before the decoding target block in a block scan order (e.g., Z scan or raster scan).

In deriving the motion vector of each sub-block in the AMVP mode (i.e., prediction vector mvpLX), the vector candidate derivation unit 3033 reads out the motion vectors mvLX of multiple control points (first control points) configured inside the prediction block which neighbors to or shares a vertex with the decoding target block to derive the read out vectors as the prediction vectors mvpLX. Then, the vector candidate derivation unit 3033 uses, for the motion vector of the reference point, the motion vector mvLX which is obtained by adding the difference vector mvdLX decoded from the coded data to the above prediction vectors read out from the prediction parameter memory 307, in place of the motion vector of the control point such as the point V0 and point V1. In the AMVP prediction as an example, the control points are configured at the vertexes of each block.

On the other hand, in deriving the motion vector of the control point in the merge mode, the merge candidate derivation unit 30361 reads out the motion vectors mvLX of multiple control points (first control points) configured inside the prediction block which neighbors to or shares a vertex with the sub-block contained in the decoding target block, the motion vectors mvLX being stored in the prediction parameter memory 307, to use the read out vectors in place of the motion vector of the control point such as the point V0 and the point V1 which are the points on the decoding target block. In the merge prediction as an example, the control points inside the prediction block not neighboring to the decoding target block are used. Therefore, "referring to the motion vector" used herein includes not only the case of using the motion vector as it is (i.e., in the case of the merge prediction mode) but also the case of using the motion vector which the residual vector mvdLX is added to or subtracted from (i.e., the AMVP prediction mode).

The reference points used as the control points for the affine prediction which are used in place of the control points on the target block such as the point V0 and the point V1 (the control points inside the block) may be selected from candidates of multiple reference points (reference point candidates), based on the index (i.e., the prediction vector index mvp_LX_idx, or the merge index merge_idx). Alternatively, the multiple reference point candidates are sequentially searched (scanned), and a reference point candidate of which motion vector is first determined to be available (effective) may be selected as the reference points used for the control point for the affine prediction.

Figure 24:
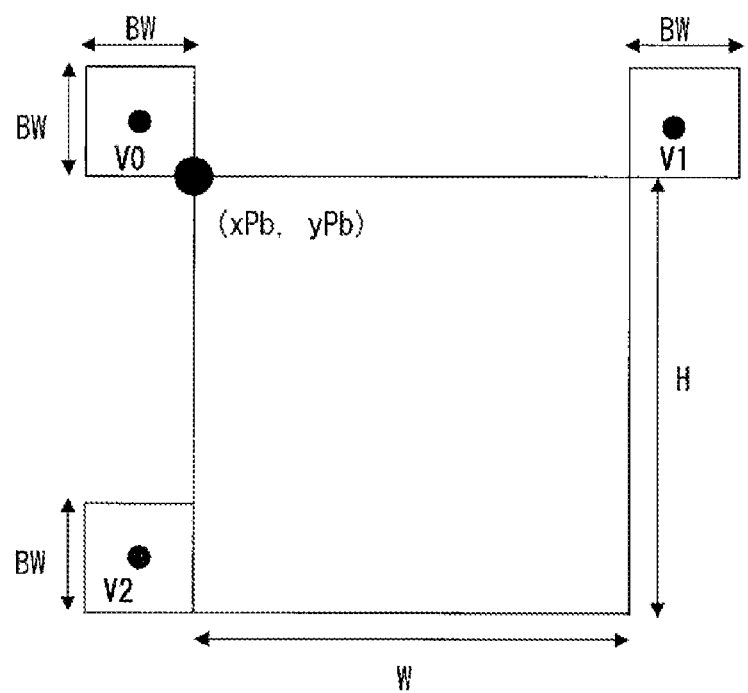
FIG. 24 is a diagram illustrating two reference candidate points having the same X-coordinate or Y-coordinate.

The candidate derivation unit may select, as the reference points used as the control points, the motion vectors of two reference candidate points having the same X-coordinate or Y-coordinate among the points which neighbor to the target block and are stored in the prediction parameter memory 307. The reference candidate point like this is described using the FIG. 24. FIG. 24 is a diagram illustrating two reference candidate points having the same X-coordinate or Y-coordinate. In the example illustrated in FIG. 24, a width and height of the block whose motion vector is to be predicted are W and H, respectively, and a width and height of the prediction unit including reference candidate points V0, V1, and V2 are BW and BW, respectively.

For example, in a case that the reference candidate points V0 and V1 which respectively have a location (V0_x, V0_y) and a location (V1_x, V1_y) and neighbor to an upper left and upper right portion of the target block are used as two control points, the motion vector (MVi_x, MVi_y) of each sub-block location (Vi_x, Vi_y) is derived using equations below (corresponding to Equation AF_HOR):

$$MVi\_x = MV0\_x + (MV1\_x - MV0\_x)/W01*xi - (MV1\_y - MV0\_y)/W01*yi$$

$$MVi\_y = MV0\_y + (MV1\_y - MV0\_y)/W01*xi + (MV1\_x - MV0\_x)/W01*yi.$$

Here, assuming that upper left coordinates of the target block are (xPb, yPb), coordinates (Vi_x, Vi_y) of a sub-block of indices i, j inside the target block are (xPb+BW/2*i, yPb+BW/2*j), and the locations of the reference points V0 and V1 (V0_x, V0_y) and (V1_x, V1_y) are respectively (xPb−BW/2, yPb−BW/2) and (xPb+W+W/2, yPb−BW/2), a distance W01 between the control points and each sub-block location (xi, yi) with reference to the base control point are as below:

$$W01 = (V1\_x - V0\_x) = (xPb + W + BW/2) - (xPb - BW/2) = (W + BW)$$

$$xi = Vi\_x - V0\_x = (xPb + BW/2 + BW*i) - (xPb - BW/2) = BW + BW*i$$

$$yi = Vi\_y - V0\_y = (yPb + BW/2 + BW*j) - (yPb - BW/2) = BW + BW*j.$$

Note that i=0, 1, 2, . . . , W/BW−1, j=0, 1, 2, . . . , H/BW−1.

The equations for deriving motion vector by the affine prediction can be converted as below, as described already.

$$MVi\_x = MV0\_x + ev*xi/W01 - rv*yi/W01 = MV0\_x + ev*(BW + BW*i)/W01 - rv*(BW + BW*j)/W01 = MV0\_x + (ev*(i + \text{offset}) - rv*(j + \text{offset})) >> \text{shift}$$

$$MVi\_y = MV0\_y + rv*xi/W01 + ev*yi/W01 = MV0\_y + rv*(BW + BW*i)/W01 + ev*(BW + BW*j)/W01 = MV0\_x + (rv*(i + \text{offset}) + ev*(j + \text{offset})) >> \text{shift}$$

$$ev = (MV1x - MV0x)$$

$$rv = (MV1\_y - MV0\_y)$$

$$\text{shift} = \log 2(W01) - \log 2(BW) = \log 2(W + BW) - \log 2(BW)$$

$$\text{offset} = 1 << (\text{shift} - 1)$$

That is, as described already, a sum of a product of the zoom parameter ev and rotation parameter rv derived as a difference between the motion vectors and the location indices i, j, and an offset may be derived by a right shift by a shift value shift defined from a block size (the same applies hereinafter).

For example, in a case that the reference candidate point V0 neighboring to the upper left portion of the target block and V2 neighboring to a lower left portion of the target block are used as two control points, the motion vector (MVi_x, MVi_y) of each sub-block location (xi, yi) is derived using equations as below (corresponding to Equation AF_VER):

$$MVi\_x = MV0\_x + (MV2\_y - MV0\_y)/H02*xi + (MV2\_x - MV0\_x)/H02*yi$$

$$MVi\_y = MV0\_y - (MV2\_x - MV0\_x)/H02*xi + (MV2\_y - MV0\_y)/H02*yi.$$

Here, assuming that upper left coordinates of the target block are (xPb, yPb), coordinates (Vi_x, Vi_y) of the sub-block of indices i, j inside the target block are (xPb+BW/2*i, yPb+BW/2*j), and the locations of the reference points V0 and V2 (V0_x, V0_y) and (V2_x, V2_y) are respectively (xPb−BW/2, yPb−BW/2) and (xPb−W/2, yPb+H+BW/2), a distance H02 between the control points V0 and V2 and the location (xi, yi) of the sub-block having coordinates (Vi_x, Vi_y) with a starting point being the reference candidate point V0 are as below:

$$H02 = (V2\_y - V0\_y) = (yPb + H + BW/2) - (yPb - BW/2) = (H + BW)$$

$$xi = Vi\_x - V0\_x = (xPb + BW/2 + BW*i) - (xPb - BW/2) = BW + BW*i$$

$$yi = Vi\_y - V0\_y = (yPb + BW/2 + BW*j) - (yPb - BW/2) = BW + BW*j.$$

Note that i=0, 1, 2, . . . , W/BW−1, j=0, 1, 2, . . . , H/BW−1.

For example, as described already, the control points in the diagonal location may be used to derive the affine prediction motion vector. For example, in a case that the reference candidate point V1 neighboring to the upper right portion of the target block and V2 neighboring to the lower left portion of the target block are used as two control points, the motion vector (MVi_x, MVi_y) of each sub-block location (xi, yi) is derived using equations as below (corresponding to Equation AF_HORVER2):

$$MVi\_x = MV0\_x + ev*xi - rv*yi$$

$$MVi\_y = MV0\_y + rv*xi + ev*yi$$

$$ev = (MV1\_x - MV2\_x - MV1\_y + MVA2\_y)/2W$$

$$rv = (MV1\_x + MV2\_x + MV1\_y - MVA2\_y)/2W$$

$$W = (V1\_x - V2\_x) = (xPb + W - BW/2) - (xPb - BW/2) = (W + BW).$$

For example, as described already, three control points may be used to derive the affine prediction motion vector. For example, in a case that the reference candidate point V0 neighboring to the upper left portion of the target block, the reference candidate point V1 neighboring to the upper right portion of the target block, and V2 neighboring to the lower left portion of the target block are used as two control points, the motion vector (MVi_x, MVi_y) of each sub-block location (xi, yi) is derived using equations as below (corresponding to Equation AF_TRI1):

$$MVi\_x = MV0\_x + ev*xi - rv*yi$$

$$MVi\_y = MV0\_y + rv*xi + ev*yi$$

$$ev1 = (MV1\_x - MV0\_x)/W \quad \text{(corresponding to A1-15)}$$

$rv1=(MV1\_y-MV0\_y)/H$ (corresponding to A1-16)

$ev2=(MV2\_y-MV0\_y)/H$ (corresponding to A1-17)

$rv2=-(MV2\_x-MV0\_x)/W$ (corresponding to A1-18)

$ev=(ev1+ev2)/2$ (A1-19)

$rv=(rv1+rv2)/2$ (A1-20).

In the above description, the location of the reference point V0, V1, or V2 in the affine prediction is the center position of the prediction block. Such a location is called a grid address.

$V2:(xPb-BW/2,yPb+H+BW/2)$ $V1:(xPb+W+BW/2,yPb-BW/2)$ $V0:(xPb-BW/2,yPb-BW/2)$

In a case that the motion vectors of the reference points V0, V1, and V2 are read out from the prediction parameter memory 307, all the points inside the prediction block including the reference points V0, V1, and V2 have the same motion vector, and therefore, the motion vectors do not need to be read out from the grid address, and may be read out from a block address that is a point of a boundary of the reference point V0, V1, or V2.

These are expressed as below:

$V2:(xPb-1,yPb+H)$ $V1:(xPb+W,yPb-1)$ $V0:(xPb-1,yPb-1)$.

Such an address (block address) can be defined independently from the prediction block size BW and can be more easily derived. For this reason, the processing of reading out the motion vector from the prediction parameter memory 307 can be simplified.

Figure 25:
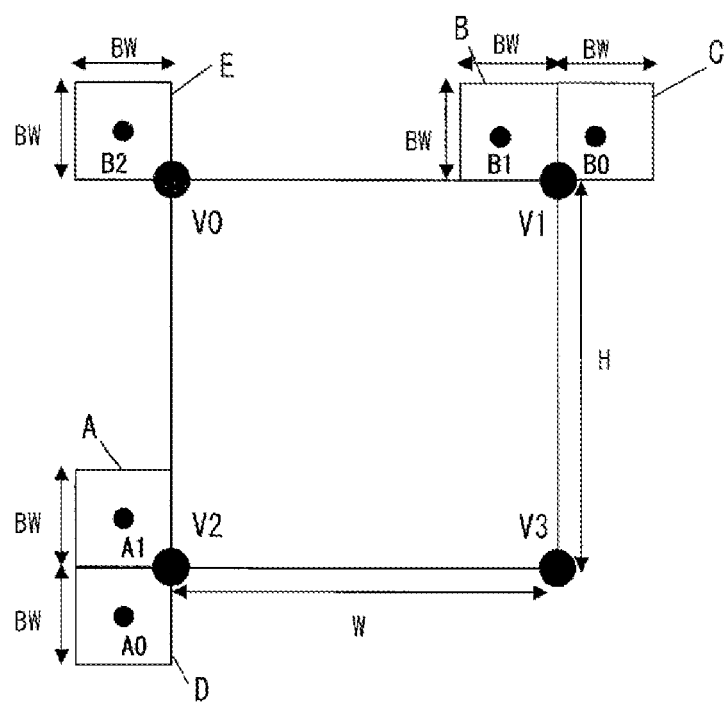
FIG. 25 is a diagram illustrating an example of a case that a center point of a prediction unit neighboring to a decoding target block is a reference candidate point.
Figure 27:
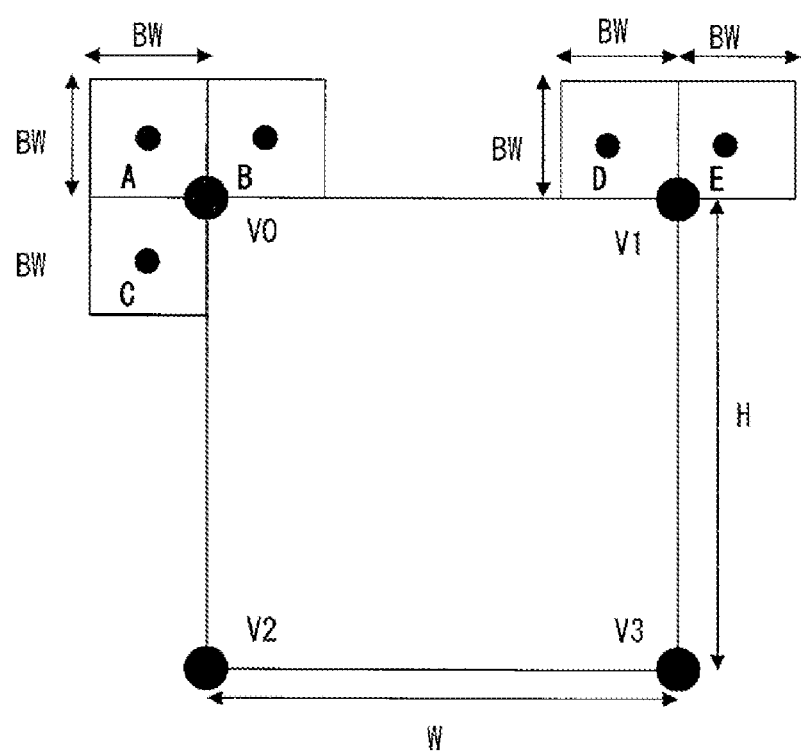
FIG. 27 is a diagram illustrating an example in which a reference candidate point specified by an index is used as a control point.

The location of the reference point is not limited to the points illustrated in FIG. 24, and the points illustrated in FIG. 25 and FIG. 27 may be used.

The candidate derivation unit may refer to, among the points stored in the prediction parameter memory 307, particularly the motion vectors of the prediction units A to E neighboring to the decoding target block as illustrated in FIG. 27 (FIG. 19A) to use these vectors directly as the motion vector of the control point for the affine prediction.

Here, assuming that an upper left location of the block whose motion vector is to be predicted is (xPb, yPb) (see FIG. 24), the block whose motion vector is to be predicted is surrounded by a rectangle having four vertexes of (xPb, yPb), (xPb+W, yPb), (xPb, yPb+H), and (xPb+W, yPb+H).

Then, in a case that each prediction block is a square having a side length of BW, the center positions (grid addresses) of the prediction blocks A to E used for the derivation by the affine prediction are expressed as below:

$E:(xPb+W+BW/2,yPb-BW/2)$ $D:(xPb+W-BW/2,yPb-BW/2)$ $C:(xPb-BW/2,yPb+BW/2)$ $B:(xPb+BW/2,yPb-BW/2)$ $A:(xPb-BW/2,yPb-BW/2)$.

On the other hand, the boundary locations (block addresses) of the prediction units A to E which are used for reading out the motion vector from the prediction parameter memory 307 are expressed independently from the prediction block size BW as below:

$E:(xPb+W,yPb-1)$ $D:(xPb+W-1,yPb-1)$ $C:(xPb-1,yPb)$ $B:(xPb,yPb-1)$ $A:(xPb-1,yPb-1)$.

For example, in a case that two points A and E in the horizontal location are used as the control points, the motion vector (MVi_x, MVi_y) of each sub-block location (xi, yi) may be derived using the equations below (corresponding to Equation AF_HOR):

$MVi\_x=MVA\_x+(MVE\_x-MVA\_x)/W*xi-(MVE\_y-MVA\_y)/W*yi$ $MVi\_y=MVA\_y+(MVE\_y-MVA\_y)/W*xi+(MVE\_x-MVA\_x)/W*yi$ $W=(VE\_x-VA\_x)=(xPb+W-BW/2)-(xPb-BW/2)=(W+BW)$ $xi=Vi\_x-VA\_x=(xPb+BW/2+BW*i)-(xPb-BW/2)=BW+BW*i$ $yi=Vi\_y-VA\_y=(yPb+BW/2+BW*j)-(yPb-BW/2)=BW+BW*j$.

For example, in a case that two points A and D in the horizontal location are used as the control points, the motion vector (MVi_x, MVi_y) of each sub-block location (xi, yi) may be derived using the equations below (corresponding to Equation AF_HOR):

$MVi\_x=MVA\_x+(MVD\_x-MVA\_x)/W*xi-(MVD\_y-MVA\_y)/W*yi$ $MVi\_y=MVA\_y+(MVD\_y-MVA\_y)/W*xi+(MVD\_x-MVA\_x)/W*yi$ $W=(VD\_x-VA\_x)=(xPb+BW-BW/2)-(xPb-BW/2)=W$ $xi=Vi\_x-VA\_x=(xPb+BW/2+BW*i)-(xPb-BW/2)=BW+BW*i$ $yi=Vi\_y-VA\_y=(yPb+BW/2+BW*j)-(yPb-BW/2)=BW+BW*j$.

For example, in a case that two points B and E in the horizontal location are used as the control points, the motion vector (MVi_x, MVi_y) of each sub-block location (xi, yi) may be derived using the equations below (corresponding to Equation AF_HOR):

$MVi\_x=MVB\_x+(MVE\_x-MVB\_x)/W*xi-(MVE\_y-MVB\_y)/W*yi$ $MVi\_y=MVB\_y+(MVE\_y-MVB\_y)/W*xi+(MVE\_x-MVB\_x)/W*yi$ $W=(VE\_x-VB\_x)=(xPb+W+BW/2)-(xPb+BW/2)=W$ $xi=Vi\_x-VB\_x=(xPb+BW/2+BW*i)-(xPb+BW/2)=BW*i$ $yi=Vi\_y-VB\_y=(yPb+BW/2+BW*j)-(yPb-BW/2)=BW+BW*j$.

For example, in a case that two points B and D in the horizontal location are used as the control points, the motion vector (MVi_x, MVi_y) of each sub-block location (xi, yi) may be derived using the equations below (corresponding to Equation AF_HOR):

$$MVi\_x = MVB\_x + (MVD\_x - MVB\_x)/W * xi - (MVD\_y - MVB\_y)/W * yi$$

$$MVi\_y = MVB\_y + (MVD\_y - MVB\_y)/W * xi + (MVD\_x - MVB\_x)/W * yi$$

$$W = (VD\_x - VB\_x) = (xPb + W - BW/2) - (xPb + BW/2) = W - BW$$

$$xi = Vi\_x - VB\_x = (xPb + BW/2 + BW*i) - (xPb + BW/2) = BW*i$$

$$yi = Vi\_y - VB\_y = (yPb + BW/2 + BW*j) - (yPb - BW/2) = BW + BW*j.$$

In a case of multiple combinations of the control points, for example, A and E, A and D, B and E, and B and D, which combination of the control points is used may be configured such that the reference candidate point used as the control point can be changed based on whether or not an available motion vector exists (whether or not a motion vector is effective), as described below. In this case, the control point pair having a larger distance between the control points may be preferentially selected. For example, in a case that whether A and D or A and E are selected as the control point pair, effectiveness of the control point D and control point E is referred to, and the control point E is available, A and E having a larger distance between the control points may be preferentially derived.

Another Configuration

The candidate derivation unit may refer to, among the points stored in the prediction parameter memory 307, the motion vector of the point other than the vertex of the target decoding block, particularly, the motion vector of any of the prediction units A to E neighboring to the decoding target block as illustrated in FIG. 25 to use the vector directly as the motion vector of the control point for the affine prediction. In a case that each prediction block is a square having a side length of BW, center positions (grid addresses) of prediction blocks A0, A1, and B0 to B2 used for the derivation by the affine prediction are expressed as below:

$$B2:(xPb-BW/2, yPb-BW/2)$$

$$B0:(xPb+W+BW/2, yPb-BW/2)$$

$$B1:(xPb+W-BW/2, yPb-BW/2)$$

$$A1:(xPb-BW/2, yPb+H-BW/2)$$

$$A0:(xPb-BW/2, yPb+H+BW/2).$$

On the other hand, boundary locations (block addresses) of the prediction units A0, A1, and B0 to B2 which are used for reading out the motion vector from the prediction parameter memory 307 are expressed as below:

$$B2:(xPb-1, yPb-1)$$

$$B0:(xPb+W, yPb-1)$$

$$B1:(xPb+W-1, yPb-1)$$

$$A1:(xPb-1, yPb+H-1)$$

$$A0:(xPb-1, yPb+H).$$

The motion vectors of these are as below.

$$B2:(MVB2\_x, MVB2\_y)$$

$$B0:(MVB0\_x, MVB0\_y)$$

$$B1:(MVB1\_x, MVB1\_y)$$

$$A1:(MVA1\_x, MVA1\_y)$$

$$A0:(MVA0\_x, MVA0\_y)$$

For example, in a case that points B2 and B0 in the horizontal location are used as the control points, the motion vector (MVi_x, MVi_y) of each sub-block location (xi, yi) may be derived using the equations below (corresponding to Equation AF_HOR):

$$MVi\_x = MVB2\_x + ev*xi - rv*yi$$

$$MVi\_x = MVB2\_x + rv*xi + ev*yi$$

$$ev = (MVB0\_x - MVB2\_x)/W \qquad \text{(corresponding to A1-3)}$$

$$rv = (MVB0\_y - MVB2\_y)/W \qquad \text{(corresponding to A1-4)}$$

$$W = (VB0\_x - VB2\_x) = (xPb + W - BW/2) - (xPb - BW/2) = (W+BW)$$

$$xi = Vi\_x - VB2\_x = (xPb + BW/2 + BW*i) - (xPb - BW/2) = BW + BW*i$$

$$yi = Vi\_y - VB2\_y = (yPb + BW/2 + BW*j) - (yPb - BW/2) = BW + BW*j.$$

For example, in a case that points B2 and A0 in the horizontal location are used as the control points, the motion vector (MVi_x, MVi_y) of each sub-block location (xi, yi) may be derived using the equations below (corresponding to Equation AF_VER):

$$MVi\_x = MVB2\_x + ev*xi - rv*yi$$

$$MVi\_x = MVB2\_x + rv*xi + ev*yi$$

$$ev = (MVA0\_y - MVB2\_y)/H \qquad \text{(corresponding to A1-7)}$$

$$rv = -(MVA0\_x - MVB2\_x)/H \qquad \text{(corresponding to A1-8)}$$

$$H = (VA0\_y - VB2\_y) = (yPb + H - BW/2) - (yPb - BW/2) = (H+BW)$$

$$xi = Vi\_x - VB2\_x = (xPb + BW/2 + BW*i) - (xPb - BW/2) = BW + BW*i$$

$$yi = Vi\_y - VB2\_y = (yPb + BW/2 + BW*j) - (yPb - BW/2) = BW + BW*j.$$

For example, in a case that points B0 and A0 in the diagonal location are used as the control points, the motion vector (MVi_x, MVi_y) of each sub-block location (xi, yi) may be derived using the equations below (corresponding to Equation AF_HORVER2):

$$MVi\_x = MVB2\_x + ev*xi - rv*yi \qquad \text{(corresponding to A1-5)}$$

$$MVi\_x = MVB2\_x + rv*xi + ev*yi \qquad \text{(corresponding to A1-6)}$$

$$ev = (MVB0\_x - MVA0\_x - MVB0\_y + MVA0\_y)/2W$$

$$rv = (MVB0\_x + MVA0\_x + MVB0\_y - MVA0\_y)/2W$$

$$W = (VB0\_x - VA0\_x) = (xPb + W - BW/2) - (xPb - BW/2) = (W+BW).$$

Which control points among the above examples (B2 and B0, B2 and A0, B0 and A0, and the like) are used may be configured such that the reference candidate point used as the control point is changed based on whether or not an available motion vector exists (whether or not a motion vector is effective), as described below. In this case, the control point pair having a larger distance between the control points may be preferentially selected. For example, in a case of selecting which of B2 and B0, B2 and A0, and B0 and A0 are used as the control point pair, and the motion vectors of the control point B0 and control point A0 are available, B0 and A0 in the diagonal location having a larger distance between the control points may be preferentially derived. To be more specific, in a case that the motion vectors at both the upper right representative point (point A0) and lower left representative point (point B0) of the target block exist as effective motion vectors, the candidate derivation unit may refer to, as the motion vectors at the multiple first control points, the motion vectors at the upper right representative point (point A0) and lower left representative point (point B0) of the target block. In a case that the motion vector at the upper right representative point (point A0) or lower left representative point (point B0) of the target block does not exist as an effective motion vector, the candidate derivation unit may refer to, as the motion vectors at the multiple first control points, a vector existing as an effective motion vector among the motion vectors at the upper right representative point (point A0) and lower left representative point (point B0) and the motion vector at the upper left representative point (point B2) of the target block as the motion vector at the first control point. For example, in a case that the upper right representative point (point A0) of the target block does not exist as an effective motion vector, the upper left representative point (point B2) and the lower left representative point (point B0) may be used for the control points, and in a case that the lower left representative point (point B0) of the target block does not exist as an effective motion vector, the upper left representative point (point B2) and the upper right representative point (point A0) may be used for the control points. A size of the prediction block for the reference point is fixed to BW x BW independently from the location of the reference point, but is not limited thereto, and a different size may be uses as describe later.

Three points may be used as the control points.

For example, in a case that points B2, B0, and A0 are used as the control points, the motion vector (MVi_x, MVi_y) of each sub-block location (xi, yi) may be derived using the equations below (corresponding to Equation AF_TRI1):

$MVi\_x = MVB2\_x + ev*xi - rv*yi$ $MVi\_x = MVB2\_x + rv*xi + ev*yi$ $ev1 = (MVB0\_x - MVB2\_x)/W$ (corresponding to A1-15)

$rv1 = (MVB0\_y - MVB2\_y)/H$ (corresponding to A1-16)

$ev2 = (MVA0\_y - MVB2\_y)/H$ (corresponding to A1-17)

$rv2 = -(MVA0\_x - MVB2\_x)/W$ (corresponding to A1-18)

$ev = (ev1 + ev2)/2$ (corresponding to A1-19)

$rv = (rv1 + rv2)/2$ (corresponding to A1-20)

$W = (VB0\_x - VB2\_x) = (xPb + W - BW/2) - (xPb - BW/2) = (W + BW)$ $H = (VA0\_y - VB2\_y) = (yPb + H - BW/2) - (yPb - BW/2) = (H + BW)$

In the case of the derivation from three points, the equation is not limited to Equation AF_TRI1, and Equation AF_TRI0, Equation AF_TRI1, Equation AF_TRI2, Equations AF_TRI3 and the like can be used. A size of the prediction block for the reference point is fixed to BW×BW independently from the location of the reference point, but is not limited thereto, and a different size may be uses as describe later.

Availability of Motion Vector

Alternatively, the candidate derivation unit may configure that the reference candidate point used as the control point can be changed based on whether or not an available motion vector exists at location of the reference candidate point used as the control point (whether or not a motion vector is effective). To be more specific, in a case that a motion vector exist at the reference candidate point in the prediction block (the control point inside a first prediction block) which shares the upper right vertex of the target block and does not share a side with the target block, the candidate derivation unit refers to the motion vector at the reference candidate point and a motion vector at a control point inside a prediction block which shares the upper left vertex of the target block and does not share a side with the target block as the motion vectors at the multiple first control points described above. In a case that a motion vector does not exist at the reference candidate point, the candidate derivation unit may refer to a motion vector at a reference candidate point which shares the upper right vertex of the target block and shares a side with the target block and a motion vector at a reference candidate point which shares the upper left vertex of the target block and does not share a side with the target block as the motion vectors at the multiple first control points described above.

Specifically, a description is given of a case that the candidate derivation unit uses, as the control point, the reference candidate point of which the motion vector is stored in the prediction parameter memory 307 using FIG. 25. FIG. 25 is a diagram illustrating an example of a case that center points A1, B1, B0, A0, and B2 of prediction units A to E neighboring to the decoding target block are the reference candidate points.

For example, in a case that any of the center point B2 and center points A1 and A0 of the prediction units illustrated in FIG. 25 is a reference candidate point, and the prediction parameter memory 307 stores, as an effective vector, a motion vector of the reference candidate point A1 which is a reference candidate point having a larger distance from the center point B2, the reference candidate point A1 and the reference candidate point B2 are used as the control points having X-coordinates the same as each other. In a case that the motion vector of the reference candidate point A1 is not an effective vector and a motion vector of the reference candidate point A0 is stored as an effective vector, the reference candidate point B2 and the reference candidate point A0 are used as the control points having X-coordinates the same as each other.

Similarly, in a case that any of the center point B2 and center points B1 and B0 of the prediction units is a reference candidate point, and the prediction parameter memory 307 stores, as an effective vector, a motion vector of the reference candidate point B0 which is a reference candidate point having a larger distance from the center point B2, the reference candidate point B2 and the reference candidate point B0 are used as the control points having Y-coordinates the same as each other. In a case that the motion vector of the reference candidate point B0 is not an effective vector and a motion vector of the reference candidate point B1 is stored as an effective vector, the reference candidate point B2 and the reference candidate point B1 are used as the control points having Y-coordinates the same as each other.

Modification Example 4 of Control Point Vector Derivation Step

As described above, the affine motion vector according to an embodiment of the disclosure is derived by referring to the motion vectors of two points as the control points. However, a wider interval between the points used as the control points, that is, a larger distance between the control points, is considered to be able to more accurately derive the affine motion vector as the following analysis. The larger distance between the control points, the larger motion vector difference between the control points even in a case of the same magnitude motion. In a case that the precision of motion vector is limited (e.g., quantized with a step of ⅛ pel), the smaller motion vector, relatively the larger quantization error, and the larger motion vector, relatively the smaller quantization error. Therefore, a lager distance between the control points which is expected to have a larger motion vector improves the accuracy of the motion vector.

In a case that the location of the reference candidate point which is a point to be a candidate used as the control point is inside the decoding target block (including the block boundary), these points are the upper left vertex and the upper right vertex (having the Y-coordinates the same as each other) or the upper left vertex and the lower left vertex (having the X-coordinates the same as each other) of the decoding target block, for example. In this case, an interval between the points used as the control points is equal to a length of one side of the decoding target block.

Therefore, in order to widen an interval between the points used as the control points, the candidate derivation unit may use a point at a location outside the decoding target block as the control point. To be more specific, a motion vector of a point at a location outside the decoding target block like the points V0 and V1 illustrated in FIG. 26 may be referred to. The candidate derivation unit may use the upper left vertex of the decoding target block and the point V1 illustrated in FIG. 26, or the upper right vertex of the decoding target block and the point V0 illustrated in FIG. 26. For this reason, the candidate derivation unit may use at least one point at a location outside the decoding target block as the control point.

The (modification example 4 of control point vector derivation step) described here may apply to any of the case that the motion vector mvLX of each of the sub-blocks constituting the decoding target block is derived through the above-described two steps processing (STEP 1) and (STEP 2) and the case that the motion vector mvLX of each of the sub-blocks constituting the decoding target block is derived through one step processing as already described in the section, (modification example 3 of control point vector derivation step).

To be more specific, the motion vector of the control point is not necessary to be equal to the motion vector of reference candidate point unlike in the section (modification example 3 of control point vector derivation step). For example, the motion vector of the control point may be derived (predicted) from the motion vector of the reference candidate point.

For example, in the case of the merge mode, the merge candidate derivation unit 30361 reads out the prediction motion vector mvpLX stored by the prediction parameter memory 307, based on the reference picture index refIdx. Then, the read out prediction motion vector mvpLX is used, as it is, as the motion vector of the control point to predict (derive) the motion vector mvLX of the sub-block.

In the case of the AMVP mode, the vector candidate derivation unit 3033 reads out the prediction motion vector mvpLX stored by the prediction parameter memory 307, based on the reference picture index refIdx. Then, the addition unit 3035 uses, as the motion vector of the control point, a motion vector obtained by adding the difference vector mvdLX acquired from the inter-prediction parameter decoding control unit 3031 to the motion vector read out by the vector candidate derivation unit 3033 to predict (derive) the motion vector mvLX of the sub-block.

Figure 26:
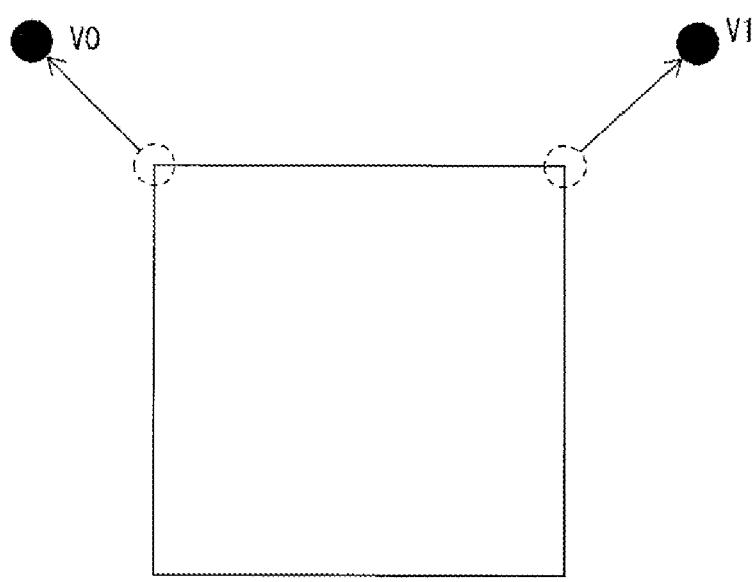
FIG. 26 is a diagram illustrating an example in which a point located outside a decoding target block is used as a control point.

Examples of a method using, as the control points, the reference candidate points at locations outside the decoding target block such as the point V0 and point V illustrated in FIG. 26 may include the following (1), (2), (3), and (4). The methods (1) to (4) are respectively described below using FIG. 25 and FIG. 27 to FIG. 29.

(1) The reference candidate point inside the prediction unit which exists around the decoding target block is used as the control point. As illustrated in FIG. 24, in a case that the location of the upper left vertex of the decoding target block is (xPb, yPb) and each prediction block is a square having a side length of BW, the locations of the center points V0 to V2 (grid addresses) of the prediction blocks existing around this decoding target block as illustrated in the drawing are expressed as below:

$$\text{point } V0{:}(xPb{-}BW/2, yPb{-}BW/2) \tag{C1-1}$$

$$\text{point } V1{:}(xPB{+}W{+}BW/2, yPb{-}BW/2) \tag{C1-2}$$

$$\text{point } V2{:}(xPb{-}BW/2, yPb{+}H{-}BW/2) \tag{C1-3}$$

In deriving the motion vector of the sub-block used for the affine prediction motion vector derivation in (STEP 2) described above, the grid addresses by Equations (C1-1) to (C1-3) are used.

The method for the motion vector of the sub-block in the case that the point V0, the point V1, and the point V2 are used as the control points is already described in the modification example 4 of control point vector derivation step using FIG. 24, and therefore, the description thereof is omitted.

The boundary location of each prediction block (block address) does not depend on the prediction block size BW, and is expressed as below:

$$\text{prediction unit containing point } V0{:}(xPb{-}1, yPb{-}1) \tag{C1-4}$$

$$\text{prediction unit containing point } V1{:}(xPB{+}W, yPb{-}1) \tag{C1-5}$$

$$\text{prediction unit containing point } V2{:}(xPb{-}1, yPb{+}H{-}1) \tag{C1-6}$$

In deriving the motion vector of the control point mxLX in (STEP 1) described above, the block addresses by Equations (C1-4) to (C1-6) may be used for reading out the motion vector from the prediction parameter memory 307.

As another method of more accurately deriving the affine motion vector, two points placed on a diagonal of the decoding target block (e.g., the points V0 and V3) as illustrated in FIG. 23C may be used as the control points, as described already. When such two points are used as the control points, a distance between two points placed diagonally to each other on the decoding target block is longer than a length of one side of the decoding target block, and therefore, the affine motion vector can be more accurately derived.

It is also preferable to use the point outside the decoding target block to use two diagonal points. This configuration is already described as the method using the points A0, A1, and B0 to B2 in FIG. 25 in the modification example 4 of control point vector derivation step, and therefore, the description thereof is omitted.

(2) The reference candidate point specified by the index (i.e., the prediction vector index mvp_LX_idx, or the merge index merge_idx) is used as the control point. In a case that the upper left vertex V0 of the decoding target block is (xPb, yPb) and each prediction unit is a square having a side length of BW, the center positions (grid addresses) of the prediction units A to E illustrated in FIG. 27 used for the affine prediction motion vector derivation are expressed as below:

$$E:(xPb+W+BW/2, yPb-BW/2)$$

$$D:(xPb+W-BW/2, yPb-BW/2)$$

$$C:(xPb-BW/2, yPb+BW/2)$$

$$B:(xPb+BW/2, yPb-BW/2)$$

$$A:(xPb-BW/2, yPb-BW/2).$$

The method for the motion vector of the sub-block in the case that the points A to E are used as the control points is already described in the modification example 4 of control point vector derivation step, and therefore, the description thereof is omitted.

On the other hand, the boundary locations (block addresses) of the prediction units A to E which are used for reading out the motion vector from the prediction parameter memory 307 are expressed as below:

$$E:(xPb+W, yPb-1)$$

$$D:(xPb+W-1, yPb-1)$$

$$C:(xPb-1, yPb)$$

$$B:(xPb, yPb-1)$$

$$A:(xPb-1, yPb-1).$$

Figure 28:
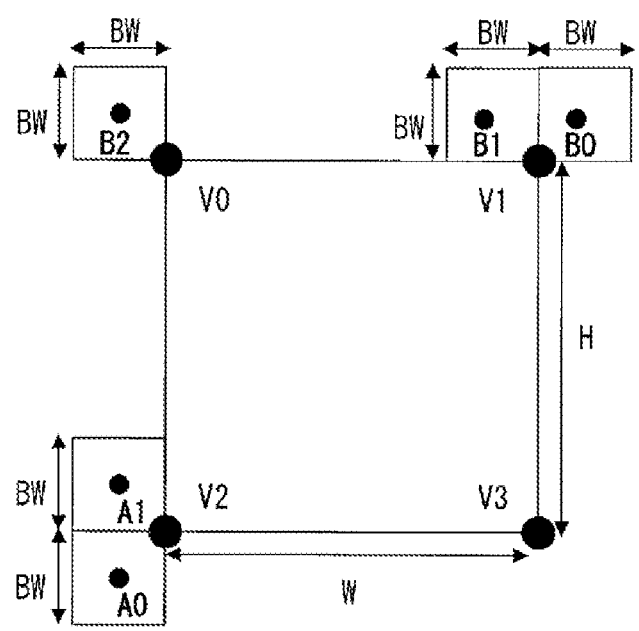
FIG. 28 a diagram illustrating an example of a case that a center point of a prediction unit neighboring to a decoding target block is a point used as the control point.

(3) The point used as the control point is changed based on whether or not an available motion vector exists. FIG. 28 is a diagram illustrating an example of a case that a center point A1 of a prediction unit neighboring to the left side of the decoding target block and a center point A0 of a prediction unit neighboring to the lower left portion of the decoding target block are the points used as the control points. In a case that a motion vector of the point A0 neighboring to the lower left portion is stored in the prediction parameter memory 307 as an effective motion vector (e.g., a motion vector whose reference picture index is other than −1), the candidate derivation unit uses the point A0 as the control point, and in a case that the motion vector of the point A0 is not stored and a motion vector of the point A1 neighboring to the left side is stored, the candidate derivation unit uses the point A1 as the control point. The point B2 and the point A0 (or the point A1) used as the reference points are used as the control points having the X-coordinates the same as each other so that the motion vector of the sub-block can be derived by the affine prediction. The distance between the control points is larger in the case the control points are B2 and A0 than the case that the control points are B2 and A1. Therefore, by preferentially using the point A0 among the point A0 and the point A1, the control points having a larger distance between the control points can be used, which allows the higher precision motion vector derivation by the affine prediction.

Similarly, the candidate derivation unit can use a center point B1 of a prediction unit neighboring to the upper side of the decoding target block and a center point B0 of a prediction unit neighboring to the upper right portion of the decoding target block as the control points. In a case that a motion vector of the point B0 neighboring to the upper right portion is stored in the prediction parameter memory 307 as an effective motion vector (e.g., a motion vector whose reference picture index is other than −1), the candidate derivation unit uses the point B0 as the control point, and in a case that the motion vector of the point B0 is not stored and a motion vector of the point B1 neighboring to the upper side is stored, the candidate derivation unit uses the point B1 as the control point. The point B2 and the point B0 (or the point B1) used as the reference points are used as the control points having the Y-coordinates the same as each other so that the motion vector of the sub-block can be derived by the affine prediction. The distance between the control points is larger in the case the control points are B2 and B0 than the case that the control points are B2 and B1. Therefore, by preferentially using the point B0 among the point B0 and the point B1, the control points having a larger distance between the control points can be used, which allows the higher precision motion vector derivation by the affine prediction.

The candidate derivation unit can apply also in the case that the control points placed on a diagonal are used as described already. The point A1 or A0, and the point B1 or B0 are used as the control points.

The candidate derivation unit can apply also in the case that three control points are used. The point B2, the point A1 or A0, and the point B1 or B0 are used as the control points.

In both the case of the diagonal and the case of three points, the point A0 is used in the case that the motion vector of the point A0 is stored as an effective motion vector and the point A1 is used in other cases, and the point B0 is used in the case that the motion vector of the point B0 is stored as an effective motion vector and the point B1 is used in other cases, so that the distance between the control points can be made larger, which can improve the precision of the motion vector derived by the affine prediction.

In the case that the upper left location of the decoding target block is (xPb, yPb) and each prediction unit is a square having a side length of BW, the locations of the points A0, A1, B0, B1, and B2 (grid addresses) at the center positions of the prediction units illustrated in FIG. 28 which are used as the locations of the control points in the motion vector derivation by the affine prediction are expressed as below:

$$\text{point } A0:(xPb-BW/2, yPb+H+BW/2)$$

$$\text{point } A1:(xPb-BW/2, yPb+H-BW/2)$$

$$\text{point } B0:(xPb+W+BW/2, yPb-BW/2)$$

$$\text{point } B1:(xPb+W-BW/2, yPb-BW/2)$$

$$\text{point } B2:(xPb-BW/2, yPb-BW/2).$$

On the other hand, the boundary locations (block addresses) of the prediction units containing the points A0, A1, B0, B1, and B2 which are used for reading out the motion vector from the prediction parameter memory 307 are expressed as below:

$$\text{prediction unit containing point } A0:(xPb-1, yPb+H)$$

$$\text{prediction unit containing point } A1:(xPb-1, yPb+H-1)$$

$$\text{prediction unit containing point } B0:(xPb+W, yPb-1)$$

$$\text{prediction unit containing point } B:(xPb+W-1, yPb-1)$$

$$\text{prediction unit containing point } B2:(xPb-1, yPb-1).$$

(4) The reference candidate point used as the control point is changed based on the size of the prediction unit. A determinant of matrix illustrated in FIG. 22 is a general expression for deriving a motion vector (MVi_x, MVi_y) of a point of the coordinates (xi, yi) with a starting point being the base control point (0, 0) from a location (xk, yk) of an arbitrary point Vk with a starting point being the base control point (0, 0) and a motion vector (MVk_x, MVk_y). This equation can be used to refer to a motion vector a point Vk at an arbitrary location to derive the motion vector mvLX of the decoding target block.

Figure 29:
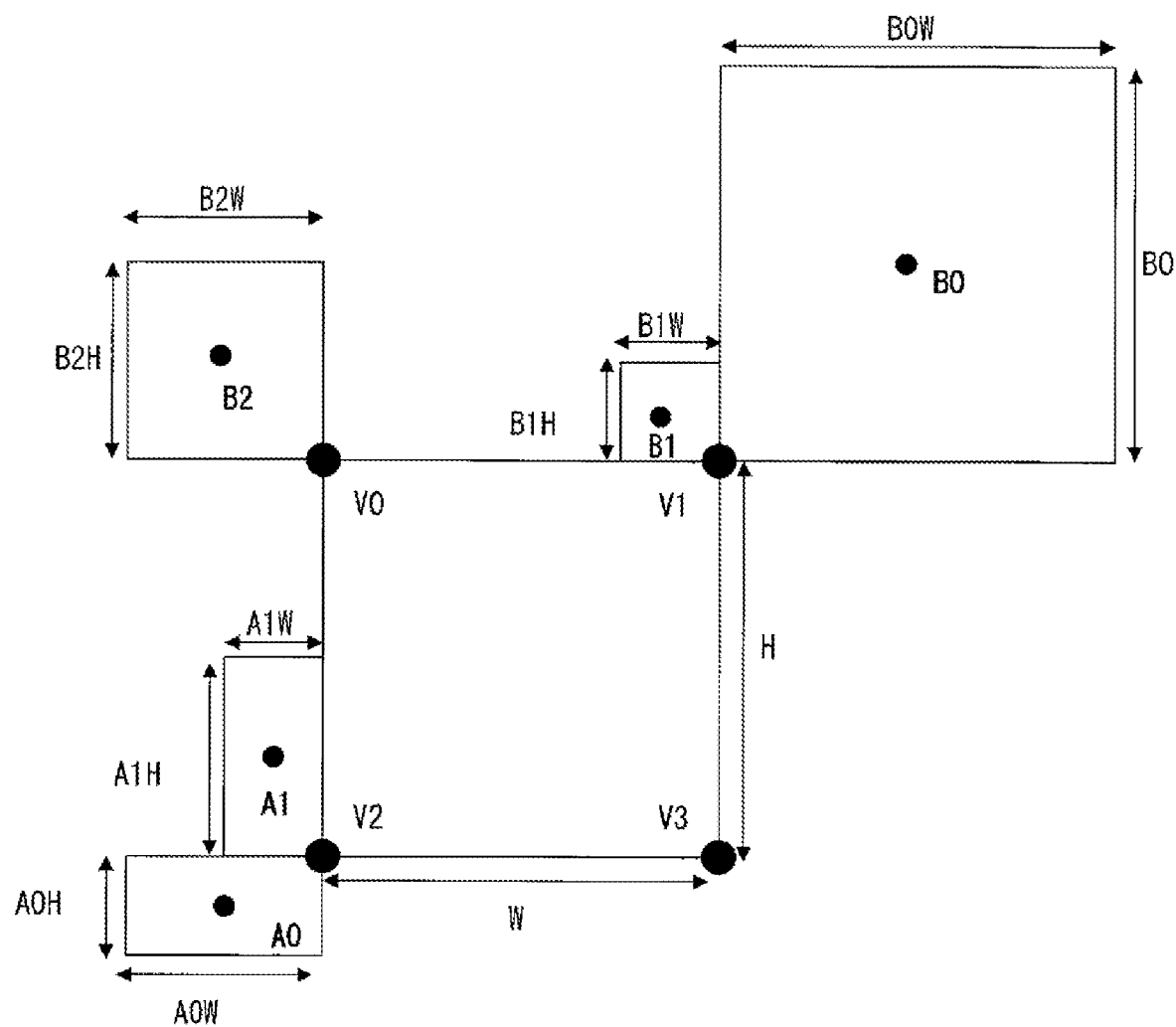
FIG. 29 is a diagram illustrating an example in which a reference candidate point used as a control point is changed based on a size of a prediction unit.

The point Vk may include the point A0, A1, B0, B1, and B2 illustrated in FIG. 29, for example.

For example, each of the prediction units containing the point A0, A1, B0, B1, and B2 is not limited to a square and may be a rectangle, and sizes (height*width) are expressed as below:

a size of a prediction unit containing point
$A0:A0W*A0H$ a size of a prediction unit containing point
$A1:A1W*A1H$ a size of a prediction unit containing point
$B0:B0W*B0H$ a size of a prediction unit containing point
$B1:B1W*B1H$ a size of a prediction unit containing point
$B2:B2W*B2H$, and in the case that the location of the upper left vertex of the decoding target block is (xPb, yPb), the locations of the points A0, A1, B0, B1, and B2 (grid addresses) at the center positions of the prediction units illustrated in FIG. 29 are expressed as below:

point $A0:(xPb-A0W/2, yPb+H+A0H/2)$ point $A1:(xPb-A1W/2, yPb+H-A1H/2)$ point $B0:(xPb+W+B0W/2, yPb-B0H/2)$ point $B1:(xPb+W-B1W/2, yPb-B1H/2)$ point $B2:(xPb-B2W/2, yPb-B2H/2)$.

On the other hand, the boundary location (block addresses) of the prediction units containing the points A0, A1, B0, B1, and B2 are also expressed as below:

prediction unit containing point $A0:(xPb-1, yPb+H)$ prediction unit containing point $A1:(xPb-1, yPb+H-1)$ prediction unit containing point $B0:(xPb+W, yPb-1)$ prediction unit containing point $B1:(xPb+W-1, yPb-1)$ prediction unit containing point $B2:(xPb-1, yPb-1)$.

The candidate derivation unit in the case of using two points as the reference points can use B2 and A0, B2 and A1, B2 and B0, B2 and B1 or the like from the reference point candidates to derive the motion vector of the sub-block. As described already, the configuration is preferable in which the prediction parameter memory 307 is referred to concerning an effectiveness of the motion vector, and A1 and B0 are prioritized and used over A0 and B1, respectively such that a distance between the reference points is made larger.

The candidate derivation unit can apply the locations taking into account the prediction block size also in the case that the control points placed in the diagonal location are used as described already. In the case of using the points illustrated in FIG. 29, AX (AX is A1 or A0) and BX (BX is B1 or B0) are used as the control points. The candidate derivation unit can apply the locations taking into account the prediction block size also in the case that three points are used as the control points. As the control points used are B2, AX (AX is A1 or A0), and BX (BX is B1 or B0). In both the case of the diagonal location and the case of three points, the point A0 is used in the case that the motion vector of the point A0 is stored as an effective motion vector and the point A1 is used in other cases, and the point B0 is used in the case that the motion vector of the point B0 is stored as an effective motion vector and the point B1 is used in other cases, so that the distance between the control points can be made larger, which can improve the precision of the motion vector derived by the affine prediction.

In this way, the sizes of the prediction units containing the points A0, A1, B0, B1, and B2 may be different from each other. As is in this configuration, the sizes of the prediction units (e.g., A0W, A0H) of the reference candidate points (A0, A1, B0, B1, and B2, here) are taken into account to derive the affine prediction motion vector, which can derive the higher precision motion vector.

Modification Example 5 of Control Point Vector Derivation Step

In the merge mode, in a case that the motion vectors of the prediction units which are located around the decoding target block are the affine motion vectors, the merge candidate derivation unit 30361 uses the motion vectors of the points contained these prediction units as they are to derive the motion vector of the control point for the decoding target block.

However, in general, the sizes of the prediction units have not been taken into account which contain three points used to derive the motion vector of the control point for the decoding target block, and therefore, the precision has decreased of the motion vector of the control point for the decoding target block derived by the merge candidate derivation unit 30361.

This is described using FIG. 28 as below. For example, the location of the point B2 contained in the prediction unit which corresponds to the motion vector used by the merge candidate derivation unit 30361 as the motion vector of the control point V0 for the decoding target block is different from the location of the control point V0 for the decoding target block. Therefore, the precision has decreased of the motion vector of the control point V0 for the decoding target block derived by the merge candidate derivation unit 30361.

For this reason, in order to derive with high precision, the motion vector of the control point for the decoding target block, the merge candidate derivation unit 30361 takes into account a size of each prediction unit containing the point of which motion vector is used. Then, the merge candidate derivation unit 30361 may derive the motion vector of the point contained in the prediction unit, the point coinciding with the location of the control point for the decoding target block. To be more specific, in the FIG. 28 for example, the merge candidate derivation unit 30361 derives the motion vector of the control point V0 for the decoding target block from motion vector of the prediction unit containing the point B2 and the point V0. By deriving the motion vector of the control point V0 for the decoding target block in this way, it is possible to derive the motion vector of the control point V0 for the decoding target block derived by the merge candidate derivation unit 30361 without decreasing the precision.

In the merge mode, in a case that a motion vector of a prediction unit neighboring to the decoding target block is derived by the affine prediction, the merge candidate derivation unit 30361 may derive the motion vector of the control points V0 and V1 for the decoding target block from three points, a center of a sub-block at the upper left of the prediction unit, a center of a sub-block at the upper right of the prediction unit, and a center of a sub-block at the lower left of the prediction unit.

Figure 30:
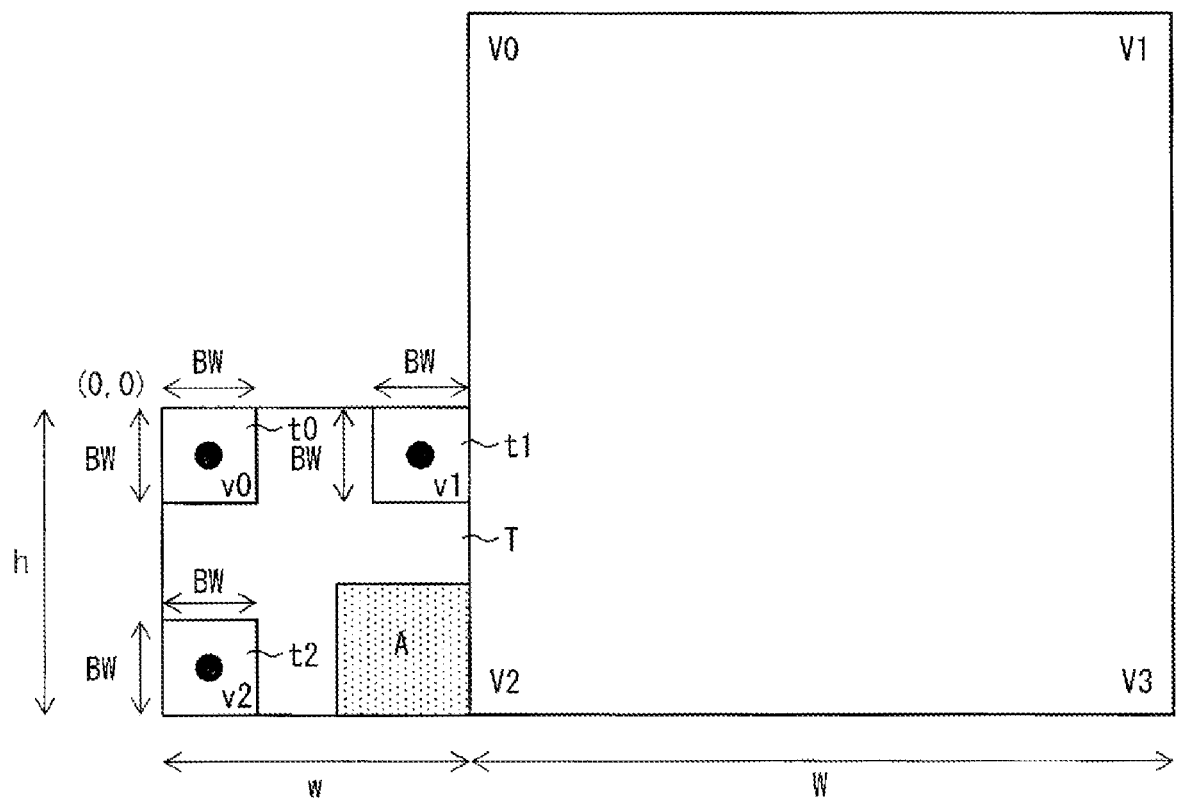
FIG. 30 is a diagram illustrating an example in which motion vectors of control points for a decoding target block is derived from three points contained in a block containing a prediction unit A.

This is described using FIG. 25 and FIG. 30 as below. FIG. 30 is a diagram illustrating an example in which the motion vectors of the control points V0 and V1 for the decoding target block are derived from three points v0, v1, and v2 contained in a block containing the prediction unit A illustrated in FIG. 25. In FIG. 30, illustration of the prediction units B to E is omitted for the purpose of simplification.

The merge candidate derivation unit 30361 checks whether or not the motion vectors of the prediction units A to E as illustrated in FIG. 25 are prediction units derived by use of the affine prediction, and selects a prediction unit derived using the affine prediction which is first detected.

For example, in a case that the prediction unit derived using the affine prediction which is first found by the merge candidate derivation unit 30361 is a prediction unit X (the prediction unit X is the prediction unit A in FIG. 30), the merge candidate derivation unit 30361 partitions a block T containing the prediction unit X into blocks (sub-blocks). Then, the merge candidate derivation unit 30361 configures blocks t0, t1, and t2 which respectively contain an upper left vertex, upper right vertex and lower left vertex of the block T, and have a side length of BW.

The merge candidate derivation unit 30361 uses a motion vector ($mv0\_x$, $mv0\_y$) of the point v0 located at a center of the block t0, a motion vector ($mv1\_x$, $mv1\_y$) of the point v1 located at a center of the block t1, and a motion vector ($mv2\_x$, $mv2\_y$) of the point v2 located at a center of the block t2 to derive a motion vector ($MV0\_x$, $MV0\_y$) of the control point V0 and a motion vector ($MV1\_x$, $MV1\_y$) of the control point V1 according to equations as below (corresponding to Equation AF_TRI0).

$$MVi\_x = mv0\_x + ev1/(w-BW)*xi - ev2/(h-BW)*yi$$

$$MVi\_y = mv0\_y + rv1/(w-BW)*xi + rv2/(h-BW)*yi$$

$$ev = (mv1\_x - mv0\_x)$$

$$rv1 = (mv1\_y - mv0\_y)$$

$$ev2 = -(mv2\_x - mv2\_x)$$

$$rv2 = (mv2\_y - mv0\_y)$$

Here, assuming that a location of the point V0 is (xPb, yPB), a location of the point V1 is (xPb+W, yPb) and a center position of the block t0 is (xPb−w+BW/2, yPb+H−h+BW/2). In contrast, with the base reference point (a center position of the block t0, here) being used as a reference, the location of the point V0 is (w−BW/2, h−BW/2−H) and the location of point V1 is (w−BW/2+W, h−BW/2−H). When the coordinates of the point V0 and point V1 with the base reference point being used as a reference are substituted for in (xi, yi) in the above equations, the motion vector ($MV0\_x$, $MV0\_y$) of the point V0 and the motion vector ($MV1\_x$, $MV1\_y$) of the point V1 are as below:

$$MV0\_x = mv0\_x + ev1/(w-BW)*(w-BW/2) - rv2/(h-BW)*(h-BW/2-H)$$

$$MV0\_y = mv0\_y + rv1/(w-BW)*(w-BW/2) + ev2/(h-BW)*(h-BW/2-H)$$

$$MV1\_x = mv0\_x + ev1/(w-BW)*(w-BW/2+W) - (rv2)/(h-BW)*(h-BW/2-H)$$

$$MV1\_y = mv0\_y + rv1/(w-BW)*(w-BW/2+W) + (ev2/(h-BW)*(h-BW/2-H).$$

The above description describes the example in which the merge candidate derivation unit 30361 derives the motion vectors of the control points V0 and V1 from the motion vectors of three points, the points v0 to v2, using Equation AF_TRI0, but the locations and the number of the representative points (control point) and the derivation equations are not limited thereto. For example, modification examples (a) to (f) below may be applied.

(a) The merge candidate derivation unit 30361 uses as the affine parameter (ev, rv) an average of (1) the affine parameter (ev1, rv1) derived from the motion vector of the point v0 and the motion vector of the point v1, and (2) the affine parameter (ev2, rv2) derived from the motion vector of the point v0 and the motion vector of the point v2 to use the motion vector derived by the affine prediction (corresponding to Equation AF_TRI1).

(b) The merge candidate derivation unit 30361 uses (1) a composed value (summed value) of the motion vector of the point v0 and the motion vector of the point v1, and (2) a composed value of the motion vector of the point v0 and the motion vector of the point v2.

(c) The merge candidate derivation unit 30361 uses one having a larger absolute value among the motion vector derived from the point v0 and the point v1, and the motion vector derived from the point v0 and the point v2 (corresponding to Equation AF_TRI2).

(d) The merge candidate derivation unit 30361 derives a value obtained by multiplying a value of one having a larger absolute value among the affine parameter derived from the point v0 and the point v1 and the affine parameter derived from the point v0 and the point v2 by a larger weighting coefficient, and a value obtained by multiplying a value of the other having a smaller absolute value by a smaller weighting coefficient, and uses an average of these derived values (weighted average) as the affine parameter (ev, rv) to use the motion vector derived by the affine prediction (corresponding to Equation AF_TRI3).

(e) The merge candidate derivation unit 30361 derives the motion vectors of the control points V0 and V1 for the decoding target block from the motion vectors of two points, the points v0 and v1, or the point v0 and v2, and the affine parameter (ev, rv) by substituting the specific locations of the points in the general expression (eq1) described above, and finds the motion vectors derived by the affine parameter and the affine prediction (corresponding to Equation AF_HOR and Equation AF_VER).

(f) The merge candidate derivation unit 30361 may derive the motion vectors of the control points V0 and V1 for the decoding target block from the motion vectors of the reference candidate points which are contained in the prediction units neighboring to the respective control points. For example, in a description using the example in which the prediction units A to E neighboring to any of the control points V0 to V2 of the prediction target block exist as illustrated in FIG. 25, the control points V0 to V2 are derived as below.

The motion vector of the control point V0 is derived from the reference candidate point B2 at the center position of the prediction unit E.

The motion vector of the control point V1 is derived from any of the reference candidate point B1 at the center position of the prediction unit B and the reference candidate point B0 at the center position of the prediction unit C.

The motion vector of the control point V2 is derived from any of the reference candidate point A1 at center position of the prediction unit A and the reference candidate point A0 at the center position of the prediction unit D.

In the case that the methods described in the above (modification example 3 of control point vector derivation step), (modification example 4 of control point vector derivation step), and (modification example 5 of control point vector derivation step) are applied, the locations (coordinates) of the control points V0 and V1 derived by referring to the motion vectors of the prediction units may not be necessarily the vertexes of the prediction block. To be more specific, the locations of the control points V0 and V1 may be the centers of the sub-blocks containing the control points V0 and V1, for example, as described above. To be more specific, the motion vector that the control points V0 and V1 are the vertexes of the decoding target block does not need to be computed.

Entropy Decoding Processing Related to Affine Prediction

Next, a description is given of entropy decoding processing related to the affine prediction described above using FIG. 31A to FIG. 38.

Code Included in Coded Data

As illustrated in FIG. 5, the inter-prediction parameter decoding control unit 3031 in the prediction parameter decoding unit 302 instructs the entropy decoding unit 301 to decode the code (syntax element) associated with the inter-prediction. In accordance with the instruction, the entropy decoding unit 301 performs entropy decoding on the coded stream Te input from outside to demultiplex and decode the individual codes (the prediction information for generating the prediction image and the residual information for generating the difference image). The entropy decoding unit 301 outputs some of the demultiplexed codes to the inter-prediction parameter decoding control unit 3031.

First, a description is given of the code included in coded data extracted by the prediction parameter decoding unit 302. Here, some of the syntax elements illustrated in FIG. 31A to FIG. 38 are described particularly.

CU_transquant_bypass_flag: a flag specifying whether the scaling and transform processing and the in-loop filtering is performed or skipped. In a case of 1, the scaling, transform processing, and in-loop filtering are skipped. In a case that this flag is 0, or this flag is not present, the scaling, transform processing, and in-loop filtering are not skipped. Note that the skip (or a skip mode) is a mode in which the motion vector and a transform coefficient are not coded, and whether to skip may be specified for each CU.

CU skip flag cu_skip_flag: a flag specifying whether a current coding unit is any of a P slice and a B slice. In a case that this flag is 1, it is indicated that only a merge candidate index is present. In a case that this flag is 0, it is indicated that other than the merge candidate index is also present.

Prediction mode flag pred_mode_flag: a flag specifying whether the current coding unit is coded in the inter-prediction mode or in the intra-prediction mode. It is indicated the current unit is coded in inter-prediction mode in a case of 0, and coded in the intra-prediction mode in a case of 1.

Partition mode part_mode: a flag specifying the partition mode of the current coding unit.

PU affine application flag pu_affine_enable_flag: a flag specifying whether or not the affine prediction is applied to the prediction unit. In a case that this flag is 1, 1 bit affine prediction is applied to a target prediction unit, and in a case that this flag is 0, 1 bit affine prediction is not applied to the target prediction unit.

Merge index merge_idx: a flag specifying the merge candidate index of the prediction unit.

abs_mvd_greater0_flag[ ]: a flag specifying whether or not an absolute value of the difference vector mvdLX is greater than 0.

abs_mvd_greater1_flag[ ]: a flag specifying whether or not the absolute value of the difference vector mvdLX is greater than 1.

abs_mvd_minus2[ ]: a flag specifying a value of the absolute value of the difference vector mvdLX minus 2.

mvd_sign_flag[ ][ ]: a flag specifying a positive or negative sign of the difference vector mvdLX.

ref_idx_l0[ ][ ]: a flag specifying the reference picture index refIdxL0 for a current prediction unit L0.

ref_idx_l1[ ][ ]: a flag specifying the reference picture index refIdxL1 for the current prediction unit L1.

Inter-prediction flag inter_pred_idc: a flag specifying a prediction manner of the current prediction unit. The prediction manner represents PRED_L0, PRED_L1, and PRED_BI.

mvp_l0_flag[ ][ ]: a flag specifying a motion vector predictor index of the prediction unit L0.

mvp_l0_flag[ ][ ]: a flag specifying a motion vector predictor index of the prediction unit L1.

In this example, the difference vector mvdLX is coded using multiple syntax elements, abs_mvd_greater0_flag, abs_mvd_greater1_flag, abs_mvd_minus2, and mvd_sign_flag, but the syntax element is not limited thereto. Note that a difference vector mvdAbsLX is decoded from abs_mvd_greater0_flag, abs_mvd_greater1_flag, abs_mvd_minus2, and mvd_sign_flag, according equations as below. Here, mvdAbsLX is an absolute value of the difference vector mvdAbsLX.

$$mvdAbsLX=(abs\_mvd\_greater0\_flag)?\\((abs\_mvd\_greater1\_flag)?abs\_mvd\_minus2+2):\\1):0$$

$$mvdLX=mvdAbsLX*(1-2*mvd\_sign\_flag)$$

On the other hand, the intra-prediction parameter decoding unit 304 instructs the entropy decoding unit 301 to decode the code (syntax element) associated with the intra-prediction. In accordance with the instruction, the entropy decoding unit 301 performs entropy decoding on the coded stream Te input from outside to demultiplex and decode the individual codes (the prediction information for generating the prediction image and the residual information for generating the difference image). The entropy decoding unit 301 outputs some of the demultiplexed codes to the intra-prediction parameter decoding unit 304. First, a description is given of the code included in coded data extracted by the intra-prediction parameter decoding unit 304. Here, some of the syntax elements illustrated in FIG. 31A to FIG. 38 are described particularly.

mpm index mpm_idx[ ][ ]: a flag specifying a most probable mode.

rem intra luma prediction mode rem_intra_luma_pred_mode[ ][ ]: a flag specifying a residual in the intra-prediction mode.

intra chroma prediction mode intra_chroma_pred_mode [ ][ ]: a flag specifying the intra-prediction mode for color difference signals.

prev_intra_luma_pred_flag[ ][ ]: a flag specifying a candidate in the intra-prediction mode. In a case that this flag is 1, it is indicated that the intra-prediction mode is derived from a neighboring intra-prediction unit, and in a case that this flag is 0, it is indicated that the intra-prediction mode is not derived from the neighboring intra-prediction unit.

PU Affine Application Flag

Next, a description is give of the decode processing for pu_affine_enable_flag using FIG. 31A to FIG. 34. FIG. 31A to FIG. 34 illustrate examples of the syntax contained in an exemplary coded stream.

FIG. 31A illustrates an example of the syntax for the coding unit (coding_unit (x0, y0, log 2CbSize), CuPredMode[xCb][yCb]), and FIG. 31B illustrates an example of a binarization table for switching validation/invalidation of Asymmetric Motion Partitioning (AMP) depending on a value of the PU affine application flag, the partition type, and the CU size. In FIG. 31B, "log 2CbSize" represents a coding unit CU size, and "MinCb Log 2SizeY" represents a minimum CU size. In a case of log 2CbSize>MinCb Log 2SizeY (that is, the coding unit CU size is not equal to the minimum CU size), the AMP is invalidated, and in a case of log 2CbSize==MinCb Log 2SizeY (that is, the coding unit CU size is equal to the minimum CU size), the AMP is validated.

FIG. 32 is an example of the syntax for the prediction unit (prediction_unit (x0, y0, nPbW, nPbH)). FIG. 33 is an example the syntax for coding of the motion vector (mvd_coding (x0, y0, refList)). FIG. 34 is another example of the syntax for the coding unit (coding_unit (x0, y0, log 2CbSize)).

As illustrated in FIGS. 31 to 34, the inter-prediction parameter decoding control unit 3031 determines whether or not part_mode decoded by the entropy decoding unit 301 is 2N×2N, and in a case of part_mode of 2N×2N, instructs the entropy decoding unit 301 to decode a further 1 bit of pu_affine_enable_flag contained in the coded stream Te. By doing so, the inter-prediction parameter decoding control unit 3031 decodes pu_affine_enable_flag.

This is specifically described using FIG. 32. The syntax for the prediction unit in FIG. 32 includes three PU affine application flags pu_affine_enable_flag. The first PU affine application flag pu_affine_enable_flag in the coding unit is decoded when the CU skip flag cu_skip_flag is 1. To be more specific, the inter-prediction parameter decoding control unit 3031 decodes the first PU affine application flag pu_affine_enable_flag in prediction_mode for a skip mode that is one of the merge prediction.

The syntax in FIG. 32 further includes the second and third PU affine application flags pu_affine_enable_flag. The second and third PU affine application flags pu_affine_enable_flag are respectively decoded depending on merge_flag specifying whether the prediction mode is the merge prediction mode or the AMVP prediction mode, that is, the inter-prediction parameter decoding control unit 3031 decodes the PU affine application flag pu_affine_enable_flag every time the prediction mode is determined to be the merge prediction mode or the AMVP prediction mode.

As illustrated in the syntax element immediately above the second and third PU affine application flags pu_affine_enable_flag, the inter-prediction parameter decoding control unit 3031 decodes pu_affine_enable_flag when part_mode is 2N×2N.

Here, in the case that part_mode is 2N×2N, the number of prediction blocks is one, that is, the partition type is not for partitioning into multiple prediction block. To be more specific, in the case that part_mode is 2N×2N, coding of the motion vectors of multiple prediction blocks is not necessary basically.

However, in accordance with the syntax illustrated in FIG. 32, the inter-prediction parameter decoding control unit 3031 needs to code the motion vectors of multiple prediction blocks in the case that the PU affine application flag pu_affine_enable_flag is 1 even in the case the part_mode is 2N×2N. The number of the control points for the affine prediction is two, and thus the number of difference vectors added to the prediction vectors of two control points has to be two in the case in the AMVP mode. Specifically, as the syntax illustrated in FIG. 33, in the case that the PU affine application flag pu_affine_enable_flag is 1, the number of times of decoding loop for difference vector is made two depending on the PU affine application flag pu_affine_enable_flag such that two difference vectors are derived even in a case that part_mode is 2N×2N. In this case, the process increases, which may probably complex the processing.

Modification Example 1 of Coding Processing of PU Affine Application Flag

Then, the inter-prediction parameter decoding control unit 3031 may decode the flag specifying whether or not the affine prediction is used, in the case that the merge flag merge_flag specifies that merge processing is not performed and that the syntax, part_mode, indicating the partition mode is N×2N.

FIG. 35 illustrates the syntax for the prediction unit (prediction_unit (x0, y0, nPbW, nPbH)) that is an example of the syntax contained in an exemplary coded stream.

As illustrated in FIG. 35, the inter-prediction parameter decoding control unit 3031 may instruct the entropy decoding unit 301 to decode the PU affine application flag pu_affine_enable_flag only in a case that a PU size ("nPbW" in the drawing) is larger than 8.

The syntax for the prediction unit in FIG. 35 includes three PU affine application flags pu_affine_enable_flag. The first PU affine application flag pu_affine_enable_flag in the prediction unit is decoded when the CU skip flag cu_skip_flag is 1. As illustrated in the syntax element immediately above the second PU affine application flag pu_affine_enable_flag, the inter-prediction parameter decoding control unit 3031 decodes pu_affine_enable_flag when part_mode is 2N×2N.

Then, as illustrated in the syntax element immediately above the third PU affine application flag pu_affine_enable_flag in FIG. 35, in the case of the AMVP mode, the inter-prediction parameter decoding control unit 3031 may instruct to decode pu_affine_enable_flag in the case that the PU size ("nPbW" in the drawing) is larger than 8 and in a case that part_mode is N×2N. To be more specific, in accordance with the syntax illustrated in FIG. 35, as compared with the syntax illustrated in FIG. 32, in the case of the AMVP mode in which the difference motion vector is decoded (the case that the CU skip flag cu_skip_flag is 0) and in the case that the number of partitions is 2 (the case that part_mode is N×2N, here), the inter-prediction parameter decoding control unit 3031 decodes the PU affine application flag pu_affine_enable_flag. Therefore, part_ mode is N×2N, and thus in the case that the affine prediction is applied, the two difference motion vectors can be decoded as in FIG. 33 without performing the decoding loop for difference vector mvd_coding two times.

In this way, the inter-prediction parameter decoding control unit 3031 may determine whether or not part_mode decoded by the entropy decoding unit 301 indicates N×2N in the case of the AMVP prediction mode in which the difference motion vector is coded. Then, the inter-prediction parameter decoding control unit 3031 may instruct the entropy decoding unit 301 to decode a further 1 bit of pu_affine_enable_flag contained in the coded stream Te in the case that part_mode indicates N×2N. On the other hand, in the case that part_mode is 2N×2N, the inter-prediction parameter decoding control unit 3031 does not instruct the entropy decoding unit 301.

In the case of the merge prediction mode in which the difference motion vector is not coded, the inter-prediction parameter decoding control unit 3031 decodes the PU affine application flag pu_affine_enable_flag in a case that part_mode is 2N×2N and the PU affine application flag pu_affine_enable_flag is 1.

Modification Example 2 of Coding Processing of PU Affine Application Flag

Alternatively, the inter-prediction parameter decoding control unit 3031 may decode the flag specifying whether or not the affine prediction is used, in the case that the merge flag merge_flag specifies that merge processing is not performed and that the syntax, part_mode, indicating the partition mode is other than 2N×2N, and may set partition mode to N×2N in the case that the flag specifies that the affine prediction is used.

In the case whether or not part_mode decoded by the entropy decoding unit 301 is 2N×2N is determined and part_mode is other than 2N×2N, the inter-prediction parameter decoding control unit 301 may instruct the entropy decoding unit 301 to decode a further 1 bit of pu_affine_enable_flag contained in the coded stream Te. On the other hand, in the case that part_mode is 2N×2N, the inter-prediction parameter decoding control unit 3031 does not instruct the entropy decoding unit 301.

This is described using FIG. 36. FIG. 36 is an example of a binarization table for switching validation/invalidation of Asymmetric Motion Partitioning (AMP) depending on the value of the PU affine application flag, the partition type, and the CU size. In another example binarization table, eight partition types, part_mode 0 to 7, are defined for the inter-prediction mode. On the other hand, the binarization table illustrated in FIG. 36 is different from the another binarization table in having part_mode 0 to 8.

For example, the binarization table illustrated in FIG. 36 further have fields, in addition to the above another binarization table, for the case that part_mode indicates N×2N in the inter-prediction mode in order to cope with the case that the PU affine application flag pu_affine_enable_flag is 1. As a result, in the binarization table in FIG. 36, the case that part_mode indicates N×2N in the inter-prediction mode is present in two fields corresponding to part_mode=2 and part_mode=8, and the case that the PU affine application flag pu_affine_enable_flag is 0 corresponds to part_mode=2 and the case that PU affine application flag pu_affine_enable_flag is 1 corresponds to part_mode=8.

In this way, part_mode (e.g., N×2N) in which two difference vectors mvdLX need to be coded in the AMVP prediction mode may be associated with the case that the PU affine application flag pu_affine_enable_flag is 1. This allows the inter-prediction parameter decoding control unit 3031 to utilize decoding of two difference motion vectors which is inherently required (explicitly, two sets of difference vectors mvdLX each of which includes set of X component and Y component) in the case that part_mode indicates N×2N. Therefore, the number of loops of the processing for decoding the difference vector mvdLX does not need to be changed depending on the PU affine application flag pu_affine_enable_flag, which can prevent the process from increasing.

Modification Example 3 of Coding Processing of PU Affine Application Flag

Alternatively, the inter-prediction parameter decoding control unit 3031 may decode the flag specifying whether or not the affine prediction is used, in the case that the merge flag merge_flag specifies that merge processing is not performed and that the syntax, part_mode, indicating the partition mode in which the number of partitions is 2, that is, N×2N or 2N×N.

To be more specific, the inter-prediction parameter decoding control unit 3031 may decode the flag specifying whether or not the affine prediction is used, in the case that the merge flag merge_flag specifies that merge processing is not performed and that the syntax, part_mode, indicating the partition mode in which the number of partitions is 2, that is, N×2N or 2N×N.

FIG. 37 illustrates the syntax for the prediction unit (prediction_unit (x0, y0, nPbW, nPbH)) that is an example of the syntax contained in an exemplary coded stream. Among three PU affine application flags pu_affine_enable_flag included in the syntax illustrated in FIG. 37, the first and second PU affine application flags pu_affine_enable_flag are decoded under the same conditions as in FIG. 35. However, in FIG. 37, as illustrated in the syntax element immediately above the third PU affine application flag pu_affine_enable_flag, the inter-prediction parameter decoding control unit 3031 decodes pu_affine_enable_flag when part_mode is 2N×2N or N×2N.

This provides the effect the same as that described in the above (modification example 1 of coding processing of PU affine application flag).

Modification Example 4 of Coding Processing of PU Affine Application Flag

Alternatively, in the case that the merge flag merge_flag specifies that merge processing is not performed and in the case that the syntax, part_mode, indicating the partition mode is decoded, some of bits of binarization for the resultant part_mode indicate the partition mode, and the partition mode indicates two modes in which the number of partitions is 2 (2N×N or N×2N), the inter-prediction parameter decoding control unit 3031 may decode the flag specifying whether or not the affine prediction is used as one of other bits of the binarization for the syntax indicating the partition mode included in the merge flag merge_flag.

This is described using FIG. 38. FIG. 38 is another example of the binarization table for switching validation/invalidation of Asymmetric Motion Partitioning (AMP) depending on the value of the PU affine application flag, the partition type, and the CU size. The binarization table illustrated in FIG. 38 is different from another example binarization table in having part_mode 0 to 9.

For example, the binarization table illustrated in FIG. 38 further have fields, in addition to another example binarization table, for the case that part_mode is 2N×N in the inter-prediction mode and the case that part_mode is N×2N in the inter-prediction mode the PU affine application flag pu_affine_enable_flag is 1.

As a result, in the binarization table in FIG. 38, the case corresponding to part_mode of 2N×N in the inter-prediction mode is present in two fields corresponding to part_mode=1 and part_mode=8, and the case that the PU affine application flag pu_affine_enable_flag is 0 corresponds to part_mode=1 and the case that PU affine application flag pu_affine_enable_flag is 1 corresponds to part_mode=8. Similarly, the case corresponding to part_mode of N×2N in the inter-prediction mode is present in two fields corresponding to part_mode=2 and part_mode=9, and the case that the PU affine application flag pu_affine_enable_flag is 0 corresponds to part_mode=2 and the case that PU affine application flag pu_affine_enable_flag is 1 corresponds to part_mode=9.

A illustrated in FIG. 38, in a case that, in the syntax, part_mode, indicating the partition mode which is decoded in the case that the merge flag merge_flag specifies that merge processing is not performed, some of bits of binarization for part_mode indicate the partition mode, and the partition mode indicates two modes in which the number of partitions is 2 (2N×N or N×2N), (part_mode=1, part_mode=2, part_mode=8, part_mode=9), the PU affine application flag pu_affine_enable_flag specifying whether or not the affine prediction is included as one of other bits of the binarization for the syntax indicating the partition mode.

In this way, part_mode (e.g., 2N×N and N×2N) in which two difference vectors mvdLX need to be coded in the AMVP prediction mode may be associated with the case that the PU affine application flag pu_affine_enable_flag is 1. This allows the inter-prediction parameter decoding control unit 3031 to utilize decoding of the difference motion vectors which is inherently required in the case that part_mode indicates 2N×N and N×2N. Therefore, the number of loops of decoding the difference vector mvdLX does not need to be changed depending on the PU affine application flag pu_affine_enable_flag, which can prevent the process from increasing.

Furthermore, the inter-prediction parameter decoding control unit 3031 may be configured to use the point v0 and the point v1 located in parallel with each other as the control points for the decoding target block in the case that part_mode indicates N×2N, and use the control points of the point v0 and the point v2 located perpendicular to each other as the control point for the decoding target block in the case that part_mode indicates 2N×N.

Configuration of Image Coding Device

Figure 12:
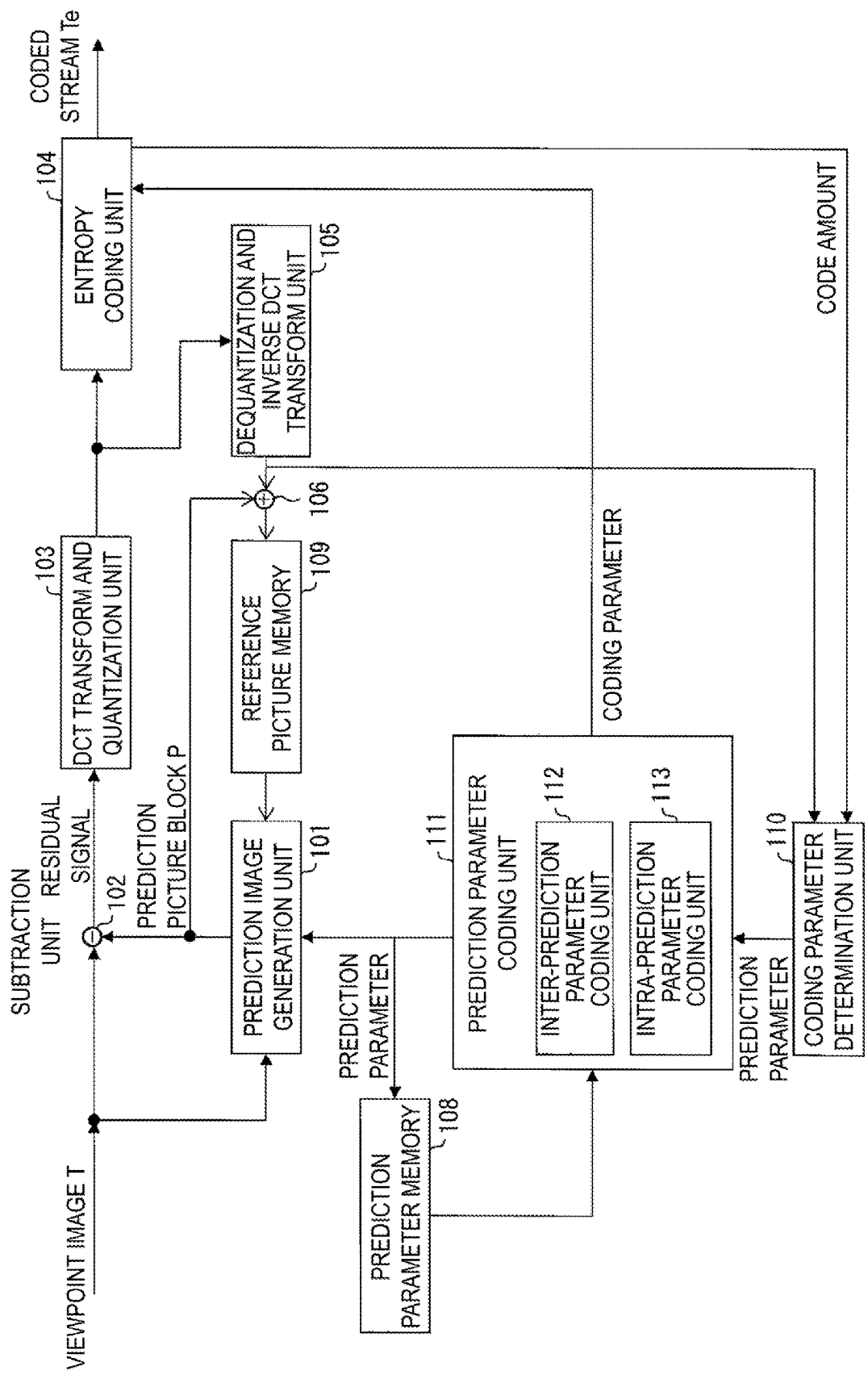
FIG. 12 is a block diagram illustrating a configuration of an image coding device according to the present embodiment.

Next, a configuration of the image coding device 11 according to the present embodiment will be described. FIG. 12 is a block diagram illustrating the configuration of the image coding device 11 according to the present embodiment. The image coding device 11 is configured to include a prediction image generation unit 101 (prediction image generation device), a subtraction unit 102, a DCT and quantization unit 103, an entropy coding unit 104, a dequantization and inverse DCT unit 105, an addition unit 106, a prediction parameter memory (prediction parameter storage unit, frame memory) 108, a reference picture memory (reference image storage unit, frame memory) 109, a coding parameter determination unit 110, a prediction parameter coding unit 111, and a residual storage unit 313 (residual recording unit). The prediction parameter coding unit 111 is configured to include an inter-prediction parameter coding unit 112 and an intra-prediction parameter coding unit 113.

The prediction image generation unit 101 generates a prediction picture block P of a picture for each block, the picture being of a layer image T input from outside for each viewpoint, the block being an area obtained by partitioning the picture. Here, the prediction image generation unit 101 reads out a reference picture block, based on a prediction parameter input from the prediction parameter coding unit 111 from the reference picture memory 109. The prediction parameter input from the prediction parameter coding unit 111 is a motion vector or a displacement vector, for example. The prediction image generation unit 101 reads out a reference picture block of a block at a location indicated by a motion vector or displacement vector predicted with a starting point being a coding target block. The prediction image generation unit 101 generates the prediction picture block P for the read out reference picture block by use of one prediction scheme of multiple prediction schemes. The prediction image generation unit 101 outputs the generated prediction picture block P to the subtraction unit 102. The prediction image generation unit 101 operates in the same way as the prediction image generation unit 308 described already, and therefore, a detailed description of generating the prediction picture block P is omitted.

The prediction image generation unit 101, in selecting the prediction scheme, selects a prediction scheme which minimizes an error value based on a difference between a signal value for each pixel in the block included in the image and a signal value for each of corresponding pixels in the prediction picture block P, for example. The method of selecting the prediction scheme is not limited to the above.

Multiple prediction schemes include the intra-prediction, the motion prediction, and the merge prediction. The motion prediction is the prediction between display times among the inter-predictions described above. The merge prediction is prediction using the reference picture block and prediction parameter the same as for a block which is already coded and in a predefined range from the coding target block.

The prediction image generation unit 101, in a case of selecting the intra-prediction, outputs a prediction mode IntrapredMode indicating the intra-prediction mode which has been used in generating the prediction picture block P to the prediction parameter coding unit 111.

The prediction image generation unit 101, in a case of selecting the motion prediction, stores the motion vector mvLX which has been used in generating the prediction picture block P in the prediction parameter memory 108, and outputs the motion vector to the inter-prediction parameter coding unit 112. The motion vector mvLX indicates a vector from a location of the coding target block to a location of the reference picture block in generating the prediction picture block P. Information indicating the motion vector mvLX includes information indicating the reference picture (e.g., reference picture index refIdxLX, picture order count POC), and may indicate the prediction parameter. The prediction image generation unit 101 outputs the prediction mode predMode indicating the inter-prediction mode to the prediction parameter coding unit 111.

The prediction image generation unit 101, in a case of selecting the merge prediction, outputs the merge index merge_idx indicating the selected reference picture block to the inter-prediction parameter coding unit 112. The prediction image generation unit 101 outputs the prediction mode predMode indicating the merge prediction mode to the prediction parameter coding unit 111.

The subtraction unit 102 subtracts for each pixel the signal value of the prediction picture block P input from the prediction image generation unit 101 from the signal value of the corresponding block of the layer image input from outside to generate a residual signal. The subtraction unit 102 outputs the generated residual signal to the DCT and quantization unit 103 and the coding parameter determination unit 110.

The DCT and quantization unit 103 performs DCT on the residual signal input from the subtraction unit 102 to compute DCT coefficients. The DCT and quantization unit 103 quantizes the computed DCT coefficients to find quantized coefficients. The DCT and quantization unit 103 outputs the found quantized coefficients to the entropy coding unit 104 and the dequantization and inverse DCT unit 105.

To the entropy coding unit 104, input are the quantized coefficients from the DCT and quantization unit 103 and coding parameters from the coding parameter determination unit 110. Examples of the input coding parameters include the codes such as the reference picture index refIdxLX, the prediction vector index mvp_LX_idx, the difference vector mvdLX, the prediction mode predMode, and the merge index merge_idx.

The entropy coding unit 104 performs entropy coding on the input quantized coefficients and coding parameters to generate a coded stream Te, and outputs, to outside, the generated coded stream Te.

The dequantization and inverse DCT unit 105 dequantizes the quantized coefficients input from the DCT and quantization unit 103 to find DCT coefficients. The dequantization and inverse DCT unit 105 performs inverse DCT on the found DCT coefficients to compute a decoded residual signal. The dequantization and inverse DCT unit 105 outputs the computed decoded residual signal to the addition unit 106.

The addition unit 106 adds for each pixel a signal value of the prediction picture block P input from the prediction image generation unit 101 and a signal value of the decoded residual signal input from the dequantization and inverse DCT unit 105 to generate a reference picture block. The addition unit 106 store the generated reference picture block in the reference picture memory 109.

The prediction parameter memory 108 stores the prediction parameter generated by the prediction parameter coding unit 111 in a predefined location for each coding target picture and block.

The reference picture memory 109 stores the reference picture block generated by the addition unit 106 in a predefined location for each coding target picture and block.

The coding parameter determination unit 110 selects one set from among multiple sets coding parameters. The coding parameters are the prediction parameters described above or parameters to be predicted that are generated in association with the prediction parameters. The prediction image generation unit 101 uses each of these sets of coding parameters to generate the prediction picture block P.

The coding parameter determination unit 110 computes a cost value indicating a size of an amount of information and a coding error for each of multiple sets. The cost value is a sum of a code amount and a value obtained by multiplying a square error by a coefficient λ, for example. The code amount is an amount of information of the coded stream Te obtained by performing entropy coding on the quantization error and the coding parameters. The square error is a sum of squares of residual error values of the residual signals computed by the subtraction unit 102 for respective pixels. The coefficient λ is a preconfigured real number greater than zero. The coding parameter determination unit 110 selects a set of coding parameters for which the computed cost value is minimum. This allows the entropy coding unit 104 to output, to outside, the selected set of coding parameters as the coded stream Te and not to output the not selected set of coding parameters.

The prediction parameter coding unit 111 derives a prediction parameter used for generating the prediction picture, based on the parameter input from the prediction image generation unit 101 and codes the derived prediction parameter to generate a set of coding parameters. The prediction parameter coding unit 111 outputs the generated set of coding parameters to the entropy coding unit 104.

The prediction parameter coding unit 111 stores the prediction parameter corresponding to the set selected by the coding parameter determination unit 110 among the generated set of coding parameters in the prediction parameter memory 108.

In a case that the prediction mode predMode input from the prediction image generation unit 101 specifies the inter-prediction mode, the prediction parameter coding unit 111 makes the inter-prediction parameter coding unit 112 operate. In a case that the prediction mode predMode specifies the intra-prediction mode, the prediction parameter coding unit 111 makes the intra-prediction parameter coding unit 113 operate.

The inter-prediction parameter coding unit 112 derives an inter-prediction parameter, based on the prediction parameter input from the coding parameter determination unit 110. The inter-prediction parameter coding unit 112 has, as a configuration for deriving the inter-prediction parameter, a configuration the same as the configuration in which the inter-prediction parameter decoding unit 303 (see FIG. 5, or the like) derives the inter-prediction parameter. The configuration of the inter-prediction parameter coding unit 112 is described below.

The intra-prediction parameter coding unit 113 defines, as a set of inter-prediction parameters, the intra-prediction mode IntraPredMode which is specified by the prediction mode predMode input from the coding parameter determination unit 110.

Configuration of Inter-Prediction Parameter Coding Unit

Next, a description is given of the configuration of the inter-prediction parameter coding unit 112. The inter-prediction parameter coding unit 112 is means corresponding to the inter-prediction parameter decoding unit 303.

Figure 13:
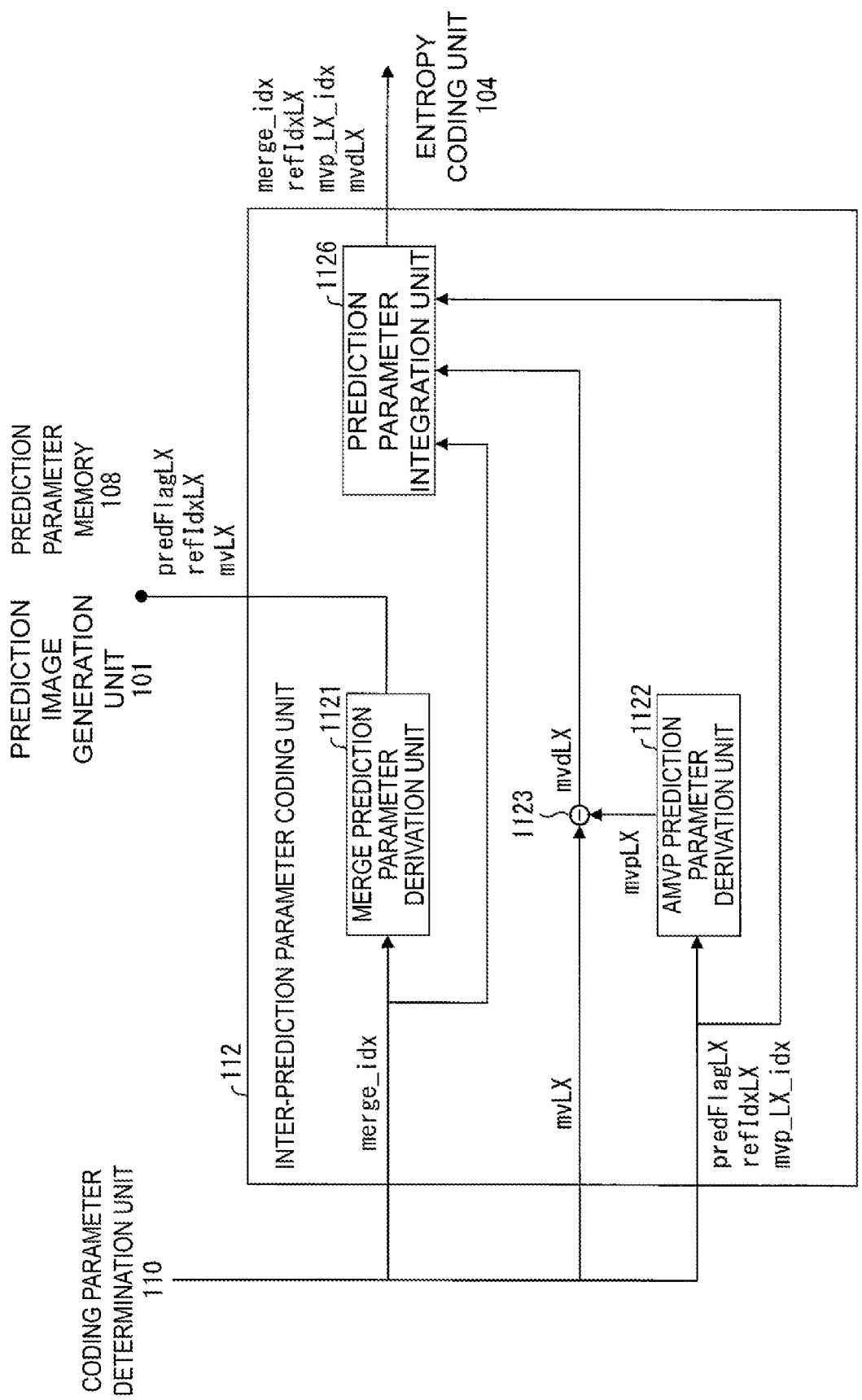
FIG. 13 is a schematic diagram illustrating a configuration of an inter-prediction parameter coding unit according to the present embodiment.

FIG. 13 is a schematic diagram illustrating the configuration of the inter-prediction parameter coding unit 112 according to the present embodiment.

The inter-prediction parameter coding unit 112 is configured to include a merge prediction parameter derivation unit 1121, an AMVP prediction parameter derivation unit 1122, a subtraction unit 1123, and a prediction parameter integration unit 1126.

The merge prediction parameter derivation unit 1121 has a configuration similar to the merge prediction parameter derivation unit 3036 described above (see FIG. 7) and the AMVP prediction parameter derivation unit 1122 has a configuration similar to the AMVP prediction parameter derivation unit 3032 described above (see FIG. 8).

In a case that prediction mode predMode input from the prediction image generation unit 101 specifies the merge prediction mode, the merge index merge_idx is input from the coding parameter determination unit 110 to the merge prediction parameter derivation unit 1121. The merge index merge_idx is output to the prediction parameter integration unit 1126. The merge prediction parameter derivation unit 1121 reads out a reference picture index refIdxLX and motion vector mvLX of a reference block indicated by the merge index merge_idx among the merge candidates from the prediction parameter memory 108. The merge candidate is a reference block in a predefined range from the coding target block to be coded (e.g., a reference block in contact with a lower left end, upper left end, or upper right end of coding target block), is a reference block on which the coding processing is completed.

The AMVP prediction parameter derivation unit 1122 has a configuration similar to the AMVP prediction parameter derivation unit 3032 described above (see FIG. 8).

To be more specific, in a case that the prediction mode predMode input from the prediction image generation unit 101 specifies the inter-prediction mode, the motion vector mvLX is input from the coding parameter determination unit 110 to the AMVP prediction parameter derivation unit 1122. The AMVP prediction parameter derivation unit 1122 derives a prediction vector mvpLX, based on the input motion vector mvLX. The AMVP prediction parameter derivation unit 1122 outputs the derived prediction vector mvpLX to the subtraction unit 1123. The reference picture index refIdx and the prediction vector index mvp_LX_idx are output to the prediction parameter integration unit 1126.

The subtraction unit 1123 subtracts the prediction vector mvpLX input from the AMVP prediction parameter derivation unit 1122 from the motion vector mvLX input from the coding parameter determination unit 110 to generate a difference vector mvdLX. The difference vector mvdLX is output to the prediction parameter integration unit 1126.

In a case that prediction mode predMode input from the prediction image generation unit 101 specifies the merge prediction mode, the prediction parameter integration unit 1126 outputs the merge index merge_idx input from the coding parameter determination unit 110 to the entropy coding unit 104.

In a case that the prediction mode predMode input from the prediction image generation unit 101 specifies the inter-prediction mode, the prediction parameter integration unit 1126 performs the processing below.

The prediction parameter integration unit 1126 integrates the reference picture index refIdxLX and prediction vector index mvp_LX_idx input from the coding parameter determination unit 110 and the difference vector mvdLX input from the subtraction unit 1123. The prediction parameter integration unit 1126 outputs the integrated code to the entropy coding unit 104.

The inter-prediction parameter coding control unit 112 may include an inter-prediction parameter coding control unit (not illustrated) which instructs the entropy coding unit 104 to decode the code (syntax element) associated with the inter-prediction to code the code (syntax element) included in the coded data, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

In this case, an inter-prediction parameter coding control unit 1031 is configured to include a merge index coding unit (corresponding to the merge index decoding unit 30312 in FIG. 10), a vector candidate index coding unit (corresponding to the vector candidate index decoding unit 30313 in FIG. 10), and a partition mode coding unit, a merge flag coding unit, an inter-prediction flag coding unit, a reference picture index coding unit, a vector difference coding unit and the like. The partition mode coding unit, the merge flag coding unit, the merge index coding unit, the inter-prediction flag coding unit, the reference picture index coding unit, the vector candidate index coding unit, and the vector difference coding unit code respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

A part of the image coding device 11 and the image decoding device 31 in the embodiment described above, for example, the entropy decoding unit 301, the prediction parameter decoding unit 302, the prediction image generation unit 101, the DCT and quantization unit 103, the entropy coding unit 104, the dequantization and inverse DCT unit 105, the coding parameter determination unit 110, the prediction parameter coding unit 111, the entropy decoding unit 301, the prediction parameter decoding unit 302, the prediction image generation unit 308, and the dequantization and inverse DCT unit 311 may be implemented by a computer. In this case, this configuration may be realized by recording a program for realizing such control functions on a computer-readable recording medium and causing a computer system to read the program recorded on the recording medium for execution. Note that it is assumed that the "computer system" herein refers to a computer system built into any of the image coding devices 11 to 11$h$, the image decoding devices 31 to 31$h$, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

The image coding device 11 and image decoding device 31 in the present embodiment described above may be partially or completely realized as an integrated circuit such as a Large Scale Integration (LSI) circuit. The functional blocks of the image coding device 11 and the image decoding device 31 may be individually realized as processors, or may be partially or completely integrated into a processor. The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, an integrated circuit based on the technology may be used.

The embodiment of the disclosure has been described in detail above referring to the drawings, but the specific configuration is not limited to the above embodiment and various amendments can be made to a design that fall within the scope that does not depart from the gist of the disclosure.

Application Example

The image coding device 11 and the image decoding device 31 described above can be used in a state of being equipped on various devices for transmitting, receiving, recording, and reproducing a video. The video may be a natural video imaged by a camera or the like, or an artificial video (including CG and GUI) generated by using a computer or the like.

Figure 39A:
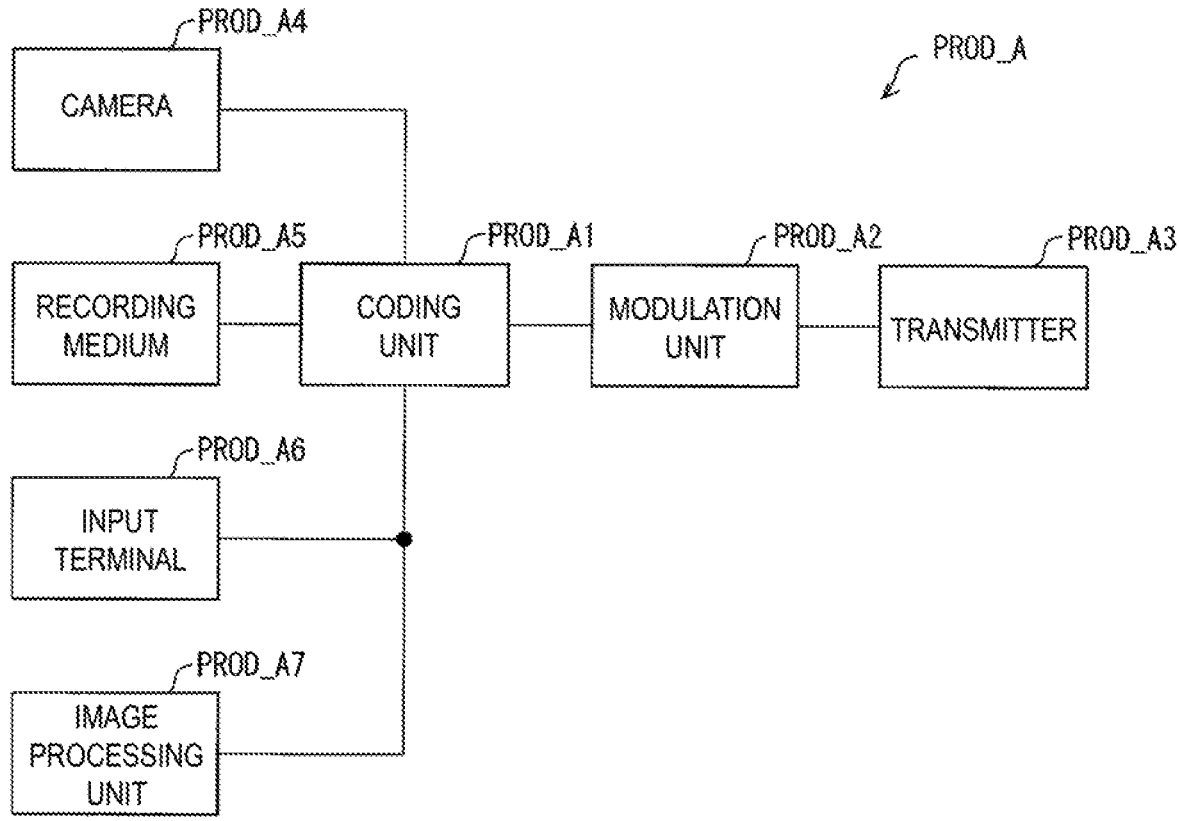
FIGS. 39A and 39B are diagrams illustrating configurations of a transmission device equipped with the above image coding device and a reception device equipped with the above image decoding device.
Figure 39B:
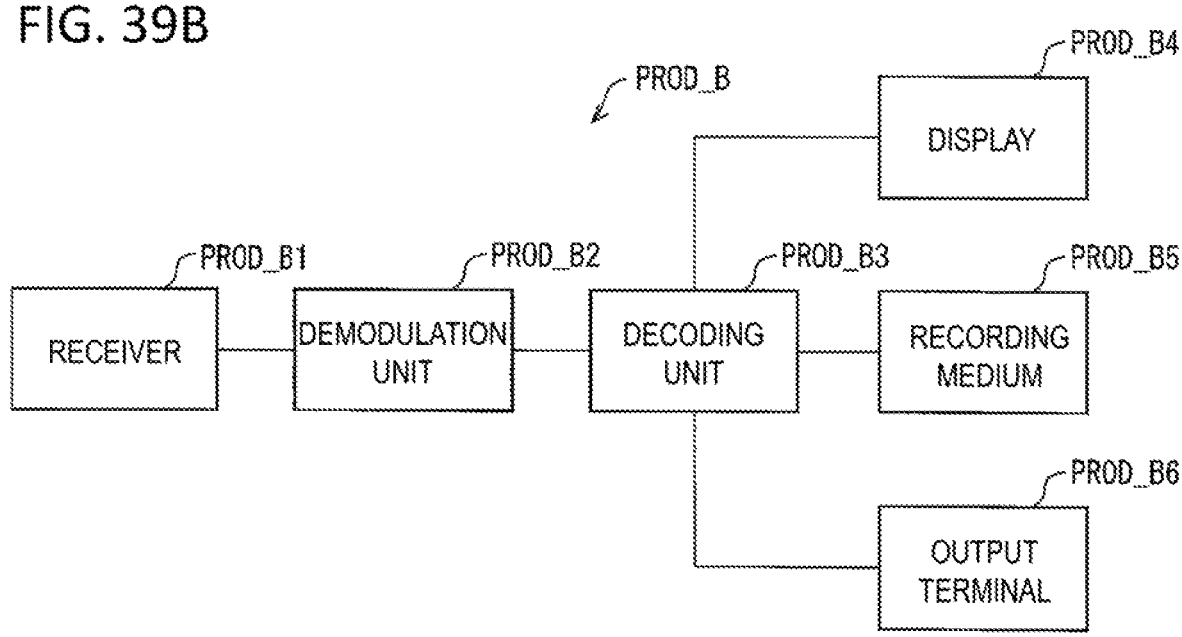

First, a description is given of that the image coding device 11 and the image decoding device 31 described above can be used to receive and transmit the video with reference to FIGS. 39A and 39B.

FIG. 39A is a block diagram illustrating a configuration of a transmission device PROD_A equipped with the image coding device 11. As illustrated in FIG. 39A, the transmission device PROD_A includes a coding unit PROD_A1 that codes a video to acquire coded data, a modulation unit PROD_A2 that modulates a carrier wave by using the coded data acquired by the coding unit PROD_A1 to acquire a modulated signal, and a transmitter PROD_A3 that transmits the modulated signal acquired by the modulation unit PROD_A2. The image coding device 11 described above is used as the coding unit PROD_A1.

The transmission device PROD_A may further include, as resources for supplying a video input to the coding unit PROD_A1, a camera PROD_A4 that images a video, a recording medium PROD_A5 that records a video therein, an input terminal PROD_A6 that inputs a video from outside, and an image processing unit A7 that generates or processes an image. FIG. 39A illustrates the configuration in which the transmission device PROD_A includes all of the above components, but some of these may be omitted.

The recording medium PROD_A5 may recode the video not coded, or the video coded using a coding scheme for recording different from the coding scheme for transmission. In the latter case, a decoding unit (not illustrated) which decodes the coded data read out from the recording medium PROD_A5 in accordance with the coding scheme for recording may be provided between the recording medium PROD_A5 and the coding unit PROD_A1.

FIG. 39B is a block diagram illustrating a configuration of a reception device PROD_B equipped with the image decoding device 31. As illustrated in FIG. 39B, the reception device PROD_B includes a receiver PROD_B1 that receives a modulated signal, a demodulation unit PROD_B2 that demodulate the modulated signal received by the receiver PROD_B1 to acquire coded data, and a decoding unit PROD_B3 that decodes the coded data acquired by the demodulation unit PROD_B2 to acquire a video. The image decoding device 31 described above is used as the decoding unit PROD_B3.

The reception device PROD_B may further include, as supply destinations of the video output by the decoding unit PROD_B3, a display PROD_B4 that displays the video, a recording medium PROD_B5 that records the video, and an output terminal PROD_B6 that outputs the video to outside. FIG. 39B illustrates the configuration in which the reception device PROD_B includes all of the above components, but some of these may be omitted.

The recording medium PROD_B5 may be configured to recode the video not coded, or the video coded using a coding scheme for recording different from the coding scheme for transmission. In the latter case, a coding unit (not illustrated) which codes the video acquired from the decoding unit PROD_B3 in accordance with the coding scheme for recording may be provided between the decoding unit PROD_B3 and the recording medium PROD_B5.

A transmission medium for transmitting the modulated signal may be wireless or wired. A transmission aspect of transmitting the modulated signal may be a broadcast (here, referred to a transmission aspect of which transmission destination is not specified in advance), or a communication (here, referred to a transmission aspect of which transmission destination is specified in advance). To be more specific, transmission of the modulated signal may be achieved by any of a radio broadcast, a cable broadcast, a radio communication, and a cable communication.

For example, a broadcast station (such as broadcast facilities)/receiving station (such as a TV set) of digital terrestrial broadcasting is an example of the transmission device PROD_A/reception device PROD_B transmitting and/or receiving the modulated signal on the radio broadcast. A broadcast station (such as broadcast facilities)/receiving station (such as a TV set) of a cable television broadcasting is an example of the transmission device PROD_A/reception device PROD_B transmitting and/or receiving the modulated signal on the cable broadcast.

A server (such as a workstation)/client (such as a TV set, a personal computer, a smartphone) including a Video On Demand (VOD) service or video-sharing service using the Internet is an example of the transmission device PROD_A/reception device PROD_B transmitting and/or receiving the modulated signal on the communication (in general, a wireless or wired transmission medium is used in LAN, and a wired transmission medium is used in WAN). Here, the personal computer includes a desktop PC, laptop PC, and a tablet PC. The smartphone also includes a multifunctional mobile phone terminal.

The video-sharing service client has a function to decode coded data downloaded from the server to display on a display, and a function to code a video imaged by a camera to upload to the sever. To be more specific, the video-sharing service client functions as both the transmission device PROD_A and the reception device PROD_B.

Figure 40A:
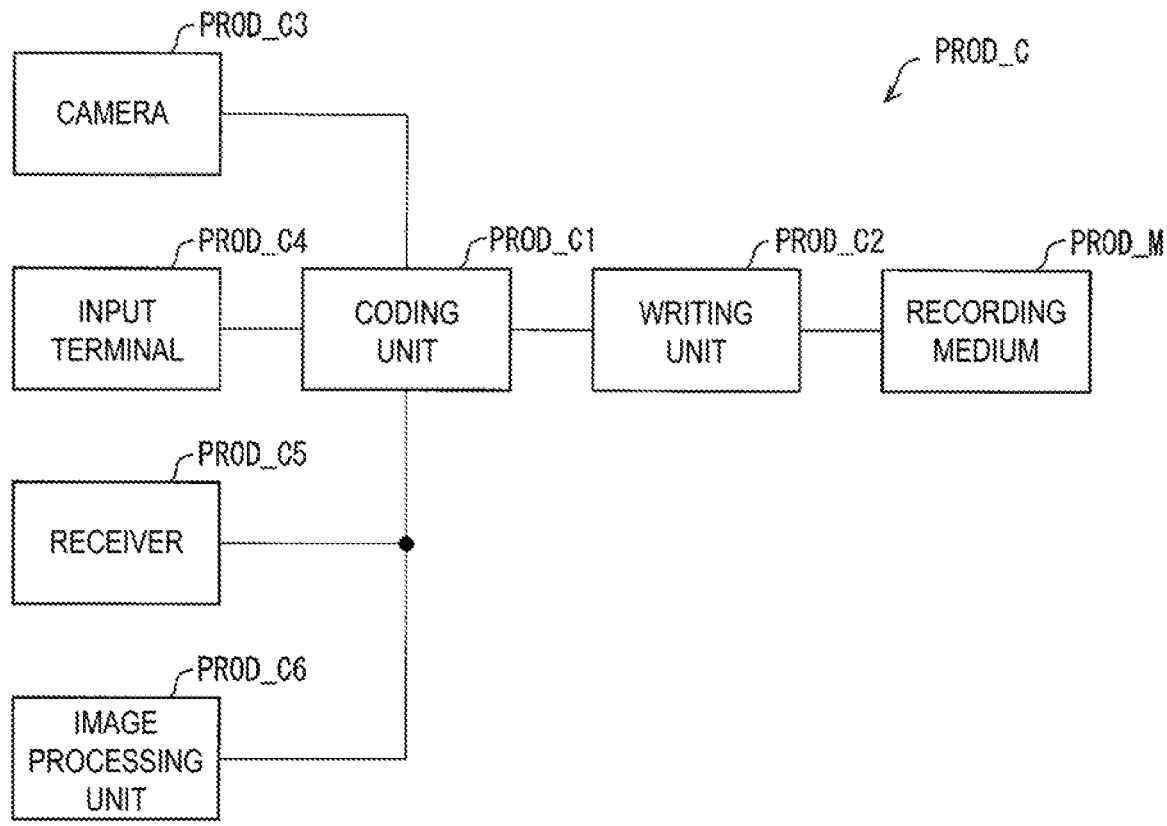
FIGS. 40A and 40B are diagrams illustrating configurations of a recording device equipped with the above image coding device and a reproducing device equipped with the above image decoding device.
Figure 40B:
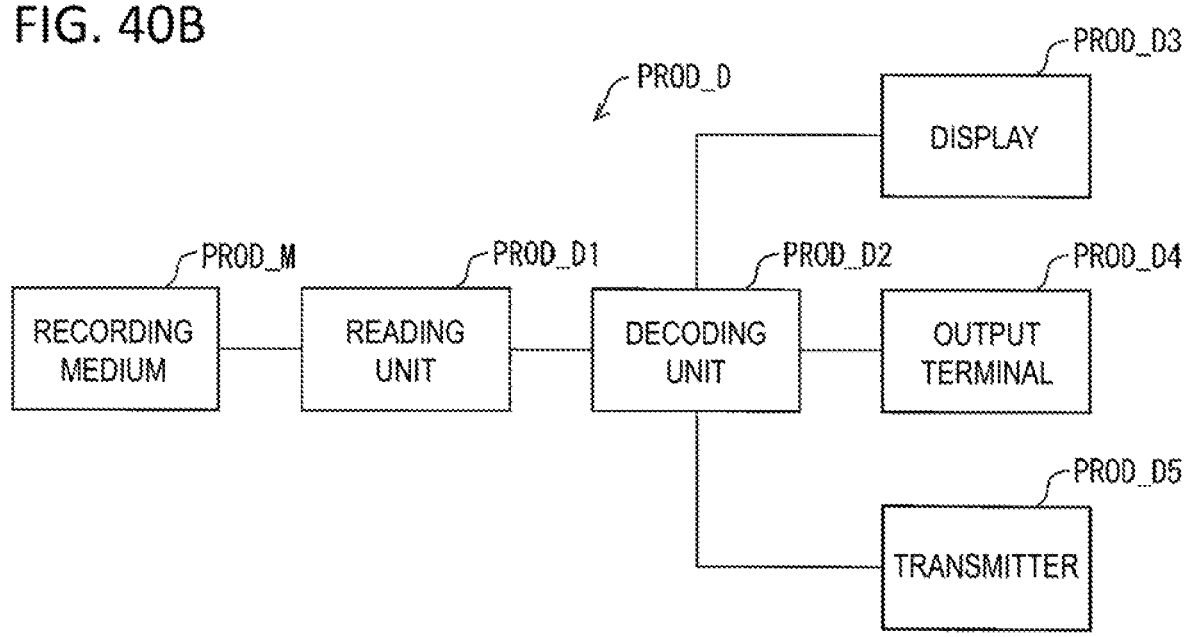

Next, a description is given of that the image coding device 11 and the image decoding device 31 described above can be used to record and reproduce the video with reference to FIGS. 40A and 40B.

FIG. 40A is a block diagram illustrating a configuration of a recording device PROD_C equipped with the image coding device 11 described above. As illustrated in FIG. 40A, the recording device PROD_C includes a coding unit PROD_C1 that codes a video to acquire coded data, and a writing unit PROD_C2 that writes the coded data acquired by the coding unit PROD_C1 into a recording medium PROD_M. The image coding device 11 described above is used as the coding unit PROD_C1.

The recording medium PROD_M may be (1) of a type that is built in the recording device PROD_C such as a Hard Disk Drive (HDD) and a Solid State Drive (SSD), (2) of a type that is connected with the recording device PROD_C such as an SD memory card and a Universal Serial Bus (USB) flash memory, or (3) of a type that is loaded into a drive device (not illustrated) built in the recording device PROD_C such as a Digital Versatile Disc (DVD) and a Blu-ray Disc (registered trademark) (BD).

The recording device PROD_C may further include, as resources for supplying a video input to the coding unit PROD_C1, a camera PROD_C3 that images a video, an input terminal PROD_C4 that inputs a video from outside, a receiver PROD_C5 that receives a video, and an image processing unit C6 that generates or processes an image. FIG. 40A illustrates the configuration in which the recording device PROD_C includes all of the above components, but some of these may be omitted.

The receiver PROD_C5 may receive the video not coded, or the coded data coded using a coding scheme for transmission different from the coding scheme for recording. In the latter case, a decoding unit for transmission (not illustrated) which decodes the coded data coded using the coding scheme for transmission may be provided between the receiver PROD_C5 and the coding unit PROD_C1.

Examples of the recording device PROD_C like this include a DVD recorder, a BD recorder, and a Hard Disk Drive (HDD) recorder (in this case, the input terminal PROD_C4 or the receiver PROD_C5 is mainly the resource for supplying the video). A camcorder (in this case, the camera PROD_C3 is mainly the resource for supplying the video), a personal computer (in this case, the receiver PROD_C5 or the image processing unit C6 is mainly the resource for supplying the video), and a smartphone (in this case, the camera PROD_C3 or the receiver PROD_C5 is mainly the resource for supplying the video) are also included in the examples of the recording device PROD_C like this.

FIG. 40B is a block diagram illustrating a configuration of a reproducing device PROD_D equipped with the image decoding device 31. As illustrated in FIG. 40B, the reproducing device PROD_D includes a reading unit PROD_D1 that reads out coded data written into the recording medium PROD_M, and a decoding unit PROD_D2 that decodes the coded data read out by the reading unit PROD_D1 to acquire a video. The image decoding device 31 described above is used as the decoding unit PROD_D2.

The recording medium PROD_M may be (1) of a type that is built in the reproducing device PROD_D such as an HDD and an SSD, (2) of a type that is connected with the reproducing device PROD_D such as an SD memory card and a USB flash memory, or (3) of a type that is loaded into a drive device (not illustrated) built in the reproducing device PROD_D such as a DVD and a BD.

The reproducing device PROD_D may further include, as supply destinations of the video output by the decoding unit PROD_D2, a display PROD_D3 that displays the video, an output terminal PROD_D4 that outputs the video from outside, and a transmitter PROD_D5 that transmits the video. FIG. 40B illustrates the configuration in which the reproducing device PROD_D includes all of the above components, but some of these may be omitted.

The transmitter PROD_D5 may transmit the video not coded, or the coded data coded using a coding scheme for transmission different from the coding scheme for recording. In the latter case, a coding unit (not illustrated) which codes the video using the coding scheme for transmission may be provided between the decoding unit PROD_D2 and the transmitter PROD_D5.

Examples of the reproducing device PROD_D like this include a DVD player, a BD player, and an HDD player (in this case, the output terminal PROD_D4 connected with a TV set or the like is mainly the supply destination of the video). A TV set (in this case, the display PROD_D3 is mainly the supply destination of the video), a digital signage (also referred to as an electronic signage or an electronic bulletin board, and the display PROD_D3 or the transmitter PROD_D5 is mainly the supply destination of the video), a desktop PC (in this case, the output terminal PROD_D4 or the transmitter PROD_D5 is mainly the supply destination of the video), a laptop or tablet PC (in this case, the display PROD_D3 or the transmitter PROD_D5 is mainly the supply destination of the video), and a smartphone (in this case, the display PROD_D3 or the transmitter PROD_D5 is mainly the supply destination of the video) are also included in the examples of the reproducing device PROD_D like this.

Hardware Implementation and Software Implementation

The blocks in the image decoding device 31 and the image coding device 11 described above may be implemented by hardware using a logic circuit formed on an integrated circuit (IC chip), or by software using a Central Processing Unit (CPU).

In the latter case, the above-described devices include a CPU to execute commands of a program for achieving the functions, a Read Only Memory (ROM) to store the program, a Random Access Memory (RAM) to load the program, and a storage device (storage medium) such as a memory to store the program and various types of data. The object of an embodiment of the disclosure can be attained by that software realizing the functions described above that is a program code of a control program for the above respective devices (executable program, intermediate code program, source program) is recoded in a recording medium in a computer-readable manner, the recording medium is supplied to the above respective devices, and the computer (or the CPU or MPU) reads out the program code recorded in the recording medium for execution.

Examples of the above-described recording medium to use include tapes such as a magnetic tape and a cassette tape, disks or discs including a magnetic disk such as a floppy (registered trademark) disk/hard disk or an optical disc such as a Compact Disc Read-Only Memory (CD-ROM)/Magneto-Optical (MO) disc/Mini Disc (MD)/Digital Versatile Disc (DVD)/CD Recordable (CD-R)/Blu-ray Disc (registered trademark), cards such as an IC card (including a memory card)/optical card, semiconductor memories such as a mask ROM/Erasable Programmable Read-Only Memory (EPROM)/Electrically Erasable and Programmable Read-Only Memory (EEPROM: registered trademark)/flash ROM, or logic circuits such as a Programmable logic device (PLD) and a Field Programmable Gate Array (FPGA).

The above-described devices may be configured to be connectable with a communication network to be supplied with the above-described program code through the communication network. This communication network is not specifically limited so long as the program code can be transmitted. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network and the like are available. Transmission media constituting this communication network are not limited to a specific configuration or type so long as the program code can be transmitted. For example, a wired medium such as Institute of Electrical and Electronic Engineers (IEEE) 1394, a USB, a power-line carrier, a cable TV line, a telephone line, and an Asymmetric Digital Subscriber Line (ADSL), or a wireless medium such as an infrared-ray including Infrared Data Association (IrDA) and a remote controller, Bluetooth (registered trademark), IEEE 802.11 wireless communication, High Data Rate (HDR), Near Field Communication (NFC), Digital Living Network Alliance (registered trademark) (DLNA), a mobile telephone network, a satellite circuit, and a digital terrestrial network are also available. An aspect of the disclosure may also be implemented in a form of a computer data signal embedded in a carrier wave in which the above-described program code is embodied by electronic transmission.

An embodiment of the disclosure is not limited to the above described embodiments, and can be variously modified within a scope of the claims. To be more specific, embodiments made by combining technical means which are adequately modified within the scope of the claims are also included in the scope of an embodiment of the disclosure.

CROSS-REFERENCE OF RELATED APPLICATION

This application claims priority based on JP 2016-016557 filed in Japan on Jan. 29, 2016, the contents of which are entirely incorporated herein by reference.

INDUSTRIAL APPLICABILITY

An embodiment of the disclosure can be preferably applied to an image decoding device that decodes coded data in which an image data is coded and an image coding device that generates coded data in which an image data is coded. An embodiment of the disclosure can be also preferably applied to a data structure of the coded data which is generated by the image coding device and referred to by the image decoding device.

REFERENCE SIGNS LIST

1 Image transmission system
11 Image coding device (video coding device)
101 Prediction image generation unit (prediction image generation device)
102 Subtraction unit
103 DCT and quantization unit
104 Entropy coding unit
105 Dequantization and inverse DCT unit
106 Addition unit
108 Prediction parameter memory (frame memory)
109 Reference picture memory (frame memory)
110 Coding parameter determination unit
111 Prediction parameter coding unit
112 Inter-prediction parameter coding unit
1121 Merge prediction parameter derivation unit
1122 AMVP prediction parameter derivation unit
1123 Subtraction unit
1126 Prediction parameter integration unit
113 Intra-prediction parameter coding unit
21 Network
31 Image decoding device (video decoding device)
301 Entropy decoding unit
302 Prediction parameter decoding unit
303 Inter-prediction parameter decoding unit
30312 Merge index decoding unit
30313 Vector candidate index decoding unit
3032 AMVP prediction parameter derivation unit
3033 Vector candidate derivation unit (prediction vector compute unit)
3035 Addition unit
3036 Merge prediction parameter derivation unit
30361 Merge candidate derivation unit (prediction vector compute unit)
303611 Merge candidate storage unit
30362 Merge candidate selection unit
304 Intra-prediction parameter decoding unit
306 Reference picture memory (frame memory)
307 Prediction parameter memory (frame memory)
308 Prediction image generation unit (prediction image generation device)
309 Inter-prediction image generation unit
3091 Motion compensation unit
3094 Weighted prediction unit
310 Intra-prediction image generation unit
311 Dequantization and inverse DCT unit
312 Addition unit
41 Image display device

The invention claimed is:

1. A prediction image generation device for generating a prediction image used to code or decode a video, the prediction image generation device comprising:
a prediction vector computing circuit; and
a prediction image generation circuit, wherein
the prediction vector computing circuit derives at least one control point motion vector by using a neighboring location and a motion vector in a neighboring block adjacent to a target block,
the prediction vector computing circuit derives a subblock motion vector by using a sum of a difference motion vector and a control point motion vector predictor, and
the prediction image generation circuit generates the prediction image by referring to the subblock motion vector,
wherein the neighboring location is derived by using one of (i) a first neighboring location (xPb−1, yPb−1), (ii) a second neighboring location (xPb+W−1, yPb−1), (iii) a third neighboring location (xPb+W, yPb−1), (iv) a fourth neighboring location (xPb−1, yPb+H−1) and (v) a fifth neighboring location (xPb−1, yPb+H), wherein xPb is an X coordinate of the target block, yPb is a Y coordinate of the target block, H is a height of the target block and W is a width of the target block.

2. A video decoding device comprising
the prediction image generation device according to claim 1, wherein
the video decoding device reconstructs a coding target image by adding a residual image to the prediction image.

3. A video coding device comprising
the prediction image generation device according to claim 1, wherein
the video coding device codes a residual error between the prediction image and a coding target image.

* * * * *